(12) United States Patent
Karin et al.

(10) Patent No.: US 12,458,659 B2
(45) Date of Patent: Nov. 4, 2025

(54) METHODS FOR TREATING MACROPHAGE-MEDIATED DISEASES, AND METHODS OF IDENTIFYING AGENTS USEFUL THEREFORE

(71) Applicant: The Regents of the University of California, Oakland, CA (US)

(72) Inventors: Michael Karin, La Jolla, CA (US); Elsa Sanchez-Lopez, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 1090 days.

(21) Appl. No.: 17/428,544

(22) PCT Filed: Feb. 4, 2020

(86) PCT No.: PCT/US2020/016637
§ 371 (c)(1),
(2) Date: Aug. 4, 2021

(87) PCT Pub. No.: WO2020/163374
PCT Pub. Date: Aug. 13, 2020

(65) Prior Publication Data
US 2022/0133770 A1     May 5, 2022

Related U.S. Application Data

(60) Provisional application No. 62/801,973, filed on Feb. 6, 2019.

(51) Int. Cl.
| A61K 31/713 | (2006.01) |
| A61K 45/06 | (2006.01) |
| C12N 15/113 | (2010.01) |

(52) U.S. Cl.
CPC ............ *A61K 31/713* (2013.01); *A61K 45/06* (2013.01); *C12N 15/113* (2013.01); *C12N 2310/122* (2013.01)

(58) Field of Classification Search
CPC .. A61K 31/713; A61K 45/06; A61K 31/7088; C12N 15/113; C12N 2310/122
See application file for complete search history.

(56) References Cited

U.S. PATENT DOCUMENTS

| 7,303,895 B1 * | 12/2007 | O'Regan | A61P 25/02 |
| | | | 435/6.16 |
| 2010/0068302 A1 * | 3/2010 | Ramirez De Molina | A61K 45/06 |
| | | | 424/649 |
| 2011/0178124 A1 * | 7/2011 | Lacal Sanjuan | A61P 31/10 |
| | | | 514/332 |

FOREIGN PATENT DOCUMENTS

| JP | 2013-049646 A | 3/2013 | |
| WO | WO-2015028662 A1 * | 3/2015 | ......... A61K 31/4425 |

OTHER PUBLICATIONS

Brailoiu et al., "Choline is an intracellular messenger linking extracellular stimuli to IP3-evoked Ca2+ signals through sigma-1 receptors", Cell Reports, Jan. 8, 2019, pp. 330-337. (Year: 2019).*
JP 2013049646, Published Mar. 14, 2013, English translation of Description (Year: 2013).*
Crooke et al. (Antisense Drug Technology: Principles, Strategies, and Applications, 2nd ed. 2008, p. 119) (Year: 2008).*
Falconer et al., "Review: Synovial Cell Metabolism and Chronic Inflammation in Rheumatoid Arthritis," Arthritis & Rheumatology, Jul. 2018, vol. 70, No. 7, pp. 984-999.
International Search Report and Written Opinion dated Jun. 23, 2020, from application No. PCT/US2020/016637.
Sanchez-Lopez et al., "Choline Uptake and Metabolism Modulate Macrophage IL-1beta and IL-18 Production," 2019, Cell Metabolism, 29, pp. 1350-1362.
Sanchez-Lopez et al., "Role of Choline in Gouty Inflammation," 2018 ACR/ARHP Annual Meeting, Abstract No. 2968, 2 pages.

* cited by examiner

*Primary Examiner* — Abigail Vanhorn
*Assistant Examiner* — Stephanie L Sullivan
(74) *Attorney, Agent, or Firm* — Foley & Lardner LLP

(57) ABSTRACT

Provided herein are methods of treating macrophage-mediated inflammatory diseases and disorders. Also, disclosed are methods for screening for agents useful in such methods.

6 Claims, 24 Drawing Sheets
Specification includes a Sequence Listing.

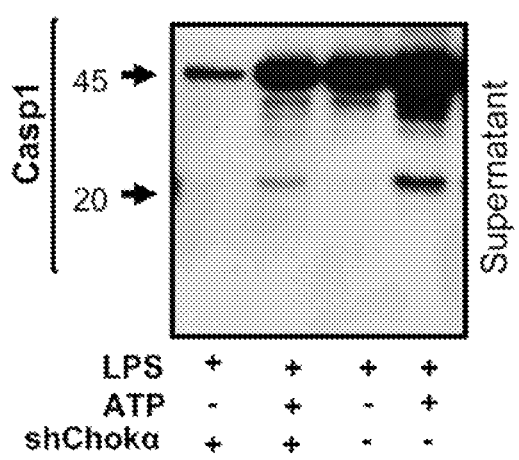
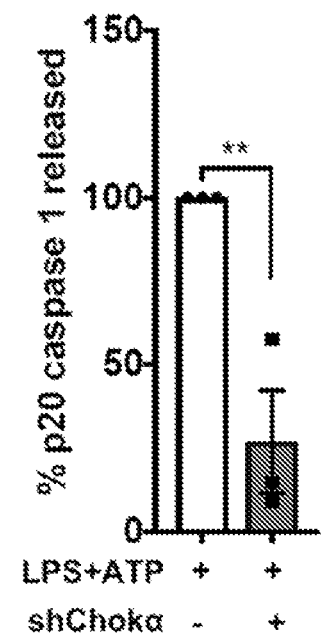
FIG. 3C
FIG. 3D
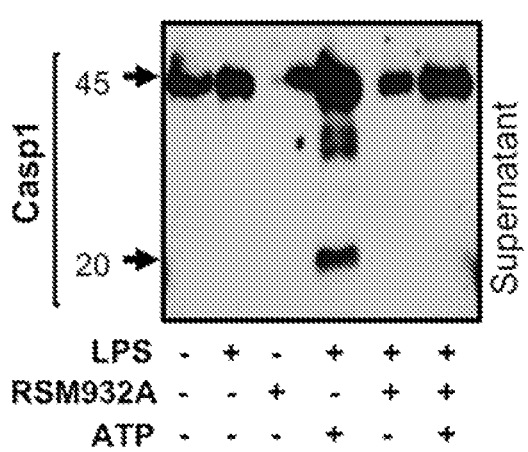
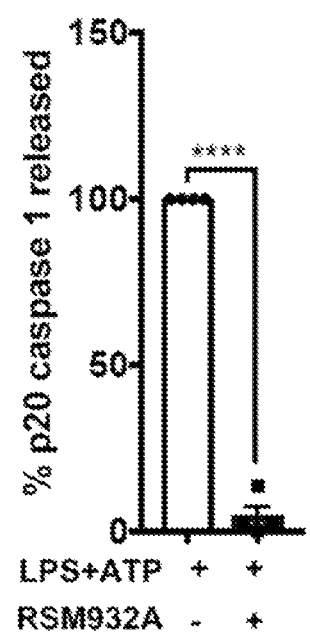
FIG. 3E
FIG. 3F

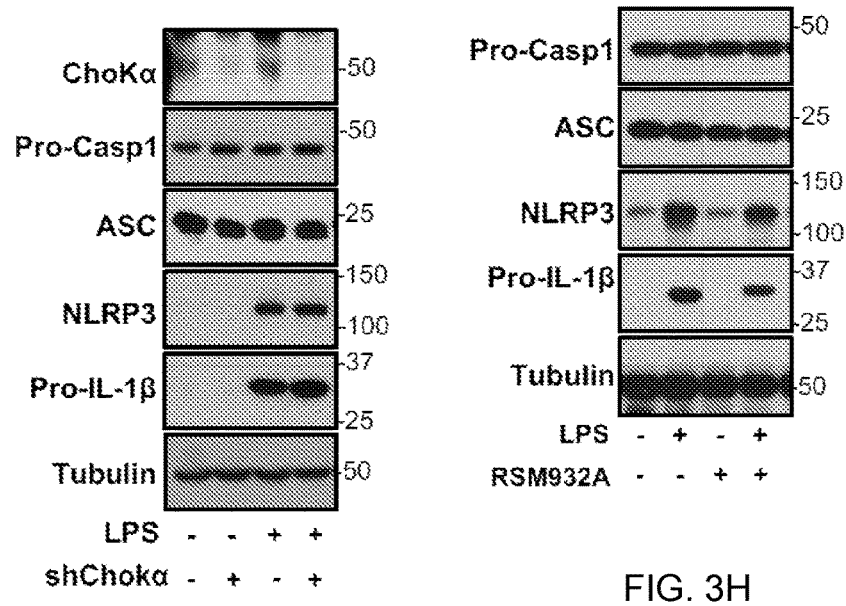
FIG. 3G
FIG. 3H
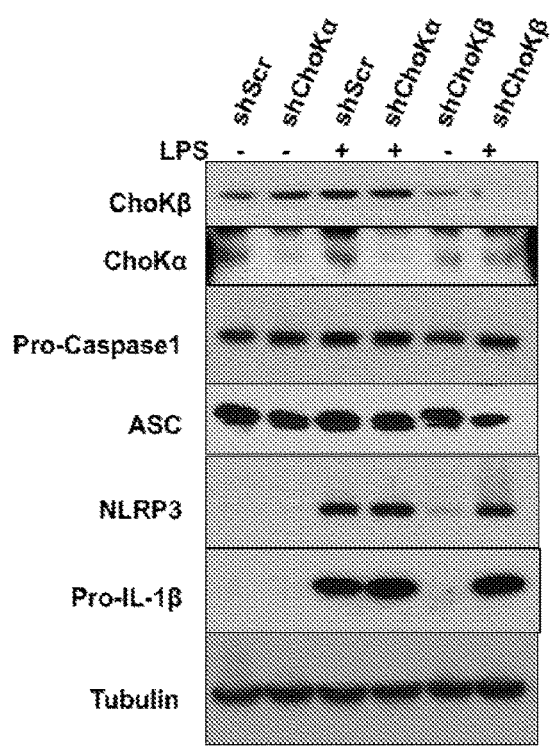
FIG. 3I
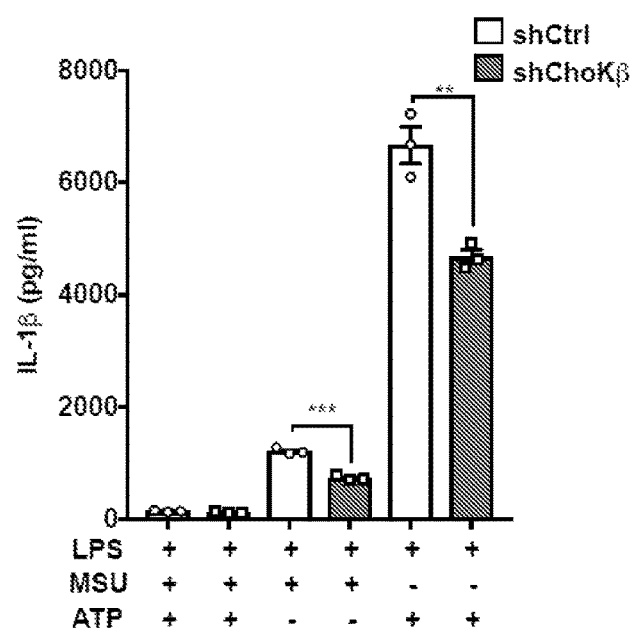
FIG. 3J

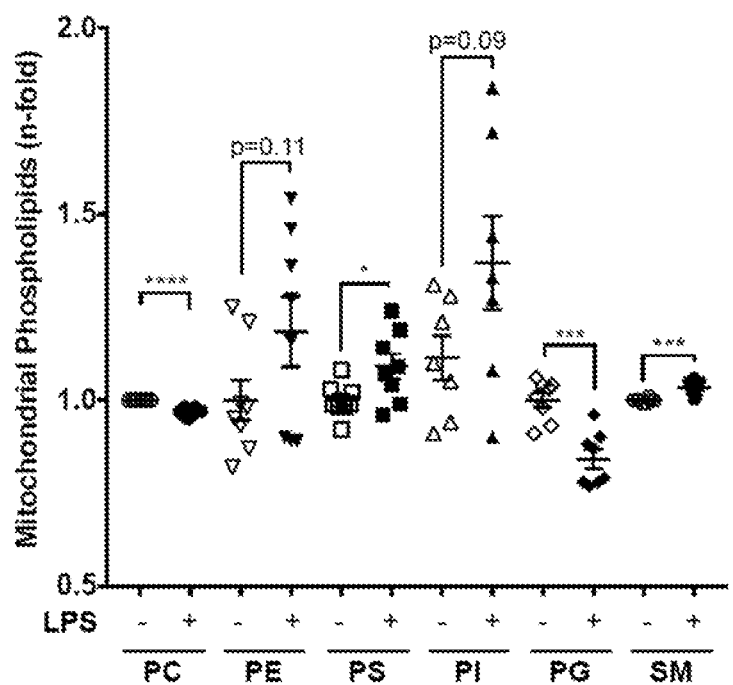
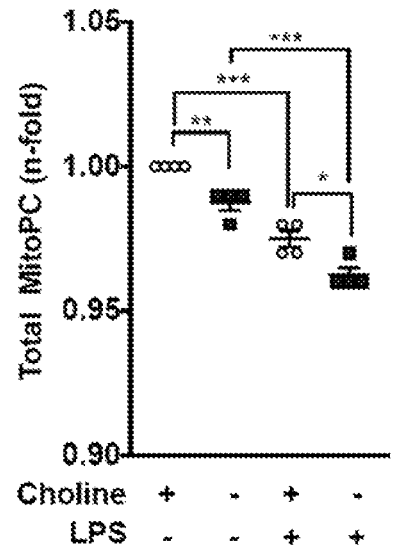
FIG. 4A
FIG. 4B
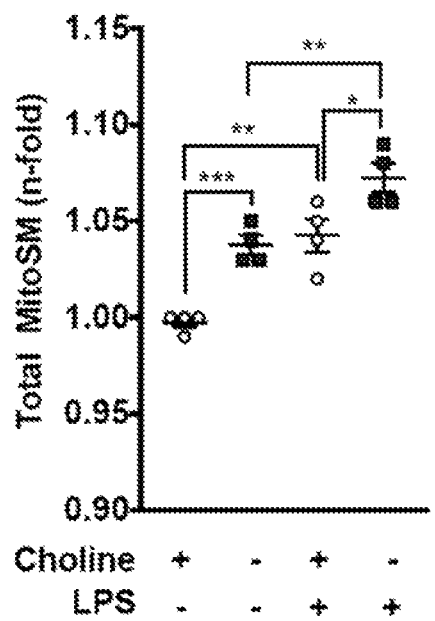
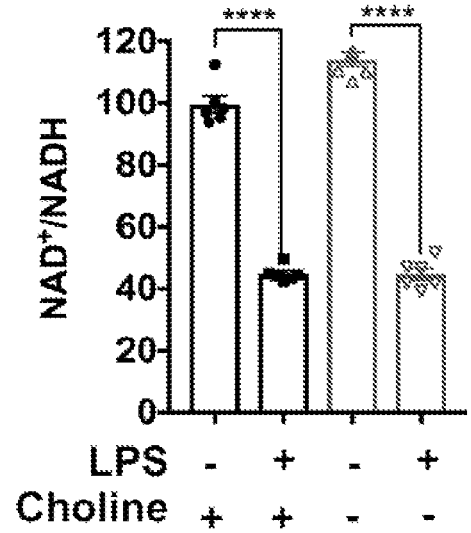
FIG. 4C
FIG. 4D

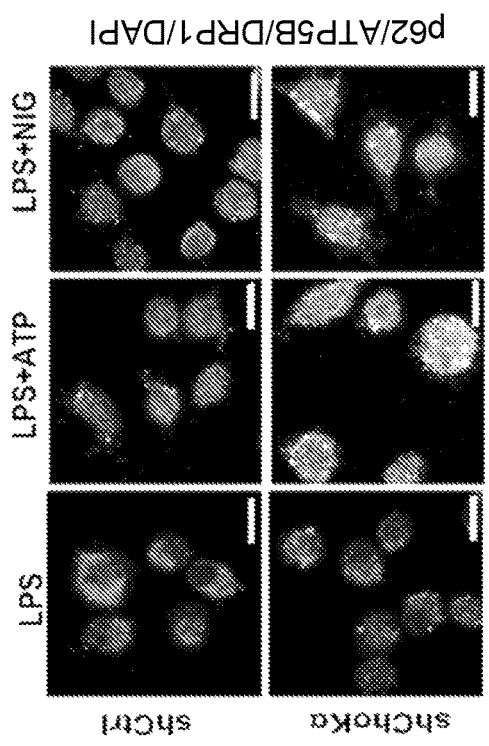
FIG. 5A
FIG. 5B
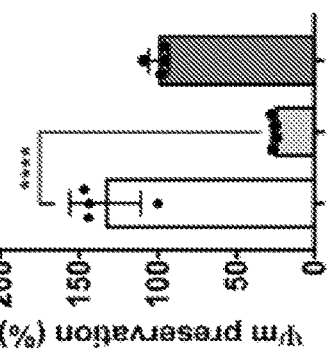
FIG. 5D
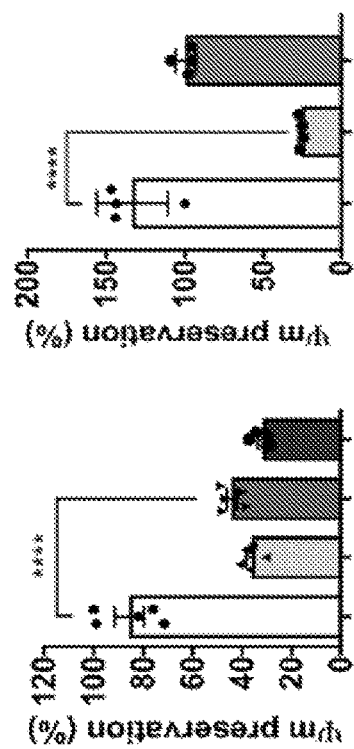
FIG. 5E
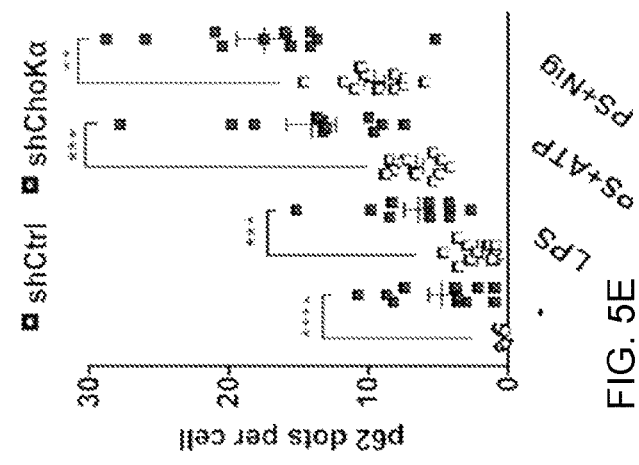
FIG. 5C

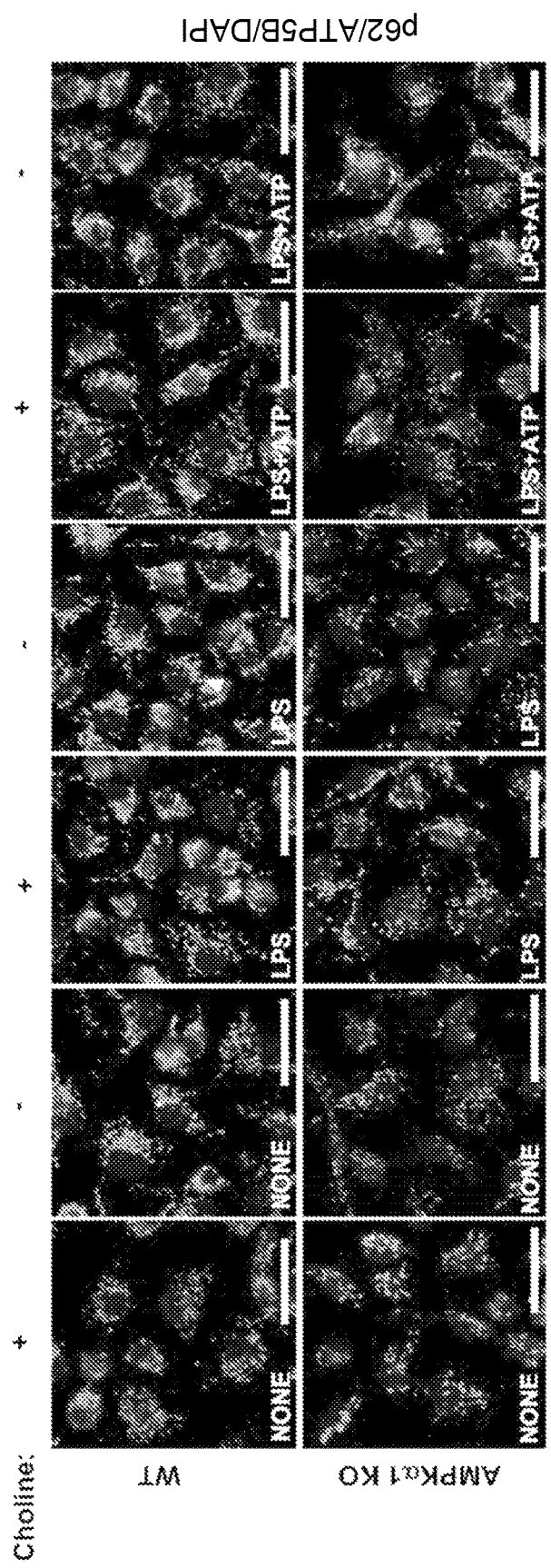
FIG. 5H
FIG. 5K
FIG. 5O

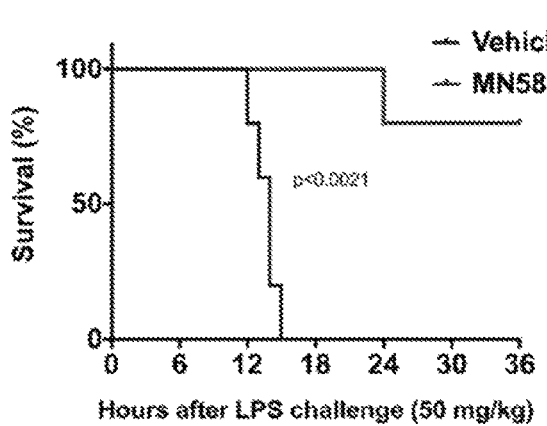
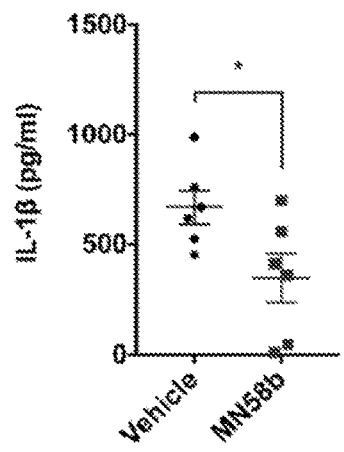
FIG. 6A
FIG. 6B
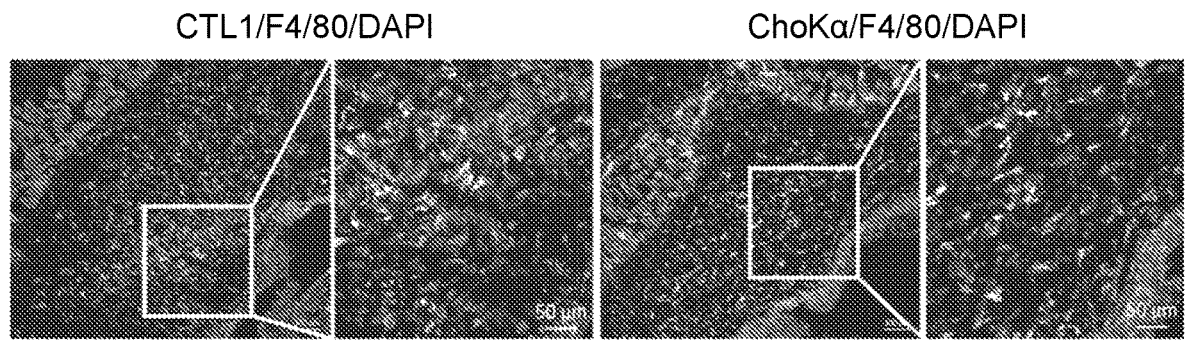
FIG. 6C
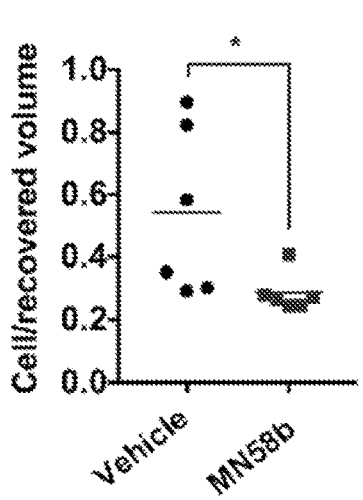
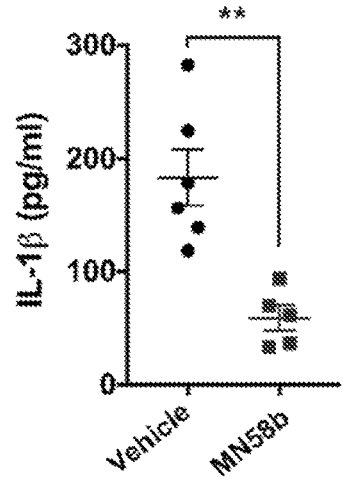
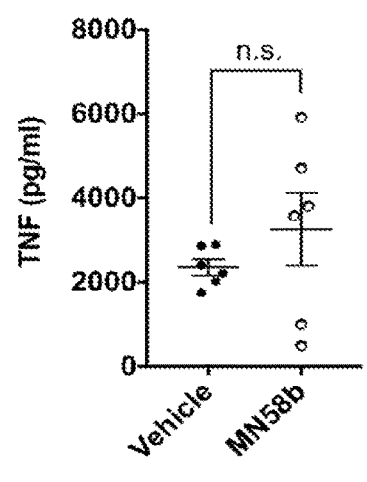
FIG. 6D
FIG. 6E
FIG. 6F

SEQUENCE LISTING

```
<160> NUMBER OF SEQ ID NOS: 49

<210> SEQ ID NO 1
<211> LENGTH: 657
<212> TYPE: PRT
<213> ORGANISM: Homo sapiens

<400> SEQUENCE: 1

Met Gly Cys Cys Ser Ser Ala Ser Ser Ala Ala Gln Ser Ser Lys Arg
1               5                   10                  15

Glu Trp Lys Pro Leu Glu Asp Arg Ser Cys Thr Asp Ile Pro Trp Leu
            20                  25                  30

Leu Leu Phe Ile Leu Phe Cys Ile Gly Met Gly Phe Ile Cys Gly Phe
        35                  40                  45

Ser Ile Ala Thr Gly Ala Ala Ala Arg Leu Val Ser Gly Tyr Asp Ser
    50                  55                  60

Tyr Gly Asn Ile Cys Gly Gln Lys Asn Thr Lys Leu Glu Ala Ile Pro
65                  70                  75                  80

Asn Ser Gly Met Asp His Thr Gln Arg Lys Tyr Val Phe Phe Leu Asp
                85                  90                  95

Pro Cys Asn Leu Asp Leu Ile Asn Arg Lys Ile Lys Ser Val Ala Leu
            100                 105                 110

Cys Val Ala Ala Cys Pro Arg Gln Glu Leu Lys Thr Leu Ser Asp Val
        115                 120                 125

Gln Lys Phe Ala Glu Ile Asn Gly Ser Ala Leu Cys Ser Tyr Asn Leu
    130                 135                 140

Lys Pro Ser Glu Tyr Thr Thr Ser Pro Lys Ser Ser Val Leu Cys Pro
145                 150                 155                 160

Lys Leu Pro Val Pro Ala Ser Ala Pro Ile Pro Phe Phe His Arg Cys
                165                 170                 175
```

-continued

```
Ala Pro Val Asn Ile Ser Cys Tyr Ala Lys Phe Ala Glu Ala Leu Ile
            180                 185                 190

Thr Phe Val Ser Asp Asn Ser Val Leu His Arg Leu Ile Ser Gly Val
        195                 200                 205

Met Thr Ser Lys Glu Ile Ile Leu Gly Leu Cys Leu Leu Ser Leu Val
    210                 215                 220

Leu Ser Met Ile Leu Met Val Ile Ile Arg Tyr Ile Ser Arg Val Leu
225                 230                 235                 240

Val Trp Ile Leu Thr Ile Leu Val Ile Leu Gly Ser Leu Gly Gly Thr
                245                 250                 255

Gly Val Leu Trp Trp Leu Tyr Ala Lys Gln Arg Arg Ser Pro Lys Glu
                260                 265                 270

Thr Val Thr Pro Glu Gln Leu Gln Ile Ala Glu Asp Asn Leu Arg Ala
            275                 280                 285

Leu Leu Ile Tyr Ala Ile Ser Ala Thr Val Phe Thr Val Ile Leu Phe
            290                 295                 300

Leu Ile Met Leu Val Met Arg Lys Arg Val Ala Leu Thr Ile Ala Leu
305                 310                 315                 320

Phe His Val Ala Gly Lys Val Phe Ile His Leu Pro Leu Leu Val Phe
                325                 330                 335

Gln Pro Phe Trp Thr Phe Phe Ala Leu Val Leu Phe Trp Val Tyr Trp
                340                 345                 350

Ile Met Thr Leu Leu Phe Leu Gly Thr Thr Gly Ser Pro Val Gln Asn
            355                 360                 365

Glu Gln Gly Phe Val Glu Phe Lys Ile Ser Gly Pro Leu Gln Tyr Met
    370                 375                 380

Trp Trp Tyr His Val Val Gly Leu Ile Trp Ile Ser Glu Phe Ile Leu
385                 390                 395                 400

Ala Cys Gln Gln Met Thr Val Ala Gly Ala Val Val Thr Tyr Tyr Phe
                405                 410                 415

Thr Arg Asp Lys Arg Asn Leu Pro Phe Thr Pro Ile Leu Ala Ser Val
            420                 425                 430

Asn Arg Leu Ile Arg Tyr His Leu Gly Thr Val Ala Lys Gly Ser Phe
            435                 440                 445

Ile Ile Thr Leu Val Lys Ile Pro Arg Met Ile Leu Met Tyr Ile His
450                 455                 460

Ser Gln Leu Lys Gly Lys Glu Asn Ala Cys Ala Arg Cys Val Leu Lys
465                 470                 475                 480

Ser Cys Ile Cys Cys Leu Trp Cys Leu Glu Lys Cys Leu Asn Tyr Leu
                485                 490                 495

Asn Gln Asn Ala Tyr Thr Ala Thr Ala Ile Asn Ser Thr Asn Phe Cys
            500                 505                 510

Thr Ser Ala Lys Asp Ala Phe Val Ile Leu Val Glu Asn Ala Leu Arg
        515                 520                 525

Val Ala Thr Ile Asn Thr Val Gly Asp Phe Met Leu Phe Leu Gly Lys
    530                 535                 540

Val Leu Ile Val Cys Ser Thr Gly Leu Ala Gly Ile Met Leu Leu Asn
545                 550                 555                 560

Tyr Gln Gln Asp Tyr Thr Val Trp Val Leu Pro Leu Ile Ile Val Cys
                565                 570                 575

Leu Phe Ala Phe Leu Val Ala His Cys Phe Leu Ser Ile Tyr Glu Met
                580                 585                 590

Val Val Asp Val Leu Phe Leu Cys Phe Ala Ile Asp Thr Lys Tyr Asn
```

```
                595                 600                 605
Asp Gly Ser Pro Gly Arg Glu Phe Tyr Met Asp Lys Val Leu Met Glu
    610                 615                 620

Phe Val Glu Asn Ser Arg Lys Ala Met Lys Glu Ala Gly Lys Gly Gly
625                 630                 635                 640

Val Ala Asp Ser Arg Glu Leu Lys Pro Met Ala Ser Gly Ala Ser Ser
                645                 650                 655

Ala

<210> SEQ ID NO 2
<211> LENGTH: 457
<212> TYPE: PRT
<213> ORGANISM: Homo sapiens

<400> SEQUENCE: 2

Met Lys Thr Lys Phe Cys Thr Gly Gly Glu Ala Glu Pro Ser Pro Leu
1               5                   10                  15

Gly Leu Leu Leu Ser Cys Gly Ser Gly Ala Ala Pro Ala Pro Gly
            20                  25                  30

Val Gly Gln Gln Arg Asp Ala Ala Ser Asp Leu Glu Ser Lys Gln Leu
        35                  40                  45

Gly Gly Gln Gln Pro Pro Leu Ala Leu Pro Pro Pro Pro Leu Pro
    50                  55                  60

Leu Pro Leu Pro Leu Pro Gln Pro Pro Pro Gln Pro Pro Ala Asp
65                  70                  75                  80

Glu Gln Pro Glu Pro Arg Thr Arg Arg Ala Tyr Leu Trp Cys Lys
                85                  90                  95

Glu Phe Leu Pro Gly Ala Trp Arg Gly Leu Arg Glu Asp Glu Phe His
            100                 105                 110

Ile Ser Val Ile Arg Gly Gly Leu Ser Asn Met Leu Phe Gln Cys Ser
        115                 120                 125

Leu Pro Asp Thr Thr Ala Thr Leu Gly Asp Glu Pro Arg Lys Val Leu
    130                 135                 140

Leu Arg Leu Tyr Gly Ala Ile Leu Gln Met Arg Ser Cys Asn Lys Glu
145                 150                 155                 160

Gly Ser Glu Gln Ala Gln Lys Glu Asn Glu Phe Gln Gly Ala Glu Ala
                165                 170                 175

Met Val Leu Glu Ser Val Met Phe Ala Ile Leu Ala Glu Arg Ser Leu
            180                 185                 190

Gly Pro Lys Leu Tyr Gly Ile Phe Pro Gln Gly Arg Leu Glu Gln Phe
        195                 200                 205

Ile Pro Ser Arg Arg Leu Asp Thr Glu Glu Leu Ser Leu Pro Asp Ile
    210                 215                 220

Ser Ala Glu Ile Ala Glu Lys Met Ala Thr Phe His Gly Met Lys Met
225                 230                 235                 240

Pro Phe Asn Lys Glu Pro Lys Trp Leu Phe Gly Thr Met Glu Lys Tyr
                245                 250                 255

Leu Lys Glu Val Leu Arg Ile Lys Phe Thr Glu Glu Ser Arg Ile Lys
            260                 265                 270

Lys Leu His Lys Leu Leu Ser Tyr Asn Leu Pro Leu Glu Leu Glu Asn
        275                 280                 285

Leu Arg Ser Leu Leu Glu Ser Thr Pro Ser Pro Val Val Phe Cys His
    290                 295                 300

Asn Asp Cys Gln Glu Gly Asn Ile Leu Leu Leu Glu Gly Arg Glu Asn
```

```
                305                 310                 315                 320
        Ser Glu Lys Gln Lys Leu Met Leu Ile Asp Phe Glu Tyr Ser Ser Tyr
                        325                 330                 335

Asn Tyr Arg Gly Phe Asp Ile Gly Asn His Phe Cys Glu Trp Met Tyr
                        340                 345                 350

Asp Tyr Ser Tyr Glu Lys Tyr Pro Phe Phe Arg Ala Asn Ile Arg Lys
                        355                 360                 365

Tyr Pro Thr Lys Lys Gln Gln Leu His Phe Ile Ser Ser Tyr Leu Pro
                        370                 375                 380

Ala Phe Gln Asn Asp Phe Glu Asn Leu Ser Thr Glu Glu Lys Ser Ile
        385                 390                 395                 400

Ile Lys Glu Glu Met Leu Leu Glu Val Asn Arg Phe Ala Leu Ala Ser
                            405                 410                 415

His Phe Leu Trp Gly Leu Trp Ser Ile Val Gln Ala Lys Ile Ser Ser
                        420                 425                 430

Ile Glu Phe Gly Tyr Met Asp Tyr Ala Gln Ala Arg Phe Asp Ala Tyr
                        435                 440                 445

Phe His Gln Lys Arg Lys Leu Gly Val
            450                 455

<210> SEQ ID NO 3
<211> LENGTH: 395
<212> TYPE: PRT
<213> ORGANISM: Homo sapiens

<400> SEQUENCE: 3

Met Ala Ala Glu Ala Thr Ala Val Ala Gly Ser Gly Ala Val Gly Gly
        1               5                   10                  15

Cys Leu Ala Lys Asp Gly Leu Gln Gln Ser Lys Cys Pro Asp Thr Thr
                        20                  25                  30

Pro Lys Arg Arg Arg Ala Ser Ser Leu Ser Arg Asp Ala Glu Arg Arg
                        35                  40                  45

Ala Tyr Gln Trp Cys Arg Glu Tyr Leu Gly Gly Ala Trp Arg Arg Val
                50                  55                  60

Gln Pro Glu Glu Leu Arg Val Tyr Pro Val Ser Gly Gly Leu Ser Asn
        65                  70                  75                  80

Leu Leu Phe Arg Cys Ser Leu Pro Asp His Leu Pro Ser Val Gly Glu
                        85                  90                  95

Glu Pro Arg Glu Val Leu Leu Arg Leu Tyr Gly Ala Ile Leu Gln Gly
                        100                 105                 110

Val Asp Ser Leu Val Leu Glu Ser Val Met Phe Ala Ile Leu Ala Glu
                    115                 120                 125

Arg Ser Leu Gly Pro Gln Leu Tyr Gly Val Phe Pro Glu Gly Arg Leu
        130                 135                 140

Glu Gln Tyr Ile Pro Ser Arg Pro Leu Lys Thr Gln Glu Leu Arg Glu
        145                 150                 155                 160

Pro Val Leu Ser Ala Ala Ile Ala Thr Lys Met Ala Gln Phe His Gly
                        165                 170                 175

Met Glu Met Pro Phe Thr Lys Glu Pro His Trp Leu Phe Gly Thr Met
                        180                 185                 190

Glu Arg Tyr Leu Lys Gln Ile Gln Asp Leu Pro Pro Thr Gly Leu Pro
                        195                 200                 205

Glu Met Asn Leu Leu Glu Met Tyr Ser Leu Lys Asp Glu Met Gly Asn
                210                 215                 220
```

-continued

```
Leu Arg Lys Leu Leu Glu Ser Thr Pro Ser Pro Val Val Phe Cys His
225                 230                 235                 240

Asn Asp Ile Gln Glu Gly Asn Ile Leu Leu Ser Glu Pro Glu Asn
            245                 250                 255

Ala Asp Ser Leu Met Leu Val Asp Phe Glu Tyr Ser Ser Tyr Asn Tyr
            260                 265                 270

Arg Gly Phe Asp Ile Gly Asn His Phe Cys Glu Trp Val Tyr Asp Tyr
275                 280                 285

Thr His Glu Glu Trp Pro Phe Tyr Lys Ala Arg Pro Thr Asp Tyr Pro
290                 295                 300

Thr Gln Glu Gln Gln Leu His Phe Ile Arg His Tyr Leu Ala Glu Ala
305                 310                 315                 320

Lys Lys Gly Glu Thr Leu Ser Gln Glu Glu Gln Arg Lys Leu Glu Glu
                325                 330                 335

Asp Leu Leu Val Glu Val Ser Arg Tyr Ala Leu Ala Ser His Phe Phe
            340                 345                 350

Trp Gly Leu Trp Ser Ile Leu Gln Ala Ser Met Ser Thr Ile Glu Phe
            355                 360                 365

Gly Tyr Leu Asp Tyr Ala Gln Ser Arg Phe Gln Phe Tyr Phe Gln Gln
370                 375                 380

Lys Gly Gln Leu Thr Ser Val His Ser Ser Ser
385                 390                 395

<210> SEQ ID NO 4
<211> LENGTH: 269
<212> TYPE: PRT
<213> ORGANISM: Homo sapiens

<400> SEQUENCE: 4

Met Ala Glu Val Pro Glu Leu Ala Ser Glu Met Ala Tyr Tyr Ser
1               5                   10                  15

Gly Asn Glu Asp Asp Leu Phe Phe Glu Ala Asp Gly Pro Lys Gln Met
            20                  25                  30

Lys Cys Ser Phe Gln Asp Leu Asp Leu Cys Pro Leu Asp Gly Gly Ile
            35                  40                  45

Gln Leu Arg Ile Ser Asp His His Tyr Ser Lys Gly Phe Arg Gln Ala
50                  55                  60

Ala Ser Val Val Val Ala Met Asp Lys Leu Arg Lys Met Leu Val Pro
65                  70                  75                  80

Cys Pro Gln Thr Phe Gln Glu Asn Asp Leu Ser Thr Phe Phe Pro Phe
                85                  90                  95

Ile Phe Glu Glu Glu Pro Ile Phe Phe Asp Thr Trp Asp Asn Glu Ala
            100                 105                 110

Tyr Val His Asp Ala Pro Val Arg Ser Leu Asn Cys Thr Leu Arg Asp
            115                 120                 125

Ser Gln Gln Lys Ser Leu Val Met Ser Gly Pro Tyr Glu Leu Lys Ala
130                 135                 140

Leu His Leu Gln Gly Gln Asp Met Glu Gln Gln Val Val Phe Ser Met
145                 150                 155                 160

Ser Phe Val Gln Gly Glu Glu Ser Asn Asp Lys Ile Pro Val Ala Leu
                165                 170                 175

Gly Leu Lys Glu Lys Asn Leu Tyr Leu Ser Cys Val Leu Lys Asp Asp
            180                 185                 190

Lys Pro Thr Leu Gln Leu Glu Ser Val Asp Pro Lys Asn Tyr Pro Lys
            195                 200                 205
```

```
Lys Lys Met Glu Lys Arg Phe Val Phe Asn Lys Ile Glu Ile Asn Asn
210                 215                 220
Lys Leu Glu Phe Glu Ser Ala Gln Phe Pro Asn Trp Tyr Ile Ser Thr
225                 230                 235                 240
Ser Gln Ala Glu Asn Met Pro Val Phe Leu Gly Gly Thr Lys Gly Gly
            245                 250                 255
Gln Asp Ile Thr Asp Phe Thr Met Gln Phe Val Ser Ser
            260                 265
```

<210> SEQ ID NO 5
<211> LENGTH: 193
<212> TYPE: PRT
<213> ORGANISM: Homo sapiens

<400> SEQUENCE: 5

```
Met Ala Ala Glu Pro Val Glu Asp Asn Cys Ile Asn Phe Val Ala Met
1               5                   10                  15
Lys Phe Ile Asp Asn Thr Leu Tyr Phe Ile Ala Glu Asp Asp Glu Asn
            20                  25                  30
Leu Glu Ser Asp Tyr Phe Gly Lys Leu Glu Ser Lys Leu Ser Val Ile
        35                  40                  45
Arg Asn Leu Asn Asp Gln Val Leu Phe Ile Asp Gln Gly Asn Arg Pro
50                  55                  60
Leu Phe Glu Asp Met Thr Asp Ser Asp Cys Arg Asp Asn Ala Pro Arg
65                  70                  75                  80
Thr Ile Phe Ile Ile Ser Met Tyr Lys Asp Ser Gln Pro Arg Gly Met
                85                  90                  95
Ala Val Thr Ile Ser Val Lys Cys Glu Lys Ile Ser Thr Leu Ser Cys
            100                 105                 110
Glu Asn Lys Ile Ile Ser Phe Lys Glu Met Asn Pro Pro Asp Asn Ile
        115                 120                 125
Lys Asp Thr Lys Ser Asp Ile Ile Phe Phe Gln Arg Ser Val Pro Gly
130                 135                 140
His Asp Asn Lys Met Gln Phe Glu Ser Ser Ser Tyr Glu Gly Tyr Phe
145                 150                 155                 160
Leu Ala Cys Glu Lys Glu Arg Asp Leu Phe Lys Leu Ile Leu Lys Lys
                165                 170                 175
Glu Asp Glu Leu Gly Asp Arg Ser Ile Met Phe Thr Val Gln Asn Glu
            180                 185                 190
Asp
```

<210> SEQ ID NO 6
<211> LENGTH: 178
<212> TYPE: PRT
<213> ORGANISM: Homo sapiens

<400> SEQUENCE: 6

```
Met His Ser Ser Ala Leu Leu Cys Cys Leu Val Leu Leu Thr Gly Val
1               5                   10                  15
Arg Ala Ser Pro Gly Gln Gly Thr Gln Ser Glu Asn Ser Cys Thr His
            20                  25                  30
Phe Pro Gly Asn Leu Pro Asn Met Leu Arg Asp Leu Arg Asp Ala Phe
        35                  40                  45
Ser Arg Val Lys Thr Phe Phe Gln Met Lys Asp Gln Leu Asp Asn Leu
50                  55                  60
```

Leu Leu Lys Glu Ser Leu Glu Asp Phe Lys Gly Tyr Leu Gly Cys
 65                  70                  75                  80

Gln Ala Leu Ser Glu Met Ile Gln Phe Tyr Leu Glu Glu Val Met Pro
             85                  90                  95

Gln Ala Glu Asn Gln Asp Pro Asp Ile Lys Ala His Val Asn Ser Leu
            100                 105                 110

Gly Glu Asn Leu Lys Thr Leu Arg Leu Arg Leu Arg Arg Cys His Arg
            115                 120                 125

Phe Leu Pro Cys Glu Asn Lys Ser Lys Ala Val Glu Gln Val Lys Asn
        130                 135                 140

Ala Phe Asn Lys Leu Gln Glu Lys Gly Ile Tyr Lys Ala Met Ser Glu
145                 150                 155                 160

Phe Asp Ile Phe Ile Asn Tyr Ile Glu Ala Tyr Met Thr Met Lys Ile
                165                 170                 175

Arg Asn

<210> SEQ ID NO 7
<211> LENGTH: 212
<212> TYPE: PRT
<213> ORGANISM: Homo sapiens

<400> SEQUENCE: 7

Met Asn Ser Phe Ser Thr Ser Ala Phe Gly Pro Val Ala Phe Ser Leu
1               5                   10                  15

Gly Leu Leu Leu Val Leu Pro Ala Ala Phe Pro Ala Pro Val Pro Pro
            20                  25                  30

Gly Glu Asp Ser Lys Asp Val Ala Ala Pro His Arg Gln Pro Leu Thr
        35                  40                  45

Ser Ser Glu Arg Ile Asp Lys Gln Ile Arg Tyr Ile Leu Asp Gly Ile
    50                  55                  60

Ser Ala Leu Arg Lys Glu Thr Cys Asn Lys Ser Asn Met Cys Glu Ser
 65                 70                  75                  80

Ser Lys Glu Ala Leu Ala Glu Asn Asn Leu Asn Leu Pro Lys Met Ala
            85                  90                  95

Glu Lys Asp Gly Cys Phe Gln Ser Gly Phe Asn Glu Glu Thr Cys Leu
            100                 105                 110

Val Lys Ile Ile Thr Gly Leu Leu Glu Phe Glu Val Tyr Leu Glu Tyr
        115                 120                 125

Leu Gln Asn Arg Phe Glu Ser Ser Glu Glu Gln Ala Arg Ala Val Gln
    130                 135                 140

Met Ser Thr Lys Val Leu Ile Gln Phe Leu Gln Lys Lys Ala Lys Asn
145                 150                 155                 160

Leu Asp Ala Ile Thr Thr Pro Asp Pro Thr Thr Asn Ala Ser Leu Leu
                165                 170                 175

Thr Lys Leu Gln Ala Gln Asn Gln Trp Leu Gln Asp Met Thr Thr His
            180                 185                 190

Leu Ile Leu Arg Ser Phe Lys Glu Phe Leu Gln Ser Ser Leu Arg Ala
        195                 200                 205

Leu Arg Gln Met
    210

<210> SEQ ID NO 8
<211> LENGTH: 1036
<212> TYPE: PRT
<213> ORGANISM: Homo sapiens

<400> SEQUENCE: 8

```
Met Lys Met Ala Ser Thr Arg Cys Lys Leu Ala Arg Tyr Leu Glu Asp
1               5                   10                  15
Leu Glu Asp Val Asp Leu Lys Lys Phe Lys Met His Leu Glu Asp Tyr
                20                  25                  30
Pro Pro Gln Lys Gly Cys Ile Pro Leu Pro Arg Gly Gln Thr Glu Lys
            35                  40                  45
Ala Asp His Val Asp Leu Ala Thr Leu Met Ile Asp Phe Asn Gly Glu
        50                  55                  60
Glu Lys Ala Trp Ala Met Ala Val Trp Ile Phe Ala Ala Ile Asn Arg
65                  70                  75                  80
Arg Asp Leu Tyr Glu Lys Ala Lys Arg Asp Glu Pro Lys Trp Gly Ser
                85                  90                  95
Asp Asn Ala Arg Val Ser Asn Pro Thr Val Ile Cys Gln Glu Asp Ser
            100                 105                 110
Ile Glu Glu Glu Trp Met Gly Leu Leu Glu Tyr Leu Ser Arg Ile Ser
        115                 120                 125
Ile Cys Lys Met Lys Lys Asp Tyr Arg Lys Lys Tyr Arg Lys Tyr Val
130                 135                 140
Arg Ser Arg Phe Gln Cys Ile Glu Asp Arg Asn Ala Arg Leu Gly Glu
145                 150                 155                 160
Ser Val Ser Leu Asn Lys Arg Tyr Thr Arg Leu Arg Leu Ile Lys Glu
                165                 170                 175
His Arg Ser Gln Gln Glu Arg Glu Gln Glu Leu Leu Ala Ile Gly Lys
            180                 185                 190
Thr Lys Thr Cys Glu Ser Pro Val Ser Pro Ile Lys Met Glu Leu Leu
        195                 200                 205
Phe Asp Pro Asp Asp Glu His Ser Glu Pro Val His Thr Val Val Phe
210                 215                 220
Gln Gly Ala Ala Gly Ile Gly Lys Thr Ile Leu Ala Arg Lys Met Met
225                 230                 235                 240
Leu Asp Trp Ala Ser Gly Thr Leu Tyr Gln Asp Arg Phe Asp Tyr Leu
                245                 250                 255
Phe Tyr Ile His Cys Arg Glu Val Ser Leu Val Thr Gln Arg Ser Leu
            260                 265                 270
Gly Asp Leu Ile Met Ser Cys Cys Pro Asp Pro Asn Pro Ile His
        275                 280                 285
Lys Ile Val Arg Lys Pro Ser Arg Ile Leu Phe Leu Met Asp Gly Phe
290                 295                 300
Asp Glu Leu Gln Gly Ala Phe Asp Glu His Ile Gly Pro Leu Cys Thr
305                 310                 315                 320
Asp Trp Gln Lys Ala Glu Arg Gly Asp Ile Leu Leu Ser Ser Leu Ile
                325                 330                 335
Arg Lys Lys Leu Leu Pro Glu Ala Ser Leu Leu Ile Thr Thr Arg Pro
            340                 345                 350
Val Ala Leu Glu Lys Leu Gln His Leu Leu Asp His Pro Arg His Val
        355                 360                 365
Glu Ile Leu Gly Phe Ser Glu Ala Lys Arg Lys Glu Tyr Phe Phe Lys
    370                 375                 380
Tyr Phe Ser Asp Glu Ala Gln Ala Arg Ala Ala Phe Ser Leu Ile Gln
385                 390                 395                 400
Glu Asn Glu Val Leu Phe Thr Met Cys Phe Ile Pro Leu Val Cys Trp
                405                 410                 415
```

-continued

Ile Val Cys Thr Gly Leu Lys Gln Gln Met Glu Ser Gly Lys Ser Leu
         420                 425                 430

Ala Gln Thr Ser Lys Thr Thr Thr Ala Val Tyr Val Phe Leu Ser
         435                 440                 445

Ser Leu Leu Gln Pro Arg Gly Gly Ser Gln Glu His Gly Leu Cys Ala
450                 455                 460

His Leu Trp Gly Leu Cys Ser Leu Ala Ala Asp Gly Ile Trp Asn Gln
465             470              475                 480

Lys Ile Leu Phe Glu Glu Ser Asp Leu Arg Asn His Gly Leu Gln Lys
                485                 490                 495

Ala Asp Val Ser Ala Phe Leu Arg Met Asn Leu Phe Gln Lys Glu Val
             500                 505                 510

Asp Cys Glu Lys Phe Tyr Ser Phe Ile His Met Thr Phe Gln Glu Phe
         515                 520                 525

Phe Ala Ala Met Tyr Tyr Leu Leu Glu Glu Glu Lys Glu Gly Arg Thr
         530                 535                 540

Asn Val Pro Gly Ser Arg Leu Lys Leu Pro Ser Arg Asp Val Thr Val
545                 550                 555                 560

Leu Leu Glu Asn Tyr Gly Lys Phe Glu Lys Gly Tyr Leu Ile Phe Val
                 565                 570                 575

Val Arg Phe Leu Phe Gly Leu Val Asn Gln Glu Arg Thr Ser Tyr Leu
             580                 585                 590

Glu Lys Lys Leu Ser Cys Lys Ile Ser Gln Gln Ile Arg Leu Glu Leu
         595                 600                 605

Leu Lys Trp Ile Glu Val Lys Ala Lys Ala Lys Lys Leu Gln Ile Gln
         610                 615                 620

Pro Ser Gln Leu Glu Leu Phe Tyr Cys Leu Tyr Glu Met Gln Glu Glu
625                 630                 635                 640

Asp Phe Val Gln Arg Ala Met Asp Tyr Phe Pro Lys Ile Glu Ile Asn
             645                 650                 655

Leu Ser Thr Arg Met Asp His Met Val Ser Ser Phe Cys Ile Glu Asn
             660                 665                 670

Cys His Arg Val Glu Ser Leu Ser Leu Gly Phe Leu His Asn Met Pro
         675                 680                 685

Lys Glu Glu Glu Glu Glu Lys Glu Gly Arg His Leu Asp Met Val
         690                 695                 700

Gln Cys Val Leu Pro Ser Ser His Ala Ala Cys Ser His Gly Leu
705                 710                 715                 720

Val Asn Ser His Leu Thr Ser Ser Phe Cys Arg Gly Leu Phe Ser Val
                 725                 730                 735

Leu Ser Thr Ser Gln Ser Leu Thr Glu Leu Asp Leu Ser Asp Asn Ser
             740                 745                 750

Leu Gly Asp Pro Gly Met Arg Val Leu Cys Glu Thr Leu Gln His Pro
         755                 760                 765

Gly Cys Asn Ile Arg Arg Leu Trp Leu Gly Arg Cys Gly Leu Ser His
         770                 775                 780

Glu Cys Cys Phe Asp Ile Ser Leu Val Leu Ser Ser Asn Gln Lys Leu
785                 790                 795                 800

Val Glu Leu Asp Leu Ser Asp Asn Ala Leu Gly Asp Phe Gly Ile Arg
             805                 810                 815

Leu Leu Cys Val Gly Leu Lys His Leu Leu Cys Asn Leu Lys Lys Leu
         820                 825                 830

```
Trp Leu Val Ser Cys Cys Leu Thr Ser Ala Cys Cys Gln Asp Leu Ala
                835                 840                 845

Ser Val Leu Ser Thr Ser His Ser Leu Thr Arg Leu Tyr Val Gly Glu
    850                 855                 860

Asn Ala Leu Gly Asp Ser Gly Val Ala Ile Leu Cys Glu Lys Ala Lys
865                 870                 875                 880

Asn Pro Gln Cys Asn Leu Gln Lys Leu Gly Leu Val Asn Ser Gly Leu
                885                 890                 895

Thr Ser Val Cys Cys Ser Ala Leu Ser Ser Val Leu Ser Thr Asn Gln
                900                 905                 910

Asn Leu Thr His Leu Tyr Leu Arg Gly Asn Thr Leu Gly Asp Lys Gly
            915                 920                 925

Ile Lys Leu Leu Cys Glu Gly Leu Leu His Pro Asp Cys Lys Leu Gln
        930                 935                 940

Val Leu Glu Leu Asp Asn Cys Asn Leu Thr Ser His Cys Cys Trp Asp
945                 950                 955                 960

Leu Ser Thr Leu Leu Thr Ser Ser Gln Ser Leu Arg Lys Leu Ser Leu
                965                 970                 975

Gly Asn Asn Asp Leu Gly Asp Leu Gly Val Met Met Phe Cys Glu Val
            980                 985                 990

Leu Lys Gln Gln Ser Cys Leu Leu Gln Asn Leu Gly Leu Ser Glu Met
        995                 1000                1005

Tyr Phe Asn Tyr Glu Thr Lys Ser Ala Leu Glu Thr Leu Gln Glu
    1010                1015                1020

Glu Lys Pro Glu Leu Thr Val Val Phe Glu Pro Ser Trp
    1025                1030                1035

<210> SEQ ID NO 9
<211> LENGTH: 703
<212> TYPE: PRT
<213> ORGANISM: Homo sapiens

<400> SEQUENCE: 9

Met Ala Ala Ala Thr Gly Asp Pro Gly Leu Ser Lys Leu Gln Phe Ala
1               5                   10                  15

Pro Phe Ser Ser Ala Leu Asp Val Gly Phe Trp His Glu Leu Thr Gln
                20                  25                  30

Lys Lys Leu Asn Glu Tyr Arg Leu Asp Glu Ala Pro Lys Asp Ile Lys
            35                  40                  45

Gly Tyr Tyr Tyr Asn Gly Asp Ser Ala Gly Leu Pro Ala Arg Leu Thr
        50                  55                  60

Leu Glu Phe Ser Ala Phe Asp Met Ser Ala Pro Thr Pro Ala Arg Cys
65                  70                  75                  80

Cys Pro Ala Ile Gly Thr Leu Tyr Asn Thr Asn Thr Leu Glu Ser Phe
                85                  90                  95

Lys Thr Ala Asp Lys Lys Leu Leu Glu Gln Ala Ala Asn Glu Ile
            100                 105                 110

Trp Glu Ser Ile Lys Ser Gly Thr Ala Leu Glu Asn Pro Val Leu Leu
        115                 120                 125

Asn Lys Phe Leu Leu Leu Thr Phe Ala Asp Leu Lys Lys Tyr His Phe
    130                 135                 140

Tyr Tyr Trp Phe Cys Tyr Pro Ala Leu Cys Leu Pro Glu Ser Leu Pro
145                 150                 155                 160

Leu Ile Gln Gly Pro Val Gly Leu Asp Gln Arg Phe Ser Leu Lys Gln
                165                 170                 175
```

```
Ile Glu Ala Leu Glu Cys Ala Tyr Asp Asn Leu Cys Gln Thr Glu Gly
            180                 185                 190

Val Thr Ala Leu Pro Tyr Phe Leu Ile Lys Tyr Asp Glu Asn Met Val
            195                 200                 205

Leu Val Ser Leu Leu Lys His Tyr Ser Asp Phe Phe Gln Gly Gln Arg
            210                 215                 220

Thr Lys Ile Thr Ile Gly Val Tyr Asp Pro Cys Asn Leu Ala Gln Tyr
225                 230                 235                 240

Pro Gly Trp Pro Leu Arg Asn Phe Leu Val Leu Ala Ala His Arg Trp
                245                 250                 255

Ser Ser Ser Phe Gln Ser Val Glu Val Val Cys Phe Arg Asp Arg Thr
            260                 265                 270

Met Gln Gly Ala Arg Asp Val Ala His Ser Ile Ile Phe Glu Val Lys
            275                 280                 285

Leu Pro Glu Met Ala Phe Ser Pro Asp Cys Pro Lys Ala Val Gly Trp
            290                 295                 300

Glu Lys Asn Gln Lys Gly Gly Met Gly Pro Arg Met Val Asn Leu Ser
305                 310                 315                 320

Glu Cys Met Asp Pro Lys Arg Leu Ala Glu Ser Ser Val Asp Leu Asn
                325                 330                 335

Leu Lys Leu Met Cys Trp Arg Leu Val Pro Thr Leu Asp Leu Asp Lys
            340                 345                 350

Val Val Ser Val Lys Cys Leu Leu Leu Gly Ala Gly Thr Leu Gly Cys
            355                 360                 365

Asn Val Ala Arg Thr Leu Met Gly Trp Gly Val Arg His Ile Thr Phe
            370                 375                 380

Val Asp Asn Ala Lys Ile Ser Tyr Ser Asn Pro Val Arg Gln Pro Leu
385                 390                 395                 400

Tyr Glu Phe Glu Asp Cys Leu Gly Gly Gly Lys Pro Lys Ala Leu Ala
                405                 410                 415

Ala Ala Asp Arg Leu Gln Lys Ile Phe Pro Gly Val Asn Ala Arg Gly
            420                 425                 430

Phe Asn Met Ser Ile Pro Met Pro Gly His Pro Val Asn Phe Ser Ser
            435                 440                 445

Val Thr Leu Glu Gln Ala Arg Arg Asp Val Glu Gln Leu Glu Gln Leu
            450                 455                 460

Ile Glu Ser His Asp Val Val Phe Leu Leu Met Asp Thr Arg Glu Ser
465                 470                 475                 480

Arg Trp Leu Pro Ala Val Ile Ala Ala Ser Lys Arg Lys Leu Val Ile
                485                 490                 495

Asn Ala Ala Leu Gly Phe Asp Thr Phe Val Val Met Arg His Gly Leu
            500                 505                 510

Lys Lys Pro Lys Gln Gln Gly Ala Gly Asp Leu Cys Pro Asn His Pro
            515                 520                 525

Val Ala Ser Ala Asp Leu Leu Gly Ser Ser Leu Phe Ala Asn Ile Pro
            530                 535                 540

Gly Tyr Lys Leu Gly Cys Tyr Phe Cys Asn Asp Val Val Ala Pro Gly
545                 550                 555                 560

Asp Ser Thr Arg Asp Arg Thr Leu Asp Gln Gln Cys Thr Val Ser Arg
                565                 570                 575

Pro Gly Leu Ala Val Ile Ala Gly Ala Leu Ala Val Glu Leu Met Val
            580                 585                 590
```

```
Ser Val Leu Gln His Pro Glu Gly Gly Tyr Ala Ile Ala Ser Ser Ser
        595                 600                 605

Asp Asp Arg Met Asn Glu Pro Pro Thr Ser Leu Gly Leu Val Pro His
610                 615                 620

Gln Ile Arg Gly Phe Leu Ser Arg Phe Asp Asn Val Leu Pro Val Ser
625                 630                 635                 640

Leu Ala Phe Asp Lys Cys Thr Ala Cys Ser Ser Lys Val Leu Asp Gln
                645                 650                 655

Tyr Glu Arg Glu Gly Phe Asn Phe Leu Ala Lys Val Phe Asn Ser Ser
            660                 665                 670

His Ser Phe Leu Glu Asp Leu Thr Gly Leu Thr Leu Leu His Gln Glu
        675                 680                 685

Thr Gln Ala Ala Glu Ile Trp Asp Met Ser Asp Asp Glu Thr Ile
    690                 695                 700

<210> SEQ ID NO 10
<211> LENGTH: 756
<212> TYPE: PRT
<213> ORGANISM: Homo sapiens

<400> SEQUENCE: 10

Met Ser Trp Ser Pro Ser Leu Thr Thr Gln Thr Cys Gly Ala Trp Glu
1               5                   10                  15

Met Lys Glu Arg Leu Gly Thr Gly Gly Phe Gly Asn Val Ile Arg Trp
            20                  25                  30

His Asn Gln Glu Thr Gly Glu Gln Ile Ala Ile Lys Gln Cys Arg Gln
        35                  40                  45

Glu Leu Ser Pro Arg Asn Arg Glu Arg Trp Cys Leu Glu Ile Gln Ile
    50                  55                  60

Met Arg Arg Leu Thr His Pro Asn Val Val Ala Ala Arg Asp Val Pro
65                  70                  75                  80

Glu Gly Met Gln Asn Leu Ala Pro Asn Asp Leu Pro Leu Leu Ala Met
                85                  90                  95

Glu Tyr Cys Gln Gly Gly Asp Leu Arg Lys Tyr Leu Asn Gln Phe Glu
            100                 105                 110

Asn Cys Cys Gly Leu Arg Glu Gly Ala Ile Leu Thr Leu Leu Ser Asp
        115                 120                 125

Ile Ala Ser Ala Leu Arg Tyr Leu His Glu Asn Arg Ile Ile His Arg
    130                 135                 140

Asp Leu Lys Pro Glu Asn Ile Val Leu Gln Gln Gly Glu Gln Arg Leu
145                 150                 155                 160

Ile His Lys Ile Ile Asp Leu Gly Tyr Ala Lys Glu Leu Asp Gln Gly
                165                 170                 175

Ser Leu Cys Thr Ser Phe Val Gly Thr Leu Gln Tyr Leu Ala Pro Glu
            180                 185                 190

Leu Leu Glu Gln Gln Lys Tyr Thr Val Thr Val Asp Tyr Trp Ser Phe
        195                 200                 205

Gly Thr Leu Ala Phe Glu Cys Ile Thr Gly Phe Arg Pro Phe Leu Pro
    210                 215                 220

Asn Trp Gln Pro Val Gln Trp His Ser Lys Val Arg Gln Lys Ser Glu
225                 230                 235                 240

Val Asp Ile Val Val Ser Glu Asp Leu Asn Gly Thr Val Lys Phe Ser
                245                 250                 255

Ser Ser Leu Pro Tyr Pro Asn Asn Leu Asn Ser Val Leu Ala Glu Arg
            260                 265                 270
```

```
Leu Glu Lys Trp Leu Gln Leu Met Leu Met Trp His Pro Arg Gln Arg
            275                 280                 285

Gly Thr Asp Pro Thr Tyr Gly Pro Asn Gly Cys Phe Lys Ala Leu Asp
        290                 295                 300

Asp Ile Leu Asn Leu Lys Leu Val His Ile Leu Asn Met Val Thr Gly
305                 310                 315                 320

Thr Ile His Thr Tyr Pro Val Thr Glu Asp Glu Ser Leu Gln Ser Leu
                325                 330                 335

Lys Ala Arg Ile Gln Gln Asp Thr Gly Ile Pro Glu Glu Asp Gln Glu
            340                 345                 350

Leu Leu Gln Glu Ala Gly Leu Ala Leu Ile Pro Asp Lys Pro Ala Thr
        355                 360                 365

Gln Cys Ile Ser Asp Gly Lys Leu Asn Glu Gly His Thr Leu Asp Met
370                 375                 380

Asp Leu Val Phe Leu Phe Asp Asn Ser Lys Ile Thr Tyr Glu Thr Gln
385                 390                 395                 400

Ile Ser Pro Arg Pro Gln Pro Glu Ser Val Ser Cys Ile Leu Gln Glu
                405                 410                 415

Pro Lys Arg Asn Leu Ala Phe Phe Gln Leu Arg Lys Val Trp Gly Gln
            420                 425                 430

Val Trp His Ser Ile Gln Thr Leu Lys Glu Asp Cys Asn Arg Leu Gln
        435                 440                 445

Gln Gly Gln Arg Ala Ala Met Met Asn Leu Leu Arg Asn Asn Ser Cys
    450                 455                 460

Leu Ser Lys Met Lys Asn Ser Met Ala Ser Met Ser Gln Gln Leu Lys
465                 470                 475                 480

Ala Lys Leu Asp Phe Phe Lys Thr Ser Ile Gln Ile Asp Leu Glu Lys
                485                 490                 495

Tyr Ser Glu Gln Thr Glu Phe Gly Ile Thr Ser Asp Lys Leu Leu Leu
            500                 505                 510

Ala Trp Arg Glu Met Glu Gln Ala Val Glu Leu Cys Gly Arg Glu Asn
        515                 520                 525

Glu Val Lys Leu Leu Val Glu Arg Met Met Ala Leu Gln Thr Asp Ile
530                 535                 540

Val Asp Leu Gln Arg Ser Pro Met Gly Arg Lys Gln Gly Gly Thr Leu
545                 550                 555                 560

Asp Asp Leu Glu Glu Gln Ala Arg Glu Leu Tyr Arg Arg Leu Arg Glu
                565                 570                 575

Lys Pro Arg Asp Gln Arg Thr Glu Gly Asp Ser Gln Glu Met Val Arg
            580                 585                 590

Leu Leu Leu Gln Ala Ile Gln Ser Phe Glu Lys Val Arg Val Ile
        595                 600                 605

Tyr Thr Gln Leu Ser Lys Thr Val Cys Lys Gln Lys Ala Leu Glu
610                 615                 620

Leu Leu Pro Lys Val Glu Glu Val Val Ser Leu Met Asn Glu Asp Glu
625                 630                 635                 640

Lys Thr Val Val Arg Leu Gln Glu Lys Arg Gln Lys Glu Leu Trp Asn
                645                 650                 655

Leu Leu Lys Ile Ala Cys Ser Lys Val Arg Gly Pro Val Ser Gly Ser
            660                 665                 670

Pro Asp Ser Met Asn Ala Ser Arg Leu Ser Gln Pro Gly Gln Leu Met
        675                 680                 685
```

```
Ser Gln Pro Ser Thr Ala Ser Asn Ser Leu Pro Glu Pro Ala Lys Lys
    690                 695                 700

Ser Glu Glu Leu Val Ala Glu Ala His Asn Leu Cys Thr Leu Leu Glu
705                 710                 715                 720

Asn Ala Ile Gln Asp Thr Val Arg Glu Gln Asp Gln Ser Phe Thr Ala
                725                 730                 735

Leu Asp Trp Ser Trp Leu Gln Thr Glu Glu Glu His Ser Cys Leu
            740                 745                 750

Glu Gln Ala Ser
        755

<210> SEQ ID NO 11
<211> LENGTH: 58
<212> TYPE: DNA
<213> ORGANISM: Artificial Sequence
<220> FEATURE:
<223> OTHER INFORMATION: Synthetic Construct

<400> SEQUENCE: 11
ccgggcatca gtgaatcgcc ttattctcga gaataaggcg attcactgat gcttttg         58

<210> SEQ ID NO 12
<211> LENGTH: 57
<212> TYPE: DNA
<213> ORGANISM: Artificial Sequence
<220> FEATURE:
<223> OTHER INFORMATION: Synthtic Construct

<400> SEQUENCE: 12
ccgggttact tgactacatt ccaaactcga gtttggaatg tagtcaagta acttttt          57

<210> SEQ ID NO 13
<211> LENGTH: 58
<212> TYPE: DNA
<213> ORGANISM: Artificial Sequence
<220> FEATURE:
<223> OTHER INFORMATION: Synthetic Construct

<400> SEQUENCE: 13
ccggccagct ctgaactcaa taatactcga gtattattga gttcagagct ggttttg          58

<210> SEQ ID NO 14
<211> LENGTH: 20
<212> TYPE: DNA
<213> ORGANISM: Artificial Sequence
<220> FEATURE:
<223> OTHER INFORMATION: Synthetic Construct

<400> SEQUENCE: 14
ctggtgaaaa ggacctctcg                                                    20

<210> SEQ ID NO 15
<211> LENGTH: 26
<212> TYPE: DNA
<213> ORGANISM: Artificial Sequence
<220> FEATURE:
<223> OTHER INFORMATION: Synthetic Construct

<400> SEQUENCE: 15
tgaagtactc attatagtca agggca                                             26

<210> SEQ ID NO 16
<211> LENGTH: 27
<212> TYPE: DNA
```

```
<213> ORGANISM: Artificial Sequence
<220> FEATURE:
<223> OTHER INFORMATION: Synthetic Construct

<400> SEQUENCE: 16
gctgcagtat actagatctc cagttgt                                       27

<210> SEQ ID NO 17
<211> LENGTH: 18
<212> TYPE: DNA
<213> ORGANISM: Artificial Sequence
<220> FEATURE:
<223> OTHER INFORMATION: Synthetic Construct

<400> SEQUENCE: 17
atcagcttcc gcctttca                                                 18

<210> SEQ ID NO 18
<211> LENGTH: 20
<212> TYPE: DNA
<213> ORGANISM: Artificial Sequence
<220> FEATURE:
<223> OTHER INFORMATION: Synthetic Construct

<400> SEQUENCE: 18
gcagaggttc agaagggtga                                               20

<210> SEQ ID NO 19
<211> LENGTH: 20
<212> TYPE: DNA
<213> ORGANISM: Artificial Sequence
<220> FEATURE:
<223> OTHER INFORMATION: Synthetic Construct

<400> SEQUENCE: 19
ccccagaaaa agtgagatgc                                               20

<210> SEQ ID NO 20
<211> LENGTH: 17
<212> TYPE: DNA
<213> ORGANISM: Artificial Sequence
<220> FEATURE:
<223> OTHER INFORMATION: Synthetic Construct

<400> SEQUENCE: 20
tttgcccaag ctaccag                                                  17

<210> SEQ ID NO 21
<211> LENGTH: 19
<212> TYPE: DNA
<213> ORGANISM: Artificial Sequence
<220> FEATURE:
<223> OTHER INFORMATION: Synthetic Construct

<400> SEQUENCE: 21
gagcacagcg atggaagaa                                                19

<210> SEQ ID NO 22
<211> LENGTH: 18
<212> TYPE: DNA
<213> ORGANISM: Artificial Sequence
<220> FEATURE:
<223> OTHER INFORMATION: Syntehtic Construct

<400> SEQUENCE: 22
cctggtgctt ggctatgg                                                 18
```

<210> SEQ ID NO 23
<211> LENGTH: 15
<212> TYPE: DNA
<213> ORGANISM: Artificial Sequence
<220> FEATURE:
<223> OTHER INFORMATION: Synthetic Construct

<400> SEQUENCE: 23
caaggtccag ggaga                                                    15

<210> SEQ ID NO 24
<211> LENGTH: 20
<212> TYPE: DNA
<213> ORGANISM: Artificial Sequence
<220> FEATURE:
<223> OTHER INFORMATION: Synthetic Construct

<400> SEQUENCE: 24
ggtcattttg ggattgctgt                                               20

<210> SEQ ID NO 25
<211> LENGTH: 22
<212> TYPE: DNA
<213> ORGANISM: Artificial Sequence
<220> FEATURE:
<223> OTHER INFORMATION: Articifical Construct

<400> SEQUENCE: 25
actgaggtcg ttggtgtagt ca                                            22

<210> SEQ ID NO 26
<211> LENGTH: 20
<212> TYPE: DNA
<213> ORGANISM: Artificial Sequence
<220> FEATURE:
<223> OTHER INFORMATION: Synthetic Construct

<400> SEQUENCE: 26
actctgtccc cgtttccttc                                               20

<210> SEQ ID NO 27
<211> LENGTH: 20
<212> TYPE: DNA
<213> ORGANISM: Artificial Sequence
<220> FEATURE:
<223> OTHER INFORMATION: Syntehtic Construct

<400> SEQUENCE: 27
aagttgatgt tggggagtgg                                               20

<210> SEQ ID NO 28
<211> LENGTH: 19
<212> TYPE: DNA
<213> ORGANISM: Artificial Sequence
<220> FEATURE:
<223> OTHER INFORMATION: Syntehtic Construct

<400> SEQUENCE: 28
atccaagtgg ccatcatcc                                                19

<210> SEQ ID NO 29
<211> LENGTH: 20
<212> TYPE: DNA
<213> ORGANISM: Artificial Sequence
<220> FEATURE:

<223> OTHER INFORMATION: Syntehtic Construct

<400> SEQUENCE: 29
gattaacgca ctgggaaggt                                                    20

<210> SEQ ID NO 30
<211> LENGTH: 19
<212> TYPE: DNA
<213> ORGANISM: Artificial Sequence
<220> FEATURE:
<223> OTHER INFORMATION: Syntehtic Construct

<400> SEQUENCE: 30
agttgacgga ccccaaaag                                                     19

<210> SEQ ID NO 31
<211> LENGTH: 20
<212> TYPE: DNA
<213> ORGANISM: Artificial Sequence
<220> FEATURE:
<223> OTHER INFORMATION: Synthetic Construct

<400> SEQUENCE: 31
agctggatgc tctcatcagg                                                    20

<210> SEQ ID NO 32
<211> LENGTH: 21
<212> TYPE: DNA
<213> ORGANISM: Artificial Sequence
<220> FEATURE:
<223> OTHER INFORMATION: Synthetic Construct

<400> SEQUENCE: 32
ccaggtagct atggtactcc a                                                  21

<210> SEQ ID NO 33
<211> LENGTH: 21
<212> TYPE: DNA
<213> ORGANISM: Artificial Sequence
<220> FEATURE:
<223> OTHER INFORMATION: Syntehtic Construct

<400> SEQUENCE: 33
gctaccaaac tggctataat c                                                  21

<210> SEQ ID NO 34
<211> LENGTH: 21
<212> TYPE: DNA
<213> ORGANISM: Artificial Sequence
<220> FEATURE:
<223> OTHER INFORMATION: Syntehtic Construct

<400> SEQUENCE: 34
ccctcacact cagatcatct t                                                  21

<210> SEQ ID NO 35
<211> LENGTH: 19
<212> TYPE: DNA
<213> ORGANISM: Artificial Sequence
<220> FEATURE:
<223> OTHER INFORMATION: Synthetic Construct

<400> SEQUENCE: 35
gctacgacgt gggctacag                                                     19

```
<210> SEQ ID NO 36
<211> LENGTH: 20
<212> TYPE: DNA
<213> ORGANISM: Artificial Sequence
<220> FEATURE:
<223> OTHER INFORMATION: Synthetic Construct

<400> SEQUENCE: 36
cagagccaca tgctcctaga                                              20

<210> SEQ ID NO 37
<211> LENGTH: 20
<212> TYPE: DNA
<213> ORGANISM: Artificial Sequence
<220> FEATURE:
<223> OTHER INFORMATION: Synthetic Construct

<400> SEQUENCE: 37
tgtccagctg gtcctttgtt                                              20

<210> SEQ ID NO 38
<211> LENGTH: 20
<212> TYPE: DNA
<213> ORGANISM: Artificial Sequence
<220> FEATURE:
<223> OTHER INFORMATION: Synthetic Construct

<400> SEQUENCE: 38
tctcttccac agcacctgaa                                              20

<210> SEQ ID NO 39
<211> LENGTH: 18
<212> TYPE: DNA
<213> ORGANISM: Artificial Sequence
<220> FEATURE:
<223> OTHER INFORMATION: Synthetic Construct

<400> SEQUENCE: 39
gaacacctcg gcctcctc                                                18

<210> SEQ ID NO 40
<211> LENGTH: 18
<212> TYPE: DNA
<213> ORGANISM: Artificial Sequence
<220> FEATURE:
<223> OTHER INFORMATION: Synthetic Construct

<400> SEQUENCE: 40
ctttgccacg gacgagac                                                18

<210> SEQ ID NO 41
<211> LENGTH: 22
<212> TYPE: DNA
<213> ORGANISM: Artificial Sequence
<220> FEATURE:
<223> OTHER INFORMATION: Synthetic Construct

<400> SEQUENCE: 41
tcattgtact ctgagggctg ac                                           22

<210> SEQ ID NO 42
<211> LENGTH: 20
<212> TYPE: DNA
<213> ORGANISM: Artificial Sequence
<220> FEATURE:
<223> OTHER INFORMATION: Synthetic Construct
```

<400> SEQUENCE: 42
gccccagata tagcattccc                                              20

<210> SEQ ID NO 43
<211> LENGTH: 20
<212> TYPE: DNA
<213> ORGANISM: Artificial Sequence
<220> FEATURE:
<223> OTHER INFORMATION: Synthetic Construct

<400> SEQUENCE: 43
gttcatcctg ttcctgctcc                                              20

<210> SEQ ID NO 44
<211> LENGTH: 23
<212> TYPE: DNA
<213> ORGANISM: Artificial Sequence
<220> FEATURE:
<223> OTHER INFORMATION: Synthetic Construct

<400> SEQUENCE: 44
aatctaccat cctccgtgaa acc                                          23

<210> SEQ ID NO 45
<211> LENGTH: 25
<212> TYPE: DNA
<213> ORGANISM: Artificial Sequence
<220> FEATURE:
<223> OTHER INFORMATION: Synthetic Construct

<400> SEQUENCE: 45
tcagtttagc taccccaag tttaa                                         25

<210> SEQ ID NO 46
<211> LENGTH: 20
<212> TYPE: DNA
<213> ORGANISM: Artificial Sequence
<220> FEATURE:
<223> OTHER INFORMATION: Synthetic Construct

<400> SEQUENCE: 46
tagagggaca agtggcgttc                                              20

<210> SEQ ID NO 47
<211> LENGTH: 18
<212> TYPE: DNA
<213> ORGANISM: Artificial Sequence
<220> FEATURE:
<223> OTHER INFORMATION: Synthetic Construct

<400> SEQUENCE: 47
cgctgagcca gtcagtgt                                                18

<210> SEQ ID NO 48
<211> LENGTH: 25
<212> TYPE: DNA
<213> ORGANISM: Artificial Sequence
<220> FEATURE:
<223> OTHER INFORMATION: Synthetic Construct

<400> SEQUENCE: 48
ctagctcatg tgtcaagacc ctctt                                        25

<210> SEQ ID NO 49
<211> LENGTH: 20

```
<212> TYPE: DNA
<213> ORGANISM: Artificial Sequence
<220> FEATURE:
<223> OTHER INFORMATION: Synthetic Construct

<400> SEQUENCE: 49
gccagcacgt ttctctcgtt                                              20
```

METHODS FOR TREATING MACROPHAGE-MEDIATED DISEASES, AND METHODS OF IDENTIFYING AGENTS USEFUL THEREFORE

CROSS REFERENCE TO RELATED APPLICATION(S)

This application is a national stage entry under 35 U.S.C. § 371 of International Application No. PCT/US2020/016637, filed Feb. 4, 2020, which claims the benefit of priority under 35 U.S.C. § 119 (e) of U.S. Ser. No. 62/801,973, filed Feb. 6, 2019, the entire content of each of which is incorporated herein by reference in its entirety.

GRANT INFORMATION

This invention was made with government support under Grant Nos. AI043477 and ES010337 awarded by the National Institutes of Health. The government has certain rights in the invention.

SEQUENCE LISTING

The instant application contains a Sequence Listing which has been submitted electronically in ASCII format and is hereby incorporated by reference in its entirety. Said ASCII copy, created on Jul. 28, 2021, is named 114198-6022_SL.txt and is 49 kilobytes in size.

BACKGROUND OF THE INVENTION

Field of the Invention

The invention relates generally to inflammation and more specifically to methods and compositions for preventing CTL1 expression or choline phosphorylation to treat inflammation and degenerative diseases.

Background Information

Macrophages respond to pathogens and tissue damage via pattern recognition receptors (PRR) that sense pathogen (PAMP) or damage (DAMP) associated molecular patterns (Guo et al., 2015; Martinon et al., 2009). Amongst PRR, Nod-like receptor pyrin domain containing 3 (NLRP3), a member of the Nod-like receptor (NLR) family that is induced upon macrophage activation, senses cytosolic oxidized mitochondrial DNA (ox-mtDNA) that is generated when activated macrophages are exposed to NLRP3-activating DAMPs, such as ATP or uric acid, and triggers IL-1β and IL-18 production and secretion (Zhong et al., 2018). While NLRP3 serves as its specific sensor subunit, the NLRP3 inflammasome also consists of the adaptor apoptosis-associated speck-like protein containing CARD (ASC), and the effector enzyme pro-caspase-1, which undergoes autocleavage upon inflammasome activation, and is responsible for production of IL-1β and IL-18 (Elliott and Sutterwala, 2015; Martinon et al., 2009; Schroder and Tschopp, 2010).

Given the involvement of the NLRP3 inflammasome and IL-1β in many diseases, including type 2 diabetes, atherosclerosis, gout, rheumatoid arthritis, non-alcoholic steatohepatitis (NASH), lupus, and Alzheimer's disease (Busso and So, 2010; Heneka et al., 2013; Mridha et al., 2017; So and Martinon, 2017; Zhong et al., 2016b), it is not surprising that both initiation and termination of NLRP3 inflammasome activation are intricately regulated (Zhong et al., 2016a).

Choline is an essential human nutrient, serving as precursor for membrane phospholipids, acetylcholine, and functioning as a methyl group donor when metabolized to betaine and subsequently to S-adenosylmethionine (Aoyama et al., 2004; Glunde et al., 2011). Choline uptake is mediated by choline transporters, of which choline-transporter-like proteins (CTL) 1-5 are preferentially used to provide choline to Choline Kinase alpha (ChoKα), the first enzyme in phosphatidylcholine synthesis (Traiffort et al., 2005). Increased circulating choline and its enhanced uptake were observed in inflammatory diseases, including arthritis, cardiovascular diseases, and cancer (Al-Saffar et al., 2006; Glunde et al., 2011; Guma et al., 2015a; Hellberg et al., 2016; Seki et al., 2017). The use of choline as a tracer for enhanced cancer cell proliferation was established a few decades ago. More recently, the observation that activated cells, including fibroblasts and macrophages, take up choline at inflammatory sites suggested that choline may also have other biological functions. A need therefore exists for treatments that prevent or ameliorate macrophage-mediated inflammatory diseases and attenuate their progression.

SUMMARY OF THE INVENTION

The present invention is based on the observation that choline uptake via CTL1 and its phosphorylation by ChoKα and/or ChoKβ contribute to macrophage-mediated IL-1β-dependent inflammation. Thus, inhibition of choline uptake and/or phosphocholine synthesis reduces IL-1β production and ameliorates acute and chronic macrophage-mediated inflammation.

Accordingly, in one aspect, the invention provides a method of treating macrophage-mediated inflammatory and/or degenerative diseases or cancers in a subject. The method includes administering to a subject in need thereof an effective amount of an inhibitor of choline-transporter-like protein 1 (CTL1) activity or expression or an inhibitor of choline phosphorylation. In various embodiments, the inhibitor of CTL1 activity or expression inhibits NLRP3 inflammasome activation, IL-1β production, or IL-18 production. In various embodiments, the subject is a mammal, such as a human. In various embodiments, the inhibitor of CTL1 activity or expression is a small molecule, peptide, antisense oligonucleotide, antibody or antibody fragment. In various embodiments, the inhibitor of choline phosphorylation is an inhibitor of ChoKα or ChoKβ. In various embodiments, the inhibitor of CTL1 activity or expression is an inhibitory nucleic acid that inhibits the expression of CTL1 or inhibits choline phosphorylation. In various embodiments, the inhibitory nucleic acid is selected from the group consisting of siRNA, shRNA, gRNA, oligonucleotides, antisense RNA or ribozymes that inhibit expression of CTL1 or inhibit choline phosphorylation. In various embodiments, the inhibitory nucleic acid is administered via a viral vector. In various embodiments, the macrophage-mediated inflammatory and/or degenerative disease is selected from the group consisting of cancer (especially lung cancer), lupus, gout, rheumatoid arthritis, osteoarthritis, ankylosing spondylitis, uveitis, Alzheimer's disease, Parkinson's disease, cryopyrin-associated periodic syndromes, nonalcoholic steatohepatitis (NASH), type 2 diabetes, atherosclerosis, macular degeneration, and geographical retinopathy.

In another aspect, the invention provides a method of inhibiting choline phosphorylation in a subject. The method includes administering to the subject an effective amount of an inhibitor of CTL1 activity or expression. In various embodiments, the inhibitor of CTL1 activity or expression is a small molecule, peptide, antisense oligonucleotide, antibody or antibody fragment. In various embodiments, the inhibitor of CTL1 activity or expression is an inhibitory nucleic acid that inhibits the expression of expression of CTL1 or inhibits IL-1β and/or IL-18 production. In various embodiments, the inhibitor of choline phosphorylation is an inhibitor of ChoKα or ChoKβ. In various embodiments, the inhibitor nucleic acid is selected from the group consisting of siRNA, shRNA, gRNA, oligonucleotides, antisense RNA or ribozymes that inhibit expression of CTL1 or inhibit IL-1β and/or IL-18 production. In various embodiments, the inhibitory nucleic acid is administered via a viral vector.

In another aspect, the invention provides a method of identifying an agent useful for treating macrophage-mediated inflammatory and/or degenerative diseases. The method includes contacting a sample of cells with at least one test agent, wherein a decrease in CTL1 expression or choline phosphorylation in the presence of the test agent as compared to CTL1 expression or choline phosphorylation in the absence of the test agent identifies the agent as useful for treating macrophage-mediated inflammatory and/or degenerative diseases. In various embodiments, the test agent a small molecule, peptide, antisense oligonucleotide, antibody or antibody fragment. In various embodiments, the method may be performed in a high throughput format, such as contacting samples of cells of a plurality of samples with at least one test agent. In various embodiments, the plurality of samples may be obtained from a single subject or from different subjects.

BRIEF DESCRIPTION OF THE DRAWINGS

FIG. 1A shows the results from QPCR analysis of mRNAs encoding choline transporters and kinases in LPS stimulated BMDM. Mean±SEM (n=8). FIG. 1B shows the results from immunoblot (IB) analysis of CTL1 at 4 hr after LPS stimulation. FIG. 1C shows relative CTL1 protein expression in LPS stimulated BMDM shown as n-fold. Mean±SEM (n=4). FIG. 1D shows intracellular choline in BMDM before and after LPS 4 hr treatment. Mean±SEM (n=4). FIG. 1E shows the results of IB analysis of CTL1, IKKβ and tubulin in WT or IKKβ-deficient LPS-stimulated BMDM. $p<0.01$; *$p<0.005$. Phosphocholine (FIG. 1F), glycero-3-phophocholine (FIG. 1G), and phosphatidylcholine (PC) (FIG. 1H) in were measured by $^1$HMRS in RSM932A-pretreated BMDM stimulated for 4 hr. Mean±SEM (n=4). FIG. 1I shows the results from QPCR analysis of Slc44a1, Slc44a2, ChKa and ChKb mRNAs in LPS-stimulated primary mouse microglia. Mean±SEM (n=5). FIG. 1J shows the results from QPCR analysis of Slc44a1 mRNA in BMS345541-pretreated BMDM and treated with LPS. Mean±SD (n=3). *$p<0.05$; $p<0.01$; *$p<0.005$; ****$p<0.001$.

FIG. 2A shows the results from QPCR analysis of mRNAs encoding choline transporters and kinases in shSlc44a1 and shControl (shCtrl) immortalized BMDM (iBMDM). Mean±SD (n=3). The inserts demonstrate the efficacies of Slc44a1 silencing.

FIGS. 3A-3J are pictorial and graphical diagrams showing that choline kinase knockdown and inhibition reduce IL-1β production. FIG. 3A show IL-1β release by shChoKα and shCtrl iBMDM primed with LPS and stimulated with ATP or MSU. Mean±SD (n=3). FIG. 3B shows IL-1β release by LPS-primed and ATP or MSU-stimulated BMDM pretreated overnight with 5 μM RSM932A. Mean±SD. (n=3). FIG. 3C shows Caspase-1 in supernatants of shChoKα and shCtrl iBMDM that were LPS-primed and ATP-treated. FIG. 3D shows relative caspase 1 activation shown as % of p20 release to culture medium by iBMDM cultured as in FIG. 3C. Mean±SD (n=3). FIG. 3E shows the results of IB analysis of active caspase-1 in supernatants of LPS-primed and ATP-treated BMDM pretreated with RSM932A as indicated. FIG. 3F shows relative caspase 1 activation in cells treated as above. Mean±SEM (n=4). FIG. 3G shows the results of IB analysis of NLRP3 inflammasome subunits in shChoKα and shCtrl iBMDM or (FIG. 3H) BMDM pretreated with RSM932A as indicated. *p<0.05; **p<0.01. FIG. 3I shows that knockdown of single choline kinase isoform does not alter the expression of other isoforms or the NLRP3 inflammasome components. FIG. 3I shows ChoKβ, ChoKα, pro-caspase 1, ASC, NLRP3, pro-IL-1β expression levels in iBMDM treated with or without LPS (100 ng/ml) for 4 hr. FIG. 3J shows shCtrl and shChoKβ iBMDM were primed with 100 ng/ml LPS 4 hr and then treated with 400 mM MSU for 3 hr and 3 mM ATP for 1 hr. Culture supernatant was collected and IL-1β was measured by ELISA.

FIG. 4A shows relative amounts of mitochondrial phospholipids in BMDM before and after LPS (24 hr) stimulation (n=4). FIG. 4X shows succinate accumulation in LPS-stimulated BMDM cultured in control or choline-free medium. Mean±SEM (n=5). *p<0.05; p<0.01; *p<0.005; ****p<0.001.

FIGS. 5A-5T are pictorial and graphical diagrams showing that impaired choline uptake and phosphorylation stimulate mitophagy and inhibit IL-1β production. Mitochondrial membrane potential (Ψm) was measured in (FIG. 5A) shCtrl, shChoKα or (FIG. 5B) RSM932A-pretreated iBMDM by TMRM staining. Mean±SEM (n=5 and 4, respectively). FIG. 5C shows the results from immunofluorescence (IF) analysis of p62 recruitment to mitochondria stained by ATP5B antibody. Scale bar: 10 μm (images representative of three experiments). FIG. 5D shows quantitation of mitochondrial p62 aggregates. Mean±SEM. (n=10 high-magnification fields per treatment in two independent experiments). FIG. 5E shows the results from IF analysis of p62 and DRP1 recruitment to mitochondria in LPS-primed and ATP or nigericin-treated shChoKα and shCtrl iBMDM. Scale bar: 10 μm (images representative of three experiments). FIG. 5H shows the results from IF analysis of p62 recruitment to mitochondria. Scale bar: 20 μm (images representative of two experiments). FIG. 5K shows the results from IB analysis of indicated proteins in mitochondria isolated from RSM932A-pretreated BMDM that were LPS-primed and ATP-stimulated. FIG. 5O shows the results from IB analysis of p62, DRP1 and VDAC in mitochondria isolated from LPS-primed and ATP-treated BMDM cultured in control or choline-free medium. FIGS. 5S and 5T show cytosolic mt-COX-1 and mt-D-Loop content determined by QPCR in (FIG. 5S) shCtrl and shChoKα iBMDM and (FIG. 5T) RSM932A-pretreated BMDM that were LPS-primed and stimulated with ATP or nigericin. Mean±SD (n=3). *p<0.05; p<0.01; *p<0.005; ****p<0.001.

FIGS. 6A-6G are pictorial and graphical diagrams showing that choline kinase inhibition reduces IL-1β production in vivo. FIG. 6A shows that mice were pretreated with the choline kinase inhibitor MN58b (2.5 mg/kg) or vehicle daily for 3 days before intraperitoneal (i.p.) injection of 50 mg/kg LPS. % survival was determined by Kaplan Meyer analysis. (n=6 animals per group). FIG. 6B shows circulating IL-1β measured 3 hr after LPS injection in above mice. Mean±SEM (n=6 animals per group). FIGS. 6C-6E show that air pouches were created by s.c. injection of sterile air. Animals were treated with 2.5 mg/kg MN58b or vehicle 24 hr prior to injection of 3 mg/ml MSU crystals into the pouch. Tissue and intra-pouch wash were collected after 8 hr. FIG. 6C shows the results from IF analysis of cells stained with macrophage marker F4/80 and CTL1 or ChoKα antibodies in skin collected from air pouch after MSU crystals injection. Scale bar 50 μm. FIG. 6D shows pouch cell counts. Mean±SEM. (n=6 mice per group). FIG. 6E shows IL-1β release into pouch cavity. Mean±SEM (n=6 animals per group). *p<0.05; **p<0.01. Circulating TNF (FIG. 6F) and IL-6 (FIG. 6G) 3 hr after LPS injection into mice treated as in FIG. 6A. Mean±SEM (n=6 animals per group). n.s., not significant.

FIGS. 7A-7C show IL-1β release by BMDM from mice containing MWS (FIG. 7A), FCAS (FIG. 7B), and NOMID (FIG. 7C) Nlrp3 mutations. The cells were cultured in control or choline-deficient medium or in the presence of choline kinase inhibitor RSM932A, and stimulated with LPS or in case of FCAS activated at 32° C. Mean±SEM. (n=10, MWS; n=4, FCAS and n=5, NOMID). *p<0.05; *p<0.005; **p<0.001. FIGS. 7D-7K show MWS Nlrp3$^{A350VneoRCreT}$ mice were treated with the choline kinase inhibitor MN58b (2.5 mg/kg) or vehicle BID for 15 days. Citculating leukocytes (FIG. 7D), granulocytes (FIG. 7E), monocytes (FIG. 7F), and lymphocytes (FIG. 7G), were measured. FIG. 7H shows spleen size as % spleen weight of body weight. FIG. 7I shows images of spleens. FIG. 7J shows liver size as % liver weight of body weight. FIG. 7K shows the results from H&E staining of liver tissue from above mice. Mean±SEM. (n=3 vehicle- and n=6 MN58b treatment). *p<0.05; ***p<0.005.

DETAILED DESCRIPTION OF THE INVENTION

Figure 1A:
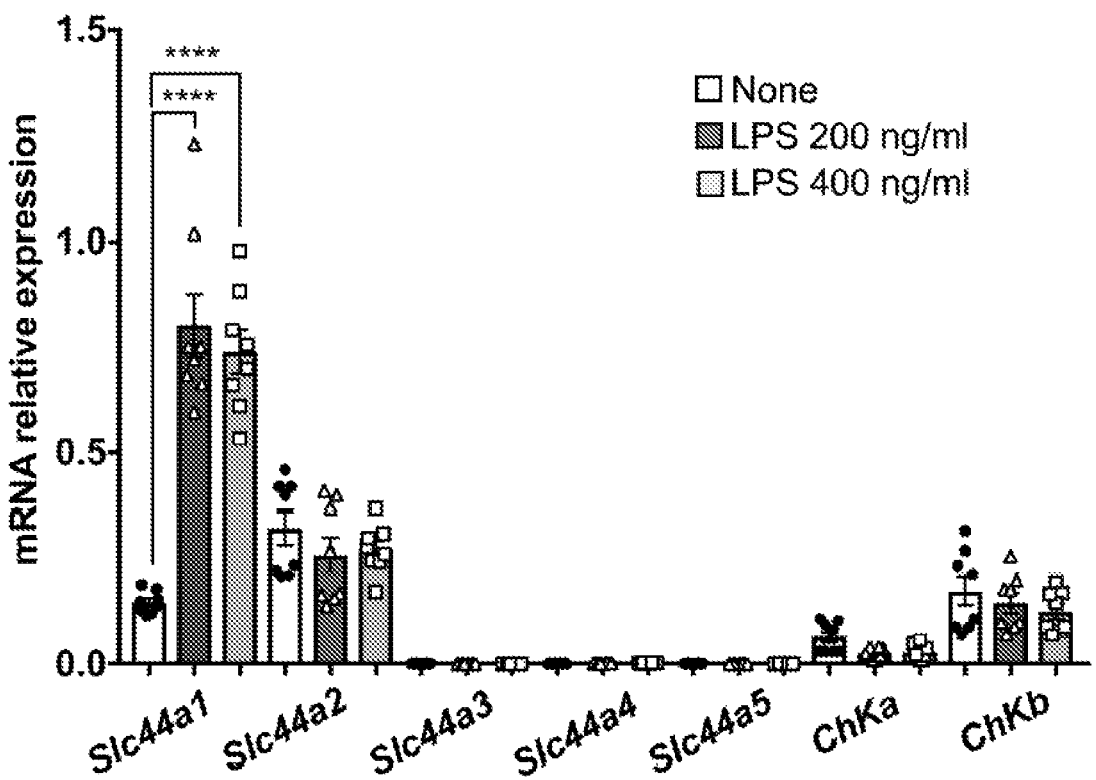
FIGS. 1A-1J are pictorial and graphical diagrams showing that LPS stimulates macrophage choline uptake via NF-κB mediated CTL1 induction.

The present invention is based on the observation that choline uptake via CTL1 and its phosphorylation by ChoKα contribute to macrophage-mediated IL-1β-dependent inflammation. Thus, inhibition of choline uptake and/or phosphocholine synthesis reduces IL-1β production and ameliorates acute and chronic macrophage-mediated inflammation.

Before the present compositions and methods are described, it is to be understood that this invention is not limited to particular compositions, methods, and experimental conditions described, as such compositions, methods, and conditions may vary. It is also to be understood that the terminology used herein is for purposes of describing particular embodiments only, and is not intended to be limiting, since the scope of the present invention will be limited only in the appended claims.

As used in this specification and the appended claims, the singular forms "a", "an", and "the" include plural references unless the context clearly dictates otherwise. Thus, for example, references to "the method" includes one or more methods, and/or steps of the type described herein which will become apparent to those persons skilled in the art upon reading this disclosure and so forth.

The term "comprising," which is used interchangeably with "including," "containing," or "characterized by," is inclusive or open-ended language and does not exclude additional, unrecited elements or method steps. The phrase "consisting of" excludes any element, step, or ingredient not specified in the claim. The phrase "consisting essentially of" limits the scope of a claim to the specified materials or steps and those that do not materially affect the basic and novel characteristics of the claimed invention. The present disclosure contemplates embodiments of the invention compositions and methods corresponding to the scope of each of these phrases. Thus, a composition or method comprising recited elements or steps contemplates particular embodiments in which the composition or method consists essentially of or consists of those elements or steps.

Unless defined otherwise, all technical and scientific terms used herein have the same meaning as commonly understood by one of ordinary skill in the art to which this invention belongs. Although any methods and materials similar or equivalent to those described herein can be used in the practice or testing of the invention, the preferred methods and materials are now described.

The term "subject" as used herein refers to any individual or patient to which the subject methods are performed. Generally the subject is human, although as will be appreciated by those in the art, the subject may be an animal. Thus other animals, including mammals such as rodents (including mice, rats, hamsters and guinea pigs), cats, dogs, rabbits, farm animals including cows, horses, goats, sheep, pigs, etc., and primates (including monkeys, chimpanzees, orangutans and gorillas) are included within the definition of subject.

A subject "in need" of treatment with the invention's methods includes a subject that is "suffering from disease," i.e., a subject that is experiencing and/or exhibiting one or more symptoms of the disease, and a subject "at risk" of the disease. A subject "in need" of treatment includes animal models of the disease. A subject "at risk" of disease refers to a subject that is not currently exhibiting disease symptoms and is predisposed to expressing one or more symptoms of the disease. This predisposition may be genetic based on family history, genetic factors, environmental factors such as exposure to detrimental compounds present in the environment, etc.). It is not intended that the present invention be limited to any particular signs or symptoms. Thus, it is intended that the present invention encompass subjects that are experiencing any range of disease, from sub-clinical symptoms to full-blown disease, wherein the subject exhibits at least one of the indicia (e.g., signs and symptoms) associated with the disease.

As used herein, a "non-human mammal" may be any animal as long as it is other than human, and includes a transgenic animal and animals for which a production method of ES cells and/or iPS cells has been established. For example, rodents such as mouse, rat, hamster, guinea pig, rabbit, swine, bovine, goat, horse, sheep, dog, cat, or monkey are envisioned as non-human mammals.

The term "administering" to a subject means delivering a molecule, drug, or composition to a subject. "Administering" a composition to a subject in need of reducing a disease and/or of reducing one or more disease symptoms includes prophylactic administration of the composition (i.e., before the disease and/or one or more symptoms of the disease are detectable) and/or therapeutic administration of the composition (i.e., after the disease and/or one or more symptoms of the disease are detectable). When the methods described herein include administering a combination of a first composition and a second composition, the first and second compositions may be administered simultaneously at substantially the same time, and/or administered sequentially at different times in any order (first composition followed second composition, or second composition followed by first composition). For example, administering the second composition substantially simultaneously and sequentially in any order includes, for example, (a) administering the first and second compositions simultaneously at substantially the same time, followed by administering the first composition then the second composition at different times, (b) administering the first and second compositions simultaneously at substantially the same time, followed by administering the second composition then the first composition at different times, (c) administering the first composition then the second composition at different times, followed by administering the first and second compositions simultaneously at substantially the same time, and (d) administering the second composition then the first composition at different times, followed by administering the first and second compositions simultaneously at substantially the same time.

As used herein, an "effective amount" is an amount of a substance or molecule sufficient to effect beneficial or desired clinical results including alleviation or reduction in any one or more of the symptoms associated with macrophage-mediated inflammation such as, but not limited to, cancer, lupus, gout, rheumatoid arthritis, osteoarthritis, ankylosing spondylitis, uveitis, Alzheimer's disease, Parkinson's disease, cryopyrin-associated periodic syndromes, nonalcoholic steatohepatitis (NASH), type 2 diabetes, atherosclerosis, macular degeneration, and many more inflammatory and degenerative diseases. For purposes of this invention, an effective amount of a compound or molecule of the invention is an amount sufficient to reduce the signs and symptoms associated with such disorders. In some embodiments, the "effective amount" may be administered before, during, and/or after any treatment regimens for the above-mentioned diseases.

The terms "reduce," "inhibit," "diminish," "suppress," "decrease," and grammatical equivalents when used in reference to the level of any molecule (e.g., amino acid sequence, and nucleic acid sequence, antibody, etc.), cell (e.g., B cell, T cell, tumor cell), and/or phenomenon (e.g., disease symptom), in a first sample (or in a first subject) relative to a second sample (or relative to a second subject), mean that the quantity of molecule, cell and/or phenomenon in the first sample (or in the first subject) is lower than in the second sample (or in the second subject) by any amount that is statistically significant using any art-accepted statistical method of analysis.

The terms "increase," "elevate," "raise," and grammatical equivalents (including "higher," "greater," etc.) when used in reference to the level of any molecule (e.g., amino acid sequence, and nucleic acid sequence, antibody, etc.), cell (e.g., B cell, T cell, tumor cell), and/or phenomenon (e.g., disease symptom), in a first sample (or in a first subject) relative to a second sample (or relative to a second subject), mean that the quantity of the molecule, cell and/or phenomenon in the first sample (or in the first subject) is higher than in the second sample (or in the second subject) by any amount that is statistically significant using any art-accepted statistical method of analysis.

As used herein, "treatment" is an approach for obtaining beneficial or desired clinical results. For purposes of this invention, beneficial or desired clinical results include, but are not limited to, treatment of macrophage-mediated inflammation.

As used herein, the term "cancer" refers to a plurality of cancer cells that may or may not be metastatic, such as prostate cancer, liver cancer, bladder cancer, skin cancer (e.g., cutaneous, melanoma, basal cell carcinoma, Kaposi's sarcoma, etc.), ovarian cancer, breast cancer, lung cancer, cervical cancer, pancreatic cancer, colon cancer, stomach cancer, esophagus cancer, mouth cancer, tongue cancer, gum cancer, muscle cancer, heart cancer, bronchial cancer, testis cancer, kidney cancer, endometrium cancer, and uterus cancer. Cancer may be a primary cancer, recurrent cancer, and/or metastatic cancer. The place where a cancer starts in the body is called the "primary cancer" or "primary site." If cancer cells spread to another part of the body the new area of cancer is called a "secondary cancer" or a "metastasis." "Recurrent cancer" means the presence of cancer after treatment and after a period of time during which the cancer cannot be detected. The same cancer may be detected at the primary site or somewhere else in the body, e.g., as a metastasis.

As used herein, the term "cancer cell" refers to a cell undergoing early, intermediate or advanced stages of multi-step neoplastic progression as previously described (Pitot et al., Fundamentals of Oncology, 15-28 (1978)). This includes cells in early, intermediate and advanced stages of neoplastic progression including "pre-neoplastic" cells (i.e., "hyperplastic" cells and dysplastic cells), and neoplastic cells in advanced stages of neoplastic progression of a dysplastic cell.

As used herein, a "metastatic" cancer cell refers to a cancer cell that is translocated from a primary cancer site (i.e., a location where the cancer cell initially formed from a normal, hyperplastic or dysplastic cell) to a site other than the primary site, where the translocated cancer cell lodges and proliferates.

As used herein, the term "genetic modification" is used to refer to any manipulation of an organism's genetic material in a way that does not occur under natural conditions. Methods of performing such manipulations are known to those of ordinary skill in the art and include, but are not limited to, techniques that make use of vectors for transforming cells with a nucleic acid sequence of interest. Included in the definition are various forms of gene editing in which DNA is inserted, deleted or replaced in the genome of a living organism using engineered nucleases, or "molecular scissors." These nucleases create site-specific double-strand breaks (DSBs) at desired locations in the genome. The induced double-strand breaks are repaired through nonhomologous end-joining (NHEJ) or homologous recombination (HR), resulting in targeted mutations (i.e., edits). There are several families of engineered nucleases used in gene editing, for example, but not limited to, meganucleases, zinc finger nucleases (ZFNs), transcription activator-like effector-based nucleases (TALEN), and the CRISPR-Cas system.

As used herein, the term "test agent" or "candidate agent" refers to an agent that is to be screened in one or more of the assays described herein. The agent can be virtually any chemical compound. It can exist as a single isolated compound or can be a member of a chemical (e.g., combinatorial) library. In one embodiment, the test agent is a small organic molecule. The term small organic molecule refers to any molecules of a size comparable to those organic molecules generally used in pharmaceuticals. The term excludes biological macromolecules (e.g., proteins, nucleic acids, etc.). In certain embodiments, small organic molecules range in size up to about 5000 Da, up to 2000 Da, or up to about 1000 Da.

As used herein, the terms "sample" and "biological sample" refer to any sample suitable for the methods provided by the present invention. In one embodiment, the biological sample of the present invention is a tissue sample, e.g., a biopsy specimen such as samples from needle biopsy (i.e., biopsy sample). In other embodiments, the biological sample of the present invention is a sample of bodily fluid, e.g., serum, plasma, sputum, lung aspirate, urine, and ejaculate.

The term "antibody" is meant to include intact molecules of polyclonal or monoclonal antibodies, chimeric, single chain, and humanized antibodies, as well as fragments thereof, such as Fab and F(ab')2, Fv and SCA fragments which are capable of binding an epitopic determinant. Monoclonal antibodies are made from antigen containing fragments of the protein by methods well known to those skilled in the art (Kohler, et al., Nature, 256:495, 1975). An Fab fragment consists of a monovalent antigen binding fragment of an antibody molecule, and can be produced by digestion of a whole antibody molecule with the enzyme papain, to yield a fragment consisting of an intact light chain and a portion of a heavy chain. An Fab' fragment of an antibody molecule can be obtained by treating a whole antibody molecule with pepsin, followed by reduction, to yield a molecule consisting of an intact light chain and a portion of a heavy chain. Two Fab' fragments are obtained per antibody molecule treated in this manner. An (Fab')2 fragment of an antibody can be obtained by treating a whole antibody molecule with the enzyme pepsin, without subsequent reduction. A (Fab')2 fragment is a dimer of two Fab' fragments, held together by two disulfide bonds. An Fv fragment is defined as a genetically engineered fragment containing the variable region of a light chain and the variable region of a heavy chain expressed as two chains. A single chain antibody ("SCA") is a genetically engineered single chain molecule containing the variable region of a light chain and the variable region of a heavy chain, linked by a suitable, flexible polypeptide linker.

The terms "specifically binds" and "specific binding" when used in reference to the binding of an antibody to a target molecule (e.g., peptide) or to a target cell (e.g., immunosuppressive B cells), refer to an interaction of the antibody with one or more epitopes on the target molecule or target cell where the interaction is dependent upon the presence of a particular structure on the target molecule or target cell. For example, if an antibody is specific for epitope "A" on the target cell, then the presence of a protein containing epitope A (or free, unlabeled A) in a reaction containing labeled "A" and the antibody will reduce the amount of labeled A bound to the antibody. In various embodiments, the level of binding of an antibody to a target molecule or target cell is determined using the "IC50," i.e., "half maximal inhibitory concentration" that refer to the concentration of a substance (e.g., inhibitor, antagonist, etc.) that produces a 50% inhibition of a given biological process, or a component of a process (e.g., an enzyme, antibody, cell, cell receptor, microorganism, etc.). It is commonly used as a measure of an antagonist substance's potency.

Reference herein to "normal cells" or "corresponding normal cells" means cells that are from the same organ and of the same type as any of the above-mentioned disease cell type. In one aspect, the corresponding normal cells comprise a sample of cells obtained from a healthy individual. Such corresponding normal cells can, but need not be, from an individual that is age-matched and/or of the same sex as the individual providing the above-mentioned disease cells being examined. In another aspect, the corresponding normal cells comprise a sample of cells obtained from an otherwise healthy portion of tissue of a subject having a macrophage-mediated inflammatory and/or degenerative disease.

The terms "choline transporter-like protein 1" and "CTL1" refer to a protein that in humans is encoded by the SLC44A1 gene. The human CTL1 amino acid sequence is exemplified by SEQ ID NO: 1.

The terms "choline kinase" and "ChoK" (also known as choline phosphokinase) refer to an enzyme that catalyzes the first reaction in the chline pathway for phophatidylcholine (PC) biosynthesis. In mammalian cells, the enzyme exists as three isoforms: CKα-1, CKα-2 and CKβ. The human ChoKα and ChoKβ amino acid sequences are exemplified by SEQ ID NOs: 2 and 4, respectively.

The terms "interleukin-1 beta" and "IL-1β" (also known as leukocytic pyrogen, leukocytic endogenous mediator, mononuclear cell factor, and lymphocyte activating factor) refer to a cytokine that is produced by activated macrophages as a proprotein, which is proteolytically processed to its active form by caspase 1 (CASP1/ICE). This cytokine is an important mediator of the inflammatory response, and is involved in a variety of cellular activities, including cell proliferation, differentiation, and apoptosis. The human interleukin-1 beta amino acid sequence is exemplified by SEQ ID NO: 5.

The terms "interleukin-18" and "IL-18" (also known as interferon-gamma inducing factor) refer to a cytokine produced mainly by macrophages but also other cell types, stimulates various cell types and has pleiotropic functions. IL-18 is a proinflammatory cytokine that facilitates type 1 responses. Together with IL-12, it induces cell-mediated immunity following infection with microbial products like lipopolysaccharide (LPS). The human interleukin-18 amino acid sequence is exemplified by SEQ ID NO: 6.

The terms "interleukin 10" and "IL-10" (also known as CSIF; TGIF; GVHDS; IL10A) refer to a cytokine produced primarily by monocytes and to a lesser extent by lymphocytes. This cytokine has pleiotropic effects in immunoregulation and inflammation. It down-regulates the expression of Th1 cytokines, MHC class II Ags, and costimulatory molecules on macrophages. It also enhances B cell survival, proliferation, and antibody production. The human interleukin 10 amino acid sequence is exemplified by SEQ ID NO: 6.

The terms "interleukin-6" or "IL-6" refer to a cytokine that is a known mediator of fever and of acute phase responses. IL-6 can be secreted by macrophages in response to specific microbial molecules, referred to as pathogen-associated molecular patterns (PAMPs). These PAMPs bind to an important group of detection molecules of the innate immune system, called pattern recognition receptors (PRRs), including Toll-like receptors (TLRs). These are present on the cell surface and intracellular compartments and induce intracellular signaling cascades that give rise to inflammatory cytokine production. The human interleukin 10 amino acid sequence is exemplified by SEQ ID NO: 7.

The terms "NLR Family Pyrin Domain Containing 3" and "NLRP3" refer to a specific protein coding gene. Diseases associated with NLRP3 include, but are not limited to, Muckle-Wells Syndrome and Cinca Syndrome. Among its related pathways are NOD-like receptor signaling pathway and Nucleotide-binding domain, leucine rich repeat containing receptor (NLR) signaling pathways. NACHT, LRR and PYD domains-containing protein 3 (NALP3), also known as cryopyrin, is a protein that in humans is encoded by the NLRP3 gene located on the long arm of chromosome 1. NALP3 is expressed predominantly in macrophages and as a component of the inflammasome and detects products of damaged cells such as extracellular ATP and crystalline uric acid. Activated NALP3 in turn triggers an immune response. Mutations in the NLRP3 gene are associated with a number of organ specific autoimmune diseases. The human NALP3 amino acid sequence is exemplified by SEQ ID NO: 8.

The terms "inhibitor of nuclear factor kappa-B kinase subunit beta" and "IKKθ" refer to an enzyme that serves as a protein subunit of IκB kinase, which is a component of the cytokine-activated intracellular signaling pathway involved in triggering immune responses. Activated IKK-β phosphorylates a protein called the inhibitor of NF-κB, IκB (IκBα), which binds NF-κB to inhibit its function. Phosphorylated IκB is degraded via the ubiquitination pathway, freeing NF-κB, and allowing its entry into the nucleus of the cell where it activates various genes involved in inflammation and other immune responses. The human IKKβ amino acid sequence is exemplified by SEQ ID NO: 10.

Choline is a vitamin-like nutrient that is taken up via specific transporters and metabolized by choline kinase (ChoKα) which converts it to phosphocholine needed for de novo synthesis of phosphatidylcholine (PC), the main phospholipid of cellular membranes. Enhanced choline uptake was detected in cells within inflammatory sites, including tumors, inflamed joints, and atherosclerotic plaques (Hellberg et al., 2016; Matter et al., 2006; Roivainen et al., 2003; Schwarz et al., 2016). However, the biological impact of choline uptake and phosphorylation has only been studied in cancer, where choline feeds the phospholipid pool required for cell proliferation and migratory/invasive behavior (Al-Saffar et al., 2006; Glunde et al., 2011). Tracer studies demonstrated that under pathological inflammatory conditions choline is taken up by macrophages (Hellberg et al., 2016; Matter et al., 2006; Roivainen et al., 2003; Schwarz et al., 2016), but the effect of choline uptake on macrophage biology was heretofore unknown.

It has been found that Toll-like receptor (TLR) activation enhances choline uptake by macrophages (TLR4-mediated macrophage activation) and microglia resulting in upregulation of choline uptake due to NF-κB-dependent induction of the choline transporter CTL1. The newly taken up choline is rapidly converted to phosphatidylcholine via the Kennedy pathway (McMaster, 2018). Inhibition of CTL1 expression or ChoKα-mediated choline mobilization results in altered mitochondrial phospholipid composition and accumulation of defective mitochondria, that are rapidly eliminated through mitophagy. These results strongly suggest that choline uptake is essential for phospholipid remodeling and maintenance of mitochondrial function and integrity in metabolically challenged/stressed macrophages.

Macrophage activation involves extensive metabolic reprogramming, a glycolytic switch, elevated ROS production, and phospholipid remodeling that are needed for coping with the energetic cost of inflammatory cytokine production and bactericidal activity, and to ensure proper membrane fluidity and plasticity (Chu, 1992; Grove et al., 1990; O'Neill et al., 2016; Tian et al., 2008; West et al., 2011). Ablation of macrophage choline cytidylyltransferase a (CCTα), which uses phosphocholine to generate CDP-choline, in the second step of the Kennedy pathway reduces phosphatidylcholine amounts with a subsequent decrease in accumulation of diacylglycerol (DAG), which interferes with TNF secretion (Tian et al., 2008). Unlike TNF and IL-6, bioactive IL-1β is not secreted via the classical secretory pathway. IL-1β and IL-18 production and release require macrophage priming, during which pro-IL-1β, pro-IL18 and the critical inflammasome sensor NLRP3 are made. Next, a variety of secondary stimuli, such as ATP, MSU crystals, microbial toxins, and various microcrystals and microfibers, all of which cause mitochondrial damage (Zhou et al., 2011), ROS production (West et al., 2011), the release of ox-mtDNA fragments (Zhong et al., 2018) trigger NRLP3 inflammasome assembly and activation. This results in conversion of pro-IL-1β and pro-IL18 to their mature forms, which are released from activated macrophages by a non-traditional protein secretion. Defective choline uptake or inhibition of phosphocholine synthesis interfere with IL-1β and IL-18 production by accelerating mitophagy and diminishing the cytosolic release of the ultimate NLRP3 inflammasome activator ox-mtDNA. Since sustained NLRP3 inflammasome activation and IL-1β production require some form of mitochondrial damage, ongoing mtROS production, and new mtDNA synthesis (Zhong et al., 2018), it appears that proper phosphatidylcholine synthesis is needed for maintaining mitochondrial membrane integrity after LPS priming, thereby preventing excessive damage that could result in defective ATP production and upregulation of AMPK-dependent mitophagy.

The effect of choline deficiency has been studied in liver. Mice fed a choline-deficient diet show alterations in hepatocyte mitochondrial membrane composition, and undergo depletion of phosphatidylcholine and phosphatidylethanolamine (Guo et al., 2005; Teodoro et al., 2008). These changes cause loss of mitochondrial membrane potential and reduced activity of the electron transport chain complex I and V (Guo et al., 2005; James et al., 1992). In choline-deficient macrophages, mitochondrial phosphatidylcholine and sphingomyelin are significantly reduced, mitochondrial membrane potential drops and ATP synthase, a part of complex V, activity declines. Of note, LPS also altered mitoPC and mitoSM and reduced ATP synthase activity, events that were strongly modified by choline deficiency. Choline taken up after LPS stimulation may maintain mitochondrial integrity and function, thereby preserving residual ATP synthase activity needed for IL-1β production, a suggestion that is consistent with previous observations (Mills et al., 2016). The reduction in ATP synthase activity caused by choline deficiency is accompanied by accumulation of ATPIF1, a protein that not only inhibits the forward ATP synthase activity of complex V but also blocks the reverse reaction, in which ATP is hydrolyzed (Campanella et al., 2009). This protective response prevents excessive ATP expenditure during times of reduced mitochondrial ATP synthesis. At the same time, this response attenuates ROS production caused by ATP hydrolysis and reverse electron transport (Campanella et al., 2009). Although it is not currently known how choline deficiency and reduced mitoPC and mitoSM content affects mitochondrial function, without being bound by theory, it is plausible that changes in mitochondrial membrane composition interfere with complex V assembly or function without increasing mtROS production. It is also plausible that intracellular choline or its phosphorylated form, phosphocholine, are sensed by a mitochondrial protein, which induces protective responses that prevent mitochondrial failure during reduced phosphocholine availability.

Alternatively, insufficient cellular phosphatidylcholine interferes with ongoing membrane synthesis needed for maintenance of mitochondrial integrity. A regulatory role for membrane lipid composition in activated macrophages was also proposed by others. Phosphatidylinositol-4-phosphate in the trans-Golgi network (Chen and Chen, 2018) and cholesterol uptake and distribution in ER membranes (de la Roche et al., 2018) also contribute to NLRP3 inflammasome activation. Reduced mitochondrial ATP production results in decreased cellular ATP, elevated AMP/ATP ratio and activation of AMPK, which stimulates initiation of autophagy and accelerates mitophagic clearance of defective mitochondria. LPS stimulation rapidly represses AMPK activation, but the effect is transient and at later time points AMPK is activated in part via LPS-induced IL-10 to balance the energy and metabolic demands of activated macrophages (Ip et al., 2017; Nomura et al., 2015). Active AMPK downregulates inflammation, in part through inhibition of IL-1β production (Cordero et al., 2018; Guma et al., 2015b; Wang et al., 2016). In addition, it has recently been shown that mitophagy removes damaged mitochondria that release ox-mtDNA, needed for NLRP3 inflammasome activation (Zhong et al., 2018; Zhong et al., 2016c). AMPK stimulates mitophagy both through phosphorylation and activation of ULK1 (Egan et al., 2011), and by enhancing translocation of DRP1 to mitochondria (Toyama et al., 2016). Indeed, in the absence of AMPK, choline deprivation has no effect whatsoever on IL-1β production and secretion, due to DRP1 sequestration in the cytosol leading to defective mitophagy.

Prophylaxis with antibiotics is used to prevent septicemia; however, 40% to 50% of microorganisms at infection sites are antibiotic resistant (Li and Webster, 2018). Notably, prophylactic treatment with ChoKα inhibitor protects mice from lethal septic shock. ChoKα inhibition reduces IL-1β production and ameliorates MWS, a genetic disease caused by constitutive NLRP3 inflammasome activation, which so far can only be treated with IL-1 sequestering antibodies and decoy receptors. These results also indicate that ChoKα inhibitors may be useful for reducing IL-1β production in other diseases associated with excessive NLRP3 inflammasome activation, such as osteoarthritis, gout, diabetes, and the metabolic syndrome. Recently, it was found that in addition to decreasing the incidence of recurrent vascular events in atherosclerotic patients, treatment with an IL-1β blocking antibody led to reduced lung cancer incidence and mortality (Ridker et al., 2017a; Ridker et al., 2017b). Curiously, lung cancer is a type of cancer in which ChoKα is overexpressed, and is associated with high risk of recurrence (Huang et al., 2015; Ramirez de Molina et al., 2007). ChoKα inhibitors may exert a similar effect and an added benefit due to a more direct effect on cancer cell proliferation.

Accordingly, the present study links choline metabolism to the control of NLRP3 inflammasome dependent inflammation. The results implicate mitochondrial phospholipid remodeling as a key mechanism for preserving residual mitochondrial ATP synthase activity during the glycolytic switch that accompanies macrophage activation. The results provided herein indicate that CTL1 induction and elevated phosphocholine synthesis are important features of so-called macrophage priming, a process that enables macrophages to respond to a variety of NLRP3 activating challenges with IL-1β and IL-18 production and release.

Thus, in one aspect, the invention provides a method of treating macrophage-mediated inflammatory and/or degenerative diseases in a subject in need thereof. The method includes administering to the subject an effective amount of an inhibitor of phosphocholine synthesis. In various embodiments, the inhibitor of phosphocholine synthesis may be an inhibitor of CTL1 activity or expression, an inhibitor of choline phosphorylation, an inhibitor of ChoKα activity or expression, an inhibitor of ChoKβ activity or expression, or an inhibitor of IL-1β and/or IL-18 production. In various embodiments, the inhibitor may be a small molecule, peptide, antisense oligonucleotide, guide RNA, shRNA, antibody or antibody fragment.

In various embodiments, the inhibitor of CTL1 activity or expression, inhibitor of choline phosphorylation, inhibitor of ChoKα activity or expression, and/or inhibitor of ChoKβ activity or expression is an inhibitory nucleic acid that specifically inhibits expression of CTL1 and/or inhibits ChoKα activation and/or inhibits ChoKβ activation. As used herein, an "inhibitory nucleic acid" means an RNA, DNA, or a combination thereof that interferes or interrupts the translation of mRNA. Inhibitory nucleic acids can be single or double stranded. The nucleotides of the inhibitory nucleic acid can be chemically modified, natural or artificial. The terms "short-inhibitory RNA" and "siRNA" interchangeably refer to short double-stranded RNA oligonucleotides that mediate RNA interference (also referred to as "RNA-mediated interference" or "RNAi"). The terms "small hairpin RNA" and "shRNA" interchangeably refer to an artificial RNA molecule with a tight hairpin turn that can be used to silence target gene expression via RNAi. RNAi is a highly conserved gene silencing event functioning through targeted destruction of individual mRNA by a homologous double-stranded small interfering RNA (siRNA) (Fire, A. et al., Nature 391:806-811 (1998)). Mechanisms for RNAi are reviewed, for example, in Bayne and Allshire, Trends in Genetics (2005) 21:370-73; Morris, Cell Mol Life Sci (2005) 62:3057-66; Filipowicz, et al., Current Opinion in Structural Biology (2005) 15:331-41.

Methods for the design of siRNA or shRNA target sequences have been described in the art. Among the factors to be considered include: siRNA target sequences should be specific to the gene of interest and have about 20-50% GC content (Henshel et al., Nucl. Acids Res., 32: 113-20 (2004); G/C at the 5' end of the sense strand; A/U at the 5' end of the antisense strand; at least 5 A/U residues in the first 7 bases of the 5' terminal of the antisense strand; and no runs of more than 9 G/C residues (Ui-Tei et al., Nucl. Acids Res., 3: 936-48 (2004)). Additionally, primer design rules specific to the RNA polymerase will apply. For example, for RNA polymerase III, the polymerase that transcribes from the U6 promoter, the preferred target sequence is 5'-GN18-3'. Runs of 4 or more Ts (or As on the other strand) will serve as terminator sequences for RNA polymerase III and should be avoided. In addition, regions with a run of any single base should be avoided (Czaudema et al., Nucl. Acids Res., 31: 2705-16 (2003)). It has also been generally recommended that the mRNA target site be at least 50-200 bases downstream of the start codon (Sui et al., Proc. Natl. Acad. Sci. USA, 99: 5515-20 (2002); Elbashir et al., Methods, 26: 199-213 (2002); Duxbury and Whang, J. Surg. Res., 117: 339-44 (2004) to avoid regions in which regulatory proteins might bind. Additionally, a number of computer programs are available to aid in the design of suitable siRNA and shRNAs for use in suppressing expression of choline-transporter-like protein 1 (CTL1) or inhibiting choline phosphorylation.

Ribozymes that cleave mRNA at site-specific recognition sequences can be used to destroy target mRNAs, particularly through the use of hammerhead ribozymes. Hammerhead ribozymes cleave mRNAs at locations dictated by flanking regions that form complementary base pairs with the target mRNA. Preferably, the target mRNA has the following sequence of two bases: 5'-UG-3'. The construction and production of hammerhead ribozymes is well known in the art.

Gene targeting ribozymes may contain a hybridizing region complementary to two regions, each of at least 5 and preferably each of 6, 7, 8, 9, 10, 11, 12, 13, 14, 15, 16, 17, 18, 19 or 20 contiguous nucleotides in length of a target mRNA. In addition, ribozymes possess highly specific endoribonuclease activity, which autocatalytically cleaves the target sense mRNA.

With regard to antisense, siRNA or ribozyme oligonucleotides, phosphorothioate oligonucleotides can be used. Modifications of the phosphodiester linkage as well as of the heterocycle or the sugar may provide an increase in efficiency. Phophorothioate is used to modify the phosphodiester linkage. An N3'-P5' phosphoramidate linkage has been described as stabilizing oligonucleotides to nucleases and increasing the binding to RNA. Peptide nucleic acid (PNA) linkage is a complete replacement of the ribose and phosphodiester backbone and is stable to nucleases, increases the binding affinity to RNA, and does not allow cleavage by RNAse H. Its basic structure is also amenable to modifications that may allow its optimization as an antisense component. With respect to modifications of the heterocycle, certain heterocycle modifications have proven to augment antisense effects without interfering with RNAse H activity. An example of such modification is C-5 thiazole modification. Finally, modification of the sugar may also be considered. 2'-O-propyl and 2'-methoxyethoxy ribose modifications stabilize oligonucleotides to nucleases in cell culture and in vivo.

CRISPR (Clustered Regularly Interspaced Short Palindromic Repeats) is an acronym for DNA loci that contain multiple, short, direct repetitions of base sequences. The prokaryotic CRISPR/Cas system has been adapted for use as gene editing (silencing, enhancing or changing specific genes) for use in eukaryotes (see, for example, Cong, Science, 15:339(6121):819-823 (2013) and Jinek, et al., Science, 337(6096):816-21 (2012)). By transfecting a cell with elements including a Cas gene and specifically designed CRISPRs, nucleic acid sequences can be cut and modified at any desired location. Methods of preparing compositions for use in genome editing using the CRISPR/Cas systems are described in detail in US Pub. No. 2016/0340661, US Pub. No. 20160340662, US Pub. No. 2016/0354487, US Pub. No. 2016/0355796, US Pub. No. 20160355797, and WO 2014/018423, which are specifically incorporated by reference herein in their entireties.

Thus, as used herein, "CRISPR system" refers collectively to transcripts and other elements involved in the expression of or directing the activity of CRISPR-associated ("Cas") genes, including sequences encoding a Cas gene, a tracr (trans-activating CRISPR) sequence (e.g., tracrRNA or an active partial tracrRNA), a tracr-mate sequence (encompassing a "direct repeat" and a tracrRNA-processed partial direct repeat in the context of an endogenous CRISPR system), a guide sequence (also referred to as a "spacer", "guide RNA" or "gRNA" in the context of an endogenous CRISPR system), or other sequences and transcripts from a CRISPR locus. One or more tracr mate sequences operably linked to a guide sequence (e.g., direct repeat-spacer-direct repeat) can also be referred to as "pre-crRNA" (pre-CRISPR RNA) before processing or crRNA after processing by a nuclease.

There are many resources available for helping practitioners determine suitable target sites once a desired DNA target sequence is identified. For example, numerous public resources, including a bioinformatically generated list of about 190,000 potential sgRNAs, targeting more than 40% of human exons, are available to aid practitioners in selecting target sites and designing the associate sgRNA to affect a nick or double strand break at the site. See also, crispr.u-psud.fr, a tool designed to help scientists find CRISPR targeting sites in a wide range of species and generate the appropriate crRNA sequences.

Inhibitory nucleic acids, such as siRNA, shRNA, ribozymes, or antisense molecules, can be synthesized and introduced into cells using methods known in the art. Molecules can be synthesized chemically or enzymatically in vitro (Micura, Agnes Chem. Int. Ed. Emgl. 41 2265-9 (2002); Paddison et al., Proc. Natl. Acad. Sci. USA, 99:1443-8 2002) or endogenously expressed inside the cells in the form of shRNAs (Yu et al., Proc. Natl. Acad. Sci. USA, 99:6047-52 (2002); McManus et al., RNA 8, 842-50 (2002)). Plasmid-based expression systems using RNA polymerase III U6 or H1, or RNA polymerase II U1, small nuclear RNA promoters, have been used for endogenous expression of shRNAs (Brummelkamp et al., Science, 296:550-3 (2002); Sui et al., Proc. Natl. Acad. Sci. USA, 99:5515-20 (2002); Novarino et al., J. Neurosci., 24: 5322-30 (2004)). Synthetic siRNAs can be delivered by electroporation or by using lipophilic agents (McManus et al., RNA 8, 842-50 (2002); Kishida et al., J. Gene Med., 6: 105-10 (2004)). Alternatively, plasmid systems can be used to stably express small hairpin RNAs (shRNA) for the suppression of target genes (Dykxhoorn et al., Nat. Rev. Mol. Biol., 4:457-67 (2003)). Various viral delivery systems have been developed to deliver shRNA-expressing cassettes into cells that are difficult to transfect (Brummelkamp et al., Cancer Cell, 2: 243-7 (2002); Rubinson et al., Nat. Genet., 33: 401-6 2003). Furthermore, siRNAs can also be delivered into live animals. (Hasuwa et al., FEBS Lett., 532, 227-30 (2002); Carmell et al., Nat. Struct. Biol., 10: 91-2 (2003); Kobayashi et al., J. Pharmacol. Exp. Ther., 308:688-93 (2004)).

Inhibitory oligonucleotides can be delivered to a cell by direct transfection or transfection and expression via an expression vector. Appropriate expression vectors include mammalian expression vectors and viral vectors, into which has been cloned an inhibitory oligonucleotide with the appropriate regulatory sequences including a promoter to result in expression of the antisense RNA in a host cell. Suitable promoters can be constitutive or development-specific promoters. Transfection delivery can be achieved by liposomal transfection reagents, known in the art (e.g., Xtreme transfection reagent, Roche, Alameda, Calif.; Lipofectamine formulations, Invitrogen, Carlsbad, Calif.). Delivery mediated by cationic liposomes, by retroviral vectors and direct delivery are efficient. Another possible delivery mode is targeting using antibody to cell surface markers for the target cells.

In some embodiments, one or more vectors driving expression of one or more elements of a CRISPR system are introduced into a target cell such that expression of the elements of the CRISPR system direct formation of a CRISPR complex at one or more target sites. Accordingly, cleavage of DNA by the genome editing vector or composition can be used to delete nucleic acid material from a target DNA sequence by cleaving the target DNA sequence and allowing the cell to repair the sequence. As such, the compositions can be used to modify DNA in a site-specific, i.e., "targeted" way, for example gene knock-out, gene knock-in, gene editing, gene tagging, etc., as used in, for example, gene therapy.

While the specifics can be varied in different engineered CRISPR systems, the overall methodology is similar. A practitioner interested in using CRISPR technology to target a DNA sequence can insert a short DNA fragment containing the target sequence into a guide RNA expression plasmid. The sgRNA expression plasmid contains the target sequence (about 20 nucleotides), a form of the tracrRNA sequence (the scaffold) as well as a suitable promoter and necessary elements for proper processing in eukaryotic cells. Such vectors are commercially available (see, for example, Addgene). Many of the systems rely on custom, complementary oligos that are annealed to form a double stranded DNA and then cloned into the sgRNA expression plasmid. Co-expression of the sgRNA and the appropriate Cas enzyme from the same or separate plasmids in transfected cells results in a single or double strand break (depending of the activity of the Cas enzyme) at the desired target site.

As demonstrated herein, LPS increased CTL1 expression 6-fold, and boosted intracellular choline by 238% ($p<0.01$) and phosphocholine by 559% ($p<0.001$). Choline deficiency reduced MSU-induced IL-1β release by 60% (p<0.001), shCTL1 by 57% (p<0.05), and shChoKα by 89% (p<0.05) and ChoKα inhibition via RSM932A by 71% (p<0.005). Impaired choline uptake or ChoKα activity promoted AMPK activation and DRP1, LC3 and p62 recruitment to mitochondria. AMPK deletion blocked choline deficiency effect on IL-1β release. Of note, treatment with colchicine, previously defined to inhibit NLRP3 inflammasome activity and activate AMPK, also reduced CTL1 (90%) and ChoKα levels (85%). In vivo, after MSU crystal injection, cells collected from peritoneal cavity strongly expressed both CTL1 (p<0.05) and ChoKα (p<0.01). F4/80 positive myeloid cells recruited into the air pouch also expressed ChoKα and CTL1. Last, treatment with ChoKα inhibitor MN58b reduced MSU crystal-induced leukocyte recruitment by 47% (p<0.05) and IL-1β release by 66% (p<0.01).

Thus, inhibition of CTL1 expression or choline phosphorylation attenuated NLRP3 inflammasome activation and IL-1β and IL-18 production in stimulated macrophages. Mechanistically, reduced choline uptake altered mitochondrial lipid profile, attenuated mitochondrial ATP synthesis and activated the energy sensor AMP-activated protein kinase (AMPK). By potentiating mitochondrial recruitment of DRP1, AMPK stimulates mitophagy, which contributes to termination of NLRP3 inflammasome activation. Correspondingly, pharmacological ChoKα inhibition ameliorated several models of IL-1β-dependent inflammation in vivo, an effect that was also achieved by CTL1 targeting or by reduction in dietary choline.

Impaired choline uptake or phosphocholine production affects mitochondrial phosphatidylcholine and sphingomyelin, disrupts mitochondrial ATP synthesis, and triggers AMPK activation and mitophagy. By decreasing the amount of damaged mitochondria that produce oxidized-(ox) mtDNA, an NLRP3 activator, mitophagy attenuates IL-1β production. As demonstrated herein, inhibition of phosphocholine synthesis reduces IL-1β production and ameliorates acute and chronic macrophage-mediated inflammation.

In another aspect, the present invention provides a method of ameliorating macrophage-mediated inflammatory and/or degenerative diseases in a subject. As used herein, the term "ameliorate" means that the clinical signs and/or the symptoms associated with macrophage-mediated inflammatory and/or degenerative diseases are lessened. The signs or symptoms to be monitored will be characteristic of a particular disease or disorder and will be well known to the skilled clinician, as will the methods for monitoring the signs and conditions thereof.

Administering may be done using methods known in the art (e.g., Erickson et al., U.S. Pat. No. 6,632,979; Furuta et al., U.S. Pat. No. 6,905,839; Jackobsen et al., U.S. Pat. No. 6,238,878; Simon et al., U.S. Pat. No. 5,851,789). The compositions of the invention may therefore be administered prophylactically (i.e., before the observation of disease symptoms) and/or therapeutically (i.e., after the observation of disease symptoms). Administration also may be concomitant with (i.e., at the same time as, or during) manifestation of one or more disease symptoms. In addition, the compositions of the invention may be administered before, concomitantly with, and/or after administration of another type of drug or therapeutic procedure (e.g., surgery). Methods of administering the compositions of the invention include, but are not limited to, administration in parenteral, oral, intraperitoneal, intranasal, topical and sublingual forms. Parenteral routes of administration include, for example, subcutaneous, intravenous, intramuscular, intrastemal injection, and infusion routes.

In another aspect, the present invention provides a method of identifying an agent useful for treating a macrophage-mediated inflammatory and/or degenerative disease or disorder through the targeting of CTL1 expression or choline phosphorylation. The method includes contacting a sample of cells with at least one test agent, wherein a decrease in CTL1 expression or choline phosphorylation in the presence of the test agent as compared to CTL1 expression or choline phosphorylation in the absence of the test agent identifies the agent as useful for treating macrophage-mediated inflammatory and degenerative diseases. In one embodiment, a decrease in NLRP3 inflammasome activation, IL-1β production and/or IL-18 production in the presence of the test agent as compared to NLRP3 inflammasome activation, IL-1β production and/or IL-18 production in the absence of the test agent identifies the agent as useful for treating a macrophage-mediated inflammatory and degenerative disease. In various embodiments, the method may be performed in a high throughput format, such as contacting samples of cells of a plurality of samples with at least one test agent. In various embodiments, the plurality of samples may be obtained from a single subject or from different subjects.

An agent useful in a method of the invention can be any type of molecule, for example, a polynucleotide, a peptide, antisense oligonucleotide, antibody or antibody fragment, a peptidomimetic, peptoids such as vinylogous peptoids, a small organic molecule, or the like, and can act in any of various ways to reduce or inhibit elevated NLPR3 inflammasome activation, CTL1 expression or choline phosphorylation. In various embodiments, the inhibitor of CTL1 expression or choline phosphorylation is an inhibitory nucleic acid that inhibits the expression of CTL1, NLRP3 inflammasome activation, IL-1β production and/or IL-18 production. For example, the inhibitory nucleic acid can be siRNA, shRNA, guide RNA (gRNA), oligonucleotides, antisense RNA or ribozymes that inhibit such activity or expression.

Further, the agent can be administered in any way typical of an agent used to treat the particular type of above-mentioned diseases or under conditions that facilitate contact of the agent with the target diseased cells and, if appropriate, entry into the cells. Entry of a polynucleotide agent into a cell, for example, can be facilitated by incorporating the polynucleotide into a viral vector that can infect the cells. Thus, the inhibitory nucleic acid can be delivered in, for example, a lentiviral vector, a herpesvirus vector or an adenoviral vector.

If a viral vector specific for the cell type is not available, the vector can be modified to express a receptor (or ligand) specific for a ligand (or receptor) expressed on the target cell, or can be encapsulated within a liposome, which also can be modified to include such a ligand (or receptor). A peptide agent can be introduced into a cell by various methods, including, for example, by engineering the peptide to contain a protein transduction domain such as the human immunodeficiency virus TAT protein transduction domain, which can facilitate translocation of the peptide into the cell.

Generally, an agent to be administered to a subject may be formulated in a composition (e.g., a pharmaceutical composition) suitable for such administration. Such formulated agents are useful as medicaments for treating a subject suffering from any of the above-mentioned diseases, in part, by elevated or abnormally elevated CTL1 expression or choline phosphorylation.

Pharmaceutically acceptable carriers useful for formulating an agent for administration to a subject are well known in the art and include, for example, aqueous solutions such as water or physiologically buffered saline or other solvents or vehicles such as glycols, glycerol, oils such as olive oil or injectable organic esters. A pharmaceutically acceptable carrier can contain physiologically acceptable compounds that act, for example, to stabilize or to increase the absorption of the conjugate. Such physiologically acceptable compounds include, for example, carbohydrates, such as glucose, sucrose or dextrans, antioxidants, such as ascorbic acid or glutathione, chelating agents, low molecular weight proteins or other stabilizers or excipients. One skilled in the art would know that the choice of a pharmaceutically acceptable carrier, including a physiologically acceptable compound, depends, for example, on the physico-chemical characteristics of the therapeutic agent and on the route of administration of the composition, which can be, for example, orally or parenterally such as intravenously, and by injection, intubation, or other such method known in the art. The pharmaceutical composition also can contain a second (or more) compound(s) such as a diagnostic reagent, nutritional substance, toxin, or therapeutic agent, for example, a cancer chemotherapeutic agent and/or vitamin(s).

In general, a suitable daily dose of a compound/inhibitor of the invention will be that amount of the compound/inhibitor that is the lowest dose effective to produce a therapeutic effect. Such an effective dose will generally depend upon the factors described above. Generally, intravenous, intracerebroventricular and subcutaneous doses of the compounds of this invention for a patient will range from about 0.0001 to about 100 mg per kilogram of body weight per day which can be administered in single or multiple doses.

When practiced as an in vitro assay, the methods can be adapted to a high throughput format, thus allowing the examination of a plurality (i.e., 2, 3, 4, or more) of cell samples and/or test agents, which independently can be the same or different, in parallel. A high throughput format provides numerous advantages, including that test agents can be tested on several samples of cells from a single patient, thus allowing, for example, for the identification of a particularly effective concentration of an agent to be administered to the subject, or for the identification of a particularly effective agent to be administered to the subject. As such, a high throughput format allows for the examination of two, three, four, etc., different test agents, alone or in combination, on the macrophages of a subject such that the best (most effective) agent or combination of agents can be used for a therapeutic procedure. Further, a high throughput format allows, for example, control samples (positive controls and or negative controls) to be run in parallel with test samples, including, for example, samples of cells known to be effectively treated with an agent being tested.

A high throughput method of the invention can be practiced in any of a variety of ways. For example, different samples of cells obtained from different subjects can be examined, in parallel, with same or different amounts of one or a plurality of test agent(s); or two or more samples of cells obtained from one subject can be examined with same or different amounts of one or a plurality of test agent. In addition, cell samples, which can be of the same or different subjects, can be examined using combinations of test agents and/or known effective agents. Variations of these exemplified formats also can be used to identify an agent or combination of agents useful for treating any of the above-mentioned diseases associated with elevated CTL1 expression or choline phosphorylation.

When performed in a high throughput (or ultra-high throughput) format, the method can be performed on a solid support (e.g., a microtiter plate, a silicon wafer, or a glass slide), wherein samples to be contacted with a test agent are positioned such that each is delineated from each other (e.g., in wells). Any number of samples (e.g., 96, 1024, 10,000, 100,000, or more) can be examined in parallel using such a method, depending on the particular support used. Where samples are positioned in an array (i.e., a defined pattern), each sample in the array can be defined by its position (e.g., using an x-y axis), thus providing an "address" for each sample. An advantage of using an addressable array format is that the method can be automated, in whole or in part, such that cell samples, reagents, test agents, and the like, can be dispensed to (or removed from) specified positions at desired times, and samples (or aliquots) can be monitored, for example, for NLRP3 inflammasome activation and/or cell viability.

The invention also provides a method of determining whether any of the above-mentioned macrophage-mediated inflammatory and degenerative diseases or disorders is amenable to treatment with an inhibitor of CTL1 expression or choline phosphorylation, as disclosed herein. The method can be performed, for example, by measuring the amount of NLRP3 inflammasome activation, CTL1 expression, choline phosphorylation, IL-1β production and/or IL-18 production in a cell sample of a subject to be treated, and determining that the measured NLRP3 inflammasome activation, CTL1 expression, choline phosphorylation, IL-1β production and/or IL-18 production is elevated or abnormally elevated as compared to the level of NLRP3 inflammasome activation, CTL1 expression, choline phosphorylation, IL-1β production and/or IL-18 production in corresponding normal cells, which can be a sample of normal (i.e., not diseased) cells of the subject having any one of the above-mentioned inflammatory and/or degenerative diseases. Detection of elevated or abnormally elevated level of NLRP3 inflammasome activation, CTL1 expression, choline phosphorylation, IL-1β production and/or IL-18 production in the cells as compared to the corresponding normal cells indicates that the subject can benefit from treatment with an inhibitor of CTL1 expression and/or choline phosphorylation. A sample of cells used in the present method can be obtained using a biopsy procedure (e.g., a needle biopsy), or can be a sample of cells obtained by a surgical procedure to remove and/or debulk the tumor.

In various embodiments, the method of identifying a disease or disorder amenable to treatment with an inhibitor of CTL1 expression and/or choline phosphorylation can further include contacting cells of the sample with at least one test agent known to inhibit NLRP3 inflammasome activation, CTL1 expression, choline phosphorylation, IL-1β production and/or IL-18 production, and detecting a decrease in NLRP3 inflammasome activation, CTL1 expression, choline phosphorylation, IL-1β production and/or IL-18 production in the cells following said contact. Such a method provides a means to confirm that any of the above-mentioned diseases or disorders is amenable to treatment with an inhibitor of CTL1 expression and/or choline phosphorylation. Further, the method can include testing one or more different test agents, either alone or in combination, thus providing a means to identify one or more test agents useful for treating the particular symptoms of any of the above-mentioned diseases or disorders being examined. Accordingly, the present invention provides a method of identifying an agent useful for treating lupus, gout, osteoarthritis, rheumatoid arthritis, ankylosing spondylitis, uveitis, Alzheimer's disease, Parkinson's disease, cryopyrin-associated periodic syndromes, type 2 diabetes, atherosclerosis, macular degeneration, lung cancer, and many more inflammatory and degenerative diseases in a subject.

The following examples are intended to illustrate but not limit the invention.

Example 1

Macrophage culture and stimulation—Femurs and tibias from C57BL/6 mice, Ampkα1$^{-/-}$ mice, and Il10rb$^{-/-}$ mice at 6-10 weeks of age were used to generate bone-marrow-derived macrophages (BMDM) as described (Hornung et al., 2008). Macrophages were cultured in DMEM supplemented with 10% FBS, 20% L929-cell conditioned medium, and 100 U/ml penicillin-streptomycin for 7-10 days. Bone marrow was isolated from MWS Nlrp3$^{A350VneoRCreT}$, FCAS Nlrp3$^{L351PneoCreT}$ and NOMID Nlrp3$^{D301NneoCreT}$ conditional knock-in mice (Bonar et al., 2012; Brydges et al., 2009), and were allowed to differentiate over 7 days with addition of fresh mouse recombinant GMCSF every three days. (Z)-4-hydroxitamoxifen at 0.4 µg/ml was added to cells 24 hr prior to treatment to induce the mutant Nlrp3 allele. Immortalized mouse BMDM were grown in DMEM supplemented with 10% FBS and 100 U/ml penicillin-streptomycin. All cells were grown at 37° C. with 5% $CO_2$. NLRP3 inflammasome activation was induced priming for 4 hr with ultrapure LPS (100 ng/ml) followed by treatment with the NLRP3 activators ATP (4 mM) and nigericin (10 µM) for 45 min, unless otherwise indicated, and monosodium urate (MSU) crystals (400 µg/ml) and 1,2-dioleoyl-3-trimethylammoniumpropane (DOTAP) liposomes (50 µg/ml) for 3 hr. In Nlrp3 mutant macrophages IL-1b production was induced by LPS treatment for 16 hr at 37° C., whereas FCAS macrophages were incubated at 32° C. without LPS addition. AIM2 inflammasome activation was induced by 4 hr LPS priming and transfection with lipofectamine 3000 and the AIM2 activator poly(dA:dT) (1 µg/ml) for 8 hr. For choline deprivation experiments, the cells were cultured in CMRL1066 medium with or without choline for 2-3 hr before priming with LPS and kept during the experiment.

Microglia isolation—Primary microglia was isolated from wild type mice as previously described (Saura et al., 2003). Briefly, confluent mixed glial cultures were prepared from cerebral cortices of 1-day-old male C57BL/6 mice by mechanical and chemical dissociation and culture mixed glial cell in DMEM-F12 until confluency was achieved after 10-12 days. Then, microglial cultures were prepared by mild trypsinization (0.05-0.12%) in the presence of 0.2-0.5 mM EDTA and 0.5-0.8 mM $Ca^{2+}$ to detach an intact layer of astrocytes, leaving attached microglia. Microglia were cultured in DMEM-F12 supplemented with 10% FBS for 15-21 days, then cells were detached and seeded for experimentation.

Example 2

In Vivo Animal Studies

LPS-induced septic shock and air pouch model—Eight- to twelve-week-old C57BL/6 mice were subjected to LPS-induced septic shock as described (Zhong et al., 2016c). Briefly, 50 mg/kg LPS was intraperitoneal (IP) injected, and when indicated, animals were pretreated with the ChoKα inhibitor MN58B 2.5 mg/kg or vehicle (sodium chloride) via IP injection daily, starting three days before LPS challenge. Mice were analyzed for survival and circulating cytokines (3 hr after LPS challenge). None of the animals was excluded from the analysis.

Synovium-like air pouch gout model—Subcutaneous air pouches were generated by repeated injection of sterile air into 8-12-week old C57BL/6 mice to create an accessible space that develops a synovium-like membrane within 7 days as described (Wang et al., 2016). Afterward, mice were treated with MN58b IP (2.5 mg/kg) or vehicle, 24 hr before injecting lml MSU crystals (3 mg/ml) into the air pouch. Pouch tissue and fluids were harvested 8 hr later for analysis. None of the animals was excluded from the analysis.

Muckle Wells Syndrome Mice—Sixteen- to twenty-two-week-old male MWS Nlrp3$^{A350VneoRCreT}$ mutant mice were subjected to MN58b (2.5 mg/kg) or vehicle IP injection BID daily for 15 days. Tamoxifen (50 mg/kg) was administered daily via IP for 4 days after first MN58b (or vehicle) treatment, and once more on day 7 to maintain Cre expression. At the endpoint, blood, spleen and liver were collected for analysis. Complete blood counts were preformed using a SciVet Animal Blood Counter (ABX Diagnostics). Livers were paraffin embedded and hematoxylin and eosine staining was performed to assess liver histology. None of the animals was excluded from the analysis and liver histology was blind examined.

Example 3

Method Details shRNA Lentiviral Knockdown—Knockdown of Slc44a1, ChoKα, and Atg7 was done by lentiviral transduction of immortalized BMDM as described (Zhong et al., 2016c). Sequences of target shRNAs used in this study were obtained from the MISSION shRNA Library (Sigma). Briefly, HEK293T cells were plated at 60% confluence in 6-well plates, and were transfected with 20 µl lipofectamine 3000 and 10 µg shRNA, 1 µg VSV-G and 5 µg pLV-CMVΔ8.9 plasmids, following manufacturer's instructions. Supernatants were collected 36 hr after transfection, filtered through 0.45 µm and added to iBMDM. To increase infection efficiency 8 µg/ml of polybrene was added. Virus containing medium was washed away after 6 hr and the cells were cultured with fresh medium. A second round of infection was done at 48 hr after the first round. Infected iBMDM were expanded and selected with puromycin.

Protein Immunoblotting and ELISA—Mitochondria were isolated using Mitochondria Isolation kit. Whole cell lysates were prepared in NP40 buffer containing a protease inhibitor cocktail and a phosphatase inhibitor cocktail, and supernatants were analyzed by SDS-PAGE. Proteins were transferred into PVDF membranes, blocked in 5% BSA and 1×TBST for 1 hr, and incubated with indicated antibodies overnight. Secondary antibodies were added for 1 hr and detection was done using CLARITY™ Western ECL Substrate (Biorad). Paired antibodies (capture and detection) and standard recombinant mouse IL-1β (R&D Systems), and TNF and IL-6 (eBioscience) were used to determine cytokine concentrations according to manufacturer's instructions.

RNA Isolation and Quantitative Real-Time PCT (QPCR)—RNA was extracted using AllPrep DNA/RNA Mini kit, and cDNA was synthesized using SUPER-SCRIPT™ VILO™ cDNA Synthesis Kit. mRNA expression was determined by QPCR in a CFX96 thermal cycler (Biorad) as described (Zhong et al., 2016c). Data are presented in arbitrary units and were calculated by 2^(-delta delta CT) method. Primer sequences were obtained from the NIH qPrimerDepot (mouseprimerdepot.nci.nih.gov) and provided by Integrated DNA technologies, as set forth below.

Immunofluorescence and Confocal Microscopy—Treated BMDM and pouch tissue were fixed in 4% paraformaldehyde, permeabilized in 0.01% Triton X-100, and blocked in 1×PBS supplemented with 2% BSA and 5% normal horse serum. Primary antibodies were incubated in blocking buffer at 4° C. overnight. Secondary Alexa antibodies from Life Technologies or Jackson Immuno Research Laboratories were added for 1 hr. Nuclei were counterstained with DAPI. Samples were imaged through a Leica SP5 confocal microscope. Quantitation of p62 aggregates was measured in high magnification fields (HMF) and plotted as p62 aggregates per cell.

Choline and Phosphocholine Analysis by NMR—BMDM were treated with LPS for 4 hr and then were collected and processed for NMR analysis as described (Guma et al., 2015a; Tiziani et al., 2009). Polar metabolite isolation was performed using a modified Bligh-Dyer procedure (Wu et al., 2008). Extracts were dried using a CentriVap refrigerated vacuum concentrator (Labconco, Kansas City, MO, USA). Dried extracts were reconstituted in 100 mM phosphate buffer (pH 7.0) prepared in 10% $H_2O$/90% $D_2O$ (Sigma) that contained 0.5 mM sodium 3-(trimethylsilyl)propionate-2,2,3,3,-$d_4$ (TMSP) as the internal standard. One-dimensional $^1H$ NMR spectra were acquired on a Bruker Avance III 500 MHz with 1.7 mm TCI MicroCryoProbe system (Bruker BioSpin Corp., Billerica, MA) equipped with an autosampler at 300 K and processed as previously described (Lodi et al., 2017; Lu et al., 2017; Ludwig and Gunther, 2011). Metabolite assignment and quantification were performed using the Chenomx 8.2 NMR Suite (Chenomx Inc., Edmonton, Alberta, Canada), the Birmingham Metabolite Library (Ludwig et al., 2012), and the Human Metabolome Database (Wishart et al., 2012).

Total phosphatidylcholine and mitochondrial lipids analysis by mass spectrometry—Total phosphatydilcholine (PC) analysis was measured in RSM932A-pretreated BMDM stimulated with LPS for 4 hr, while mitochondrial lipids were measured in mitochondria isolated from BMDM cultured in control or choline deficient medium and subjected to different treatments for 24 hr. Samples were processed for UHPLC-MS/MS analysis and analysis was performed on a hybrid quadrupole-Orbitrap mass spectrometer (Q Exactive, Thermo Scientific, Bremen, Germany) coupled to an Accela 1250 UHPLC system equipped with a quaternary pump, vacuum degasser, and open autosampler with temperature controller (6° C.; Fisher Scientific, San Jose, CA, USA). Chromatographic separation of metabolites was achieved by reverse phase (RP) analysis on a 150 mm×2.1 mm Kinetex C18 (2.6 µm 100 Å) column (Phenomenex Inc, Torrance, CA, USA) with the following conditions: solvent A, 60:40 water:acetonitrile with 10 mM ammonium formate and 0.1% formic acid; solvent B, 90:10 isopropanol:acetonitrile with 10 mM ammonium and 0.1% formic acid; separation gradient, initially 32% B, held for 2 minutes and then increased linearly from 32-99% B in 18 minutes, washing with 99% B for 5 minutes and column equilibration with 32% B for 10 minutes. The total run time was 35 minutes with a flow rate of 0.25 mL/min and an injection volume of 5 µL.

Ion detection was performed in full MS and MS/AIF modes with an electrospray (ESI) source simultaneously operating in fast negative/positive ion switching mode. The following acquisition settings were used for data collection in full MS mode: spray voltage, 4.0 kV; capillary temperature, 300° C.; sheath gas, 51 (arbitrary units); auxiliary gas, 10 (arbitrary units); m/z range, 200-2000; data acquisition, centroid mode, microscans, 10; AGC target, 3e6; maximum injection time, 200 ms; mass resolution, 70,000 FWHM at m/z 200. The following parameters were modified as follows for full MS/AIF analysis: spray voltage, +3.5/-4.0 kV; capillary temperature, 250° C.; sheath gas, 25 (arbitrary units); auxiliary gas, 15 (arbitrary units); higher-energy collisional dissociation (HCD), 10, 15, 20, 25, and 35 eV. The collision gas was nitrogen. Accuracy of analysis was ensured by calibrating the detector using commercial calibration solutions provided by the manufacturer. Mass tolerance was maintained at 5 ppm. The analytical platform was controlled by a computer operating the Xcalibur v. 2.2 SP1.48 software package (Thermo Scientific, San Jose, CA, USA). Raw files were processed using SIEVE 2.2.0 SP2 (Thermo Scientific, San Jose, CA, USA) and the MATLAB programming environment (MathWorks, Natick, MA, USA). MS/MS fragmentation patterns were used to differentiate lipid classes. Features that did not achieve a relative standard deviation (RSD) of less than 0.25 in the quality control (QC) were excluded from analysis. Integrated peak intensities were normalized by the total spectral area and summed by class. The total intensity for each class was scaled to the vehicle control average for analysis.

Nitric oxide, calcium, and potassium flux measurements—BMDM were treated with LPS for 24 hr. NO production was measured in conditioned media as the concentration of nitrite by Griess reaction using NaNO2 as the standard as described (Terkeltaub et al., 2011). Briefly, 50 mL of conditioned medium, or sodium nitrite standards were incubated with 50 mL of equal volumes of Griess reagents (Griess reagent A, 1% sulfanilamide in 5% phosphoric acid; and Griess reagent B, 0.1% Napthylenediamine in $H_2O$). Absorbance was measured at 490 nm. Calcium and potassium fluxes were detected in BMDM cultured in control or choline-free medium treated with LPS and ATP, using FURA-2, AM (Invitrogen), and PBFI, AM (Invitrogen) respectively and flux was calculated according to manufacturer's instructions.

Mitochondrial Function—Mitochondrial membrane potential ($\Psi m$) was measured using TMRM (#T668, Life Technologies) according to manufacturer's instructions. Briefly, RSM932A-pretreated BMDM and shCtrl and shChoKα iBMDM were primed with LPS for 4 hr. Cells were stained with 200 nM TMRM for 30 min at 37° C., and then treated with CCCP (5 µM) for 5 min. After washing twice, fluorescence intensity was determined per manufacturer's instructions using a FilterMax F5 multimode plate reader (Molecular Devices), Mitochondrial reactive oxygen species (mtROS) was measured using MitoSOX (Invitrogen) as described (Zhong et al., 2016c). RSM932A-pretreated BMDM and shCtrl and shChoKα were primed with LPS for 4 hr and treated with nigericin and DOTAP for 30 min and 3 hr respectively. Cells were loaded with 4 µM MitoSOX for 20 min. After washing with PBS, fluorescence intensity was determined at 510/580 nm using a FilterMax F5 plate reader. $NAD^+$/NADH ratio was measured using $NAD^+$/NADH Cell-Based Assay kit according to manufacturer's instructions (Cayman Chemical Company). Briefly, BMDM were aliquoted into 96-well plates treated with LPS for 24 hr. Cells were lysed and centrifuged. Supernatants and standards were incubated in reaction solution for 1.5 hr. Absorbance was measured at 450 nm using FilterMax F5 plate reader. Complex V ATP synthase activity was measured in mitochondria isolated from BMDM treated with LPS for 24 hr using Complex V Activity Assay kit (Cayman Chemical Company) according to manufacturer's instructions. Absorbance was measured at 340 nm at 30-second intervals for 30 min using a FilterMax F5 plate reader. Cellular ATP was measured after 24 hr LPS stimulation using CellTiter-Glo Luminescent Assay (Promega) as described (Ip et al., 2017). Succinate was measured in BMDM treated with indicated concentrations of LPS for 24 hr in either control or choline-deficient medium using the Succinate Colorimetric Assay kit (Sigma) according to manufacturer's instructions. Briefly, cells were homogenized in ice-cold succinate assay buffer, and after centrifugation, supernatants and succinate standards were incubated with reaction solution for 30 min at 37° C. Absorbance was measured at 450 nm using FilterMax F5 plate reader.

Cellular fractionation and measurement of cytosolic mtDNA—BMDM were primed with LPS and stimulated with an NLRP3 inflammasome activator. Cellular fractionation was performed using Mitochondrial Isolation kit (ThermoScientific) according to manufacturer's instructions. Cytosolic mtDNA was analyzed as described (Nakahira et al., 2011). Briefly, DNA was isolated from 300 µl of the cytosolic fractions using All Prep DNA/RNA kit, and mitochondrial DNA encoding cytochrome c oxidase 1 and D-Loop were measured by QPCR with an equal volume of the DNA solution. Nuclear DNA encoding 18S ribosomal RNA and Tert was used for normalization. Primer sequences were obtained from the NIH qPrimerDepot (mouseprimerdepot.nci.nih.gov) and provided by Integrated DNA Technologies, as set forth below.

Quantification and Statistical Analysis—Data are shown as mean±SD or mean±SEM, as indicated. Statistical significance was determined using two-tailed student's t-test, and p values lower than 0.05 were considered statistically significant. Kaplan-Meier survival curves were analyzed by log rank test. All group numbers and detailed significant values are presented within the figure legends. Sample-sizes for mouse experiments were based on previous studies (Hoffman et al., 2010; Wang et al., 2016; Zhong et al., 2016c). GraphPad Prism was used for statistical analysis and graphing.

Example 4

Results

Figure 1B:
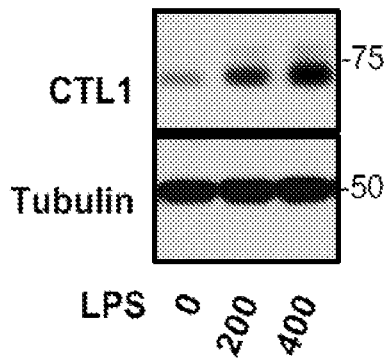
Figure 1C:
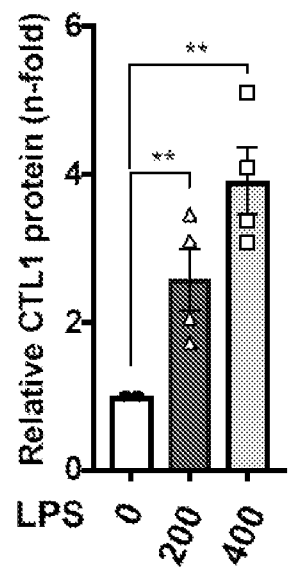
Figure 1D:
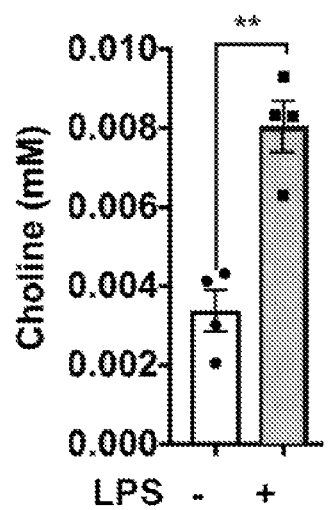
Figure 1E:
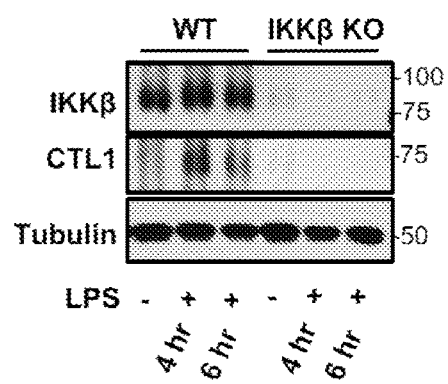
Figure 1F:
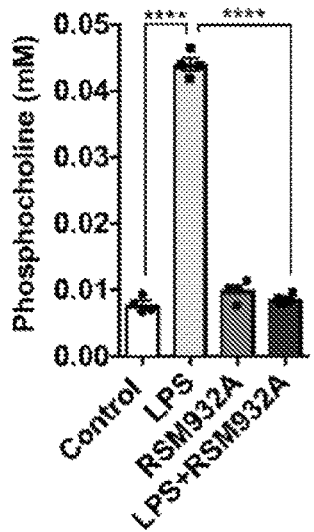
Figure 1G:
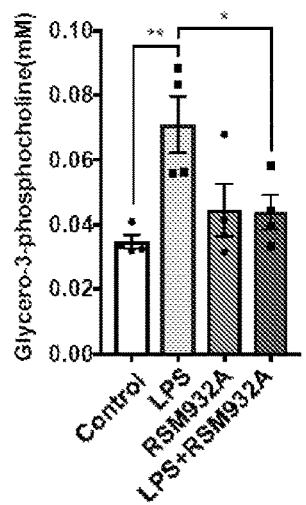
Figure 1H:
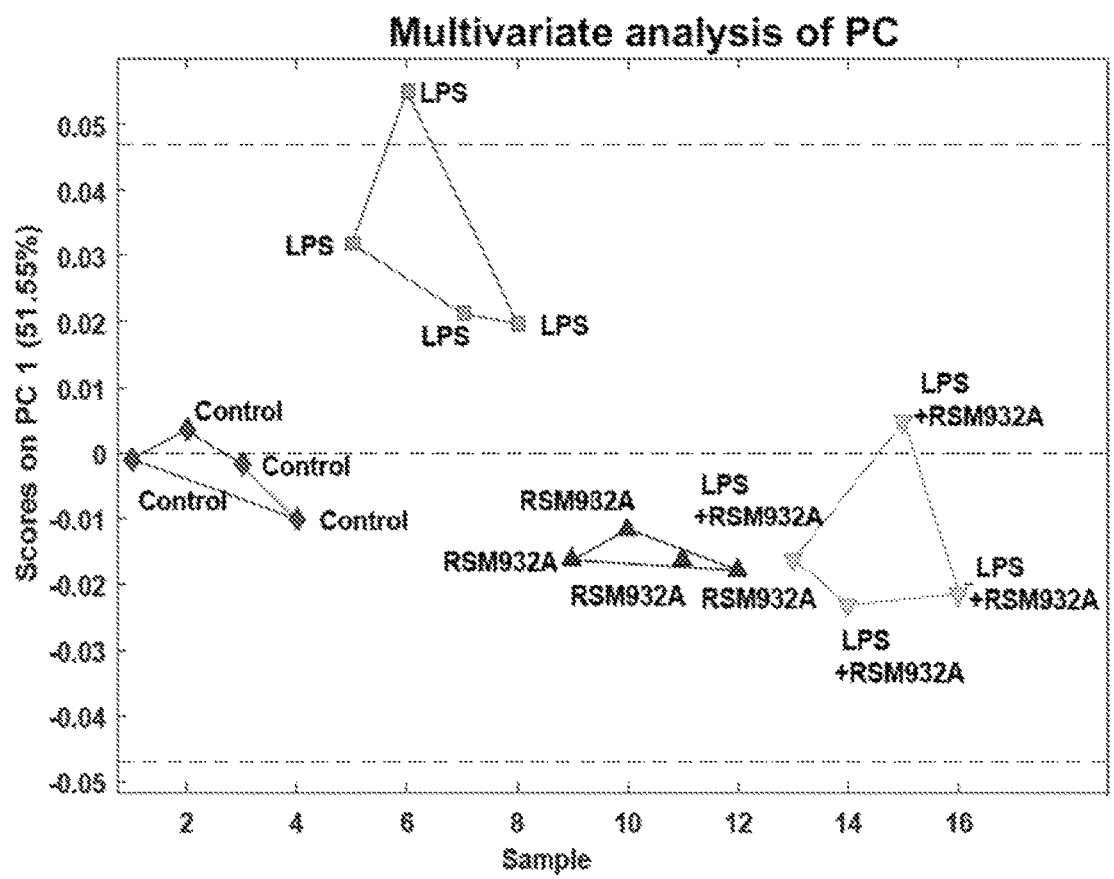
Figure 1I:
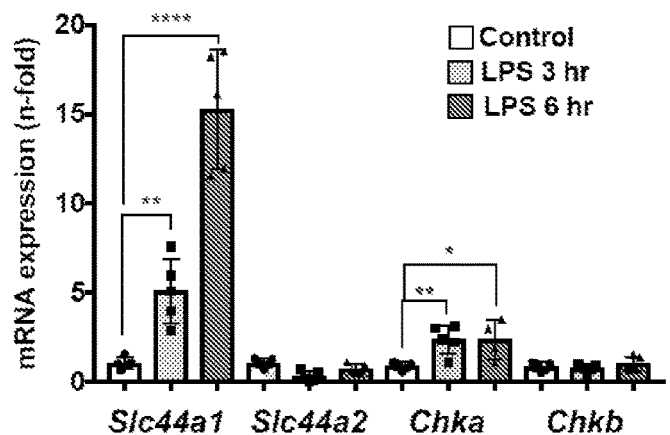

LPS induces macrophage CTL1/Slc44a1 expression and choline uptake—Exposure of bone-marrow-derived macrophages (BMDM) to pathogen-associated molecular pattern (PAMP) lipopolysaccharide (LPS) increased Slc44a1 mRNA (FIG. 1A), which codes for the choline transporter CTL1 (FIGS. 1B and 1C). CTL1 induction correlated with enhanced choline uptake (FIG. 1D). LPS also induced rapid choline mobilization via the Kennedy pathway, increasing cellular content of phosphocholine, glycerol-3-phosphocholine and phosphatidylcholine (PC), an effect that was blocked by the ChoKα inhibitor RSM932A (FIGS. 1F, 1G and 1H). In microglia, the myeloid cells of the central nervous system, LPS induced Slc44a1/CTL1 as well as ChKa mRNA (FIG. 1I). Thus, enhanced choline uptake and phosphorylation is a general response to LPS stimulation of myeloid cells.

Figure 1J:
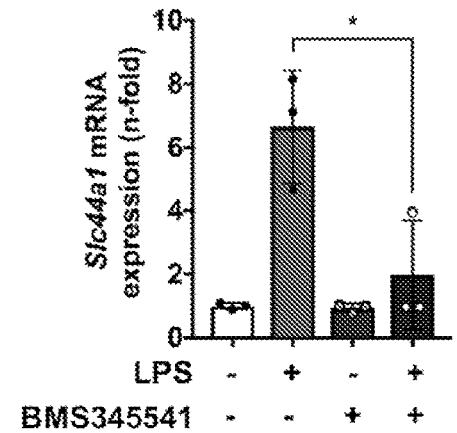

LPS rapidly activates NF-κB-dependent transcription to produce inflammatory mediators and cytokines (Ben-Neriah and Karin, 2011; Greten et al., 2007). NF-κB inhibition by IKKβ ablation or the IKKβ inhibitor BMS345541 blocked Slc44a1/CTL1 induction (FIGS. 1E and 1J).

Figure 2A:
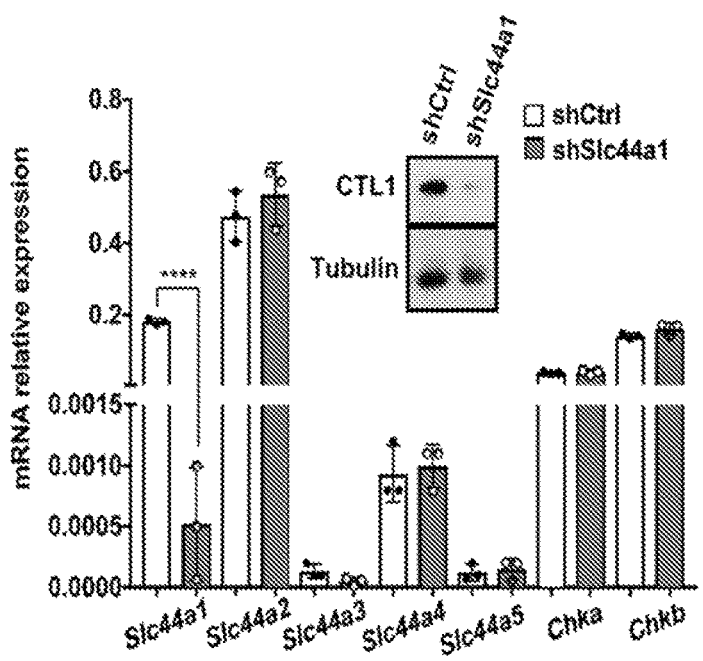
FIGS. 2A-2X are pictorial and graphical diagrams showing that choline deficiency or Slc44a1 knockdown reduce IL-1β production.
Figure 2B:
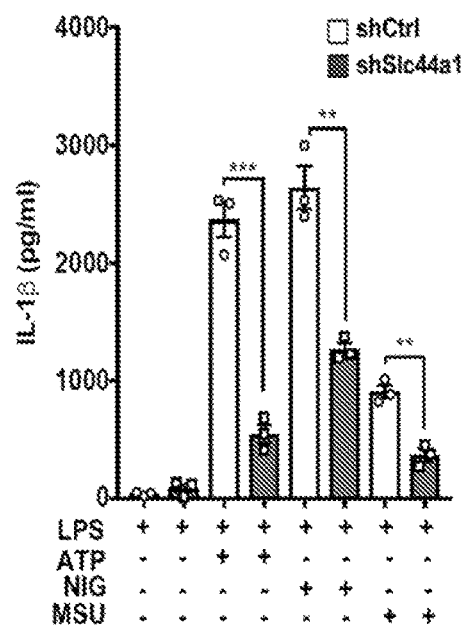
FIG. 2B shows IL-1β release by shSlc44a1 and shCtrl iBMDM primed with LPS for 4 hr and treated with ATP (40 min), nigericin (1 hr) or MSU (3 hr). Mean±SD (n=3).
Figure 2C:
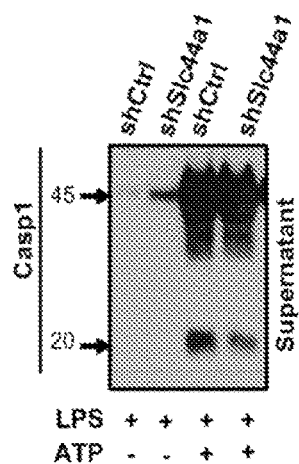
FIG. 2C shows the results of IB analysis of caspase-1 in shSlc44a1 and shCtrl iBMDM that were LPS-primed and ATP-treated.
Figure 2D:
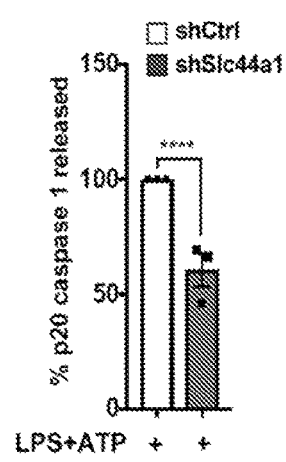
FIG. 2D show Caspase 1 activation shown as % of p20 release to culture medium by iBMDM treated as in FIG. 2C. Mean±SD (n=3).
Figure 2E:
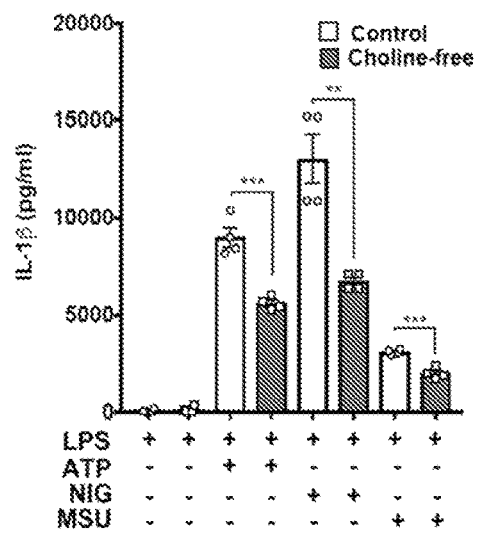
FIG. 2E shows IL-1β release by BMDM cultured either in control or choline-deficient medium and treated as in (FIG. 2B). Mean±SEM (n=4).
Figure 2F:
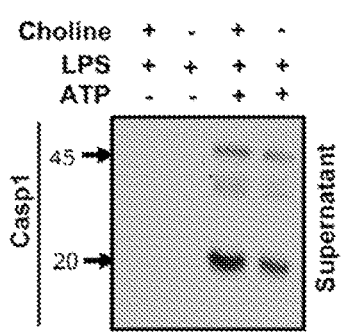
FIG. 2F shows Caspase-1 in supernatants of LPS-primed and ATP-treated BMDM cultured either in control or choline-deficient medium.
Figure 2G:
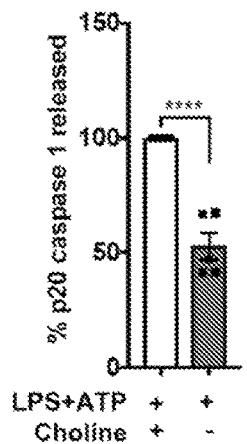
FIG. 2G shows relative caspase 1 activation shown as % of p20 release to culture medium by BMDM treated as in FIG. 2F. Mean±SEM (n=5).
Figure 2H:
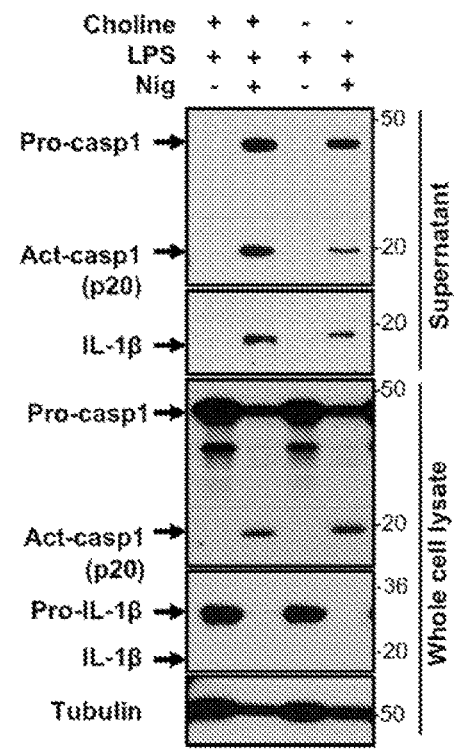
FIG. 2H shows the results of IB analysis of caspase-1 and IL-1b in supernatants and lysates of LPS-primed and nigericin-treated BMDM cultured in either control or choline-deficient medium. *$p<0.05$; $p<0.01$; *$p<0.005$.
Figure 2I:
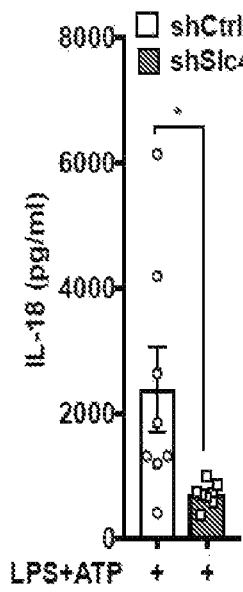
FIG. 2I shows IL-18 production by shSlc44a1 and shCtrl iBMDM stimulated with LPS+ATP measured by ELISA. Mean±SEM (n=8). TNF (FIG. 2J) and IL-6 (FIG. 2K) secretion by shSlc44a1 and shCtrl iBMDM was measured by ELISA. Mean±SD (n=3) and Mean±SEM (n=5-6) respectively.
Figure 2J:
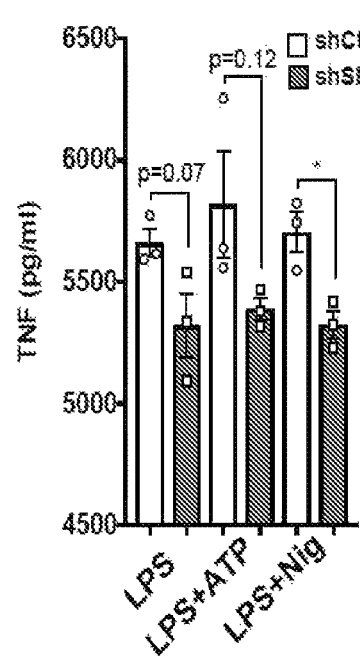
FIG. 2L shows IL-18 production by BMDM cultured in control or choline-free medium and stimulated with LPS+ATP. (n=4).
FIG. 2M shows IL-1β release by BMDM cultured in control or choline-free medium and stimulated with the NLRP3 inflammasome activator nigericin and the AIM2 inflammasome activator poly(dA:dT). Mean±SEM (n=6). TNF (FIG. 2N) and IL-6 (FIG. 2O) secretion by BMDM cultured in control or choline-free medium was measured by ELISA. Mean±SD (n=3) and Mean±SEM (n=4) respectively. Il1b (FIG. 2P), Tnf (FIG. 2Q), and Il10 (FIG. 2R) mRNAs in LPS-stimulated shSlc44a1 and shCtrl iBMDM determined by QPCR. Mean±SEM (n=4).
FIG. 2S shows IL-1β release by WT and Il10rb$^{-/-}$ knockout BMDM cultured in control or choline-free medium. Mean±SD (n=3).
FIG. 2T shows the results from QPCR analysis of Il10r$^-$ and Slc44a1 mRNAs in LPS-stimulated WT and Il10rb$^{-/-}$ BMDM. Mean±SEM (n=6).
FIG. 2U shows nitrite production by LPS-stimulated shSlc44a1 and shCtrl iBMDM was measured by Griess reaction. Mean±SEM (n=4).
FIG. 2V shows the results from QPCR analysis of Nos2 mRNA in shSlc44a1 and shCtrl iBMDM. Mean±SEM (n=4). Calcium (FIG. 2W) and potassium (FIG. 2X) fluxes in BMDM cultured in control or choline-free medium, measured by Fura-2 AM and PBFI AM, respectively. Mean±SD (n=3). *$p<0.05$; $p<0.01$; *$p<0.005$; ****$p<0.001$.
Figure 2K:
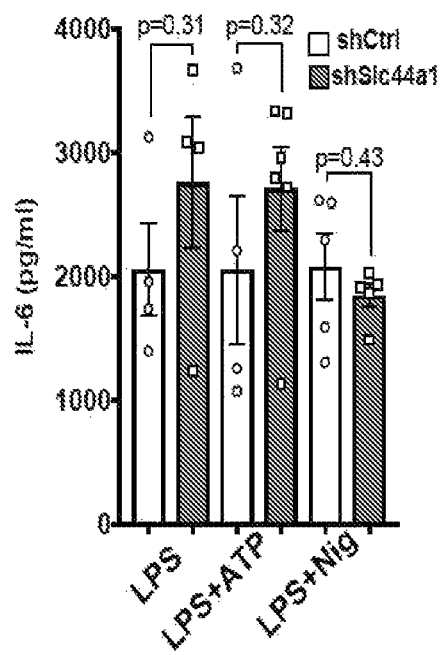
Figure 2L:
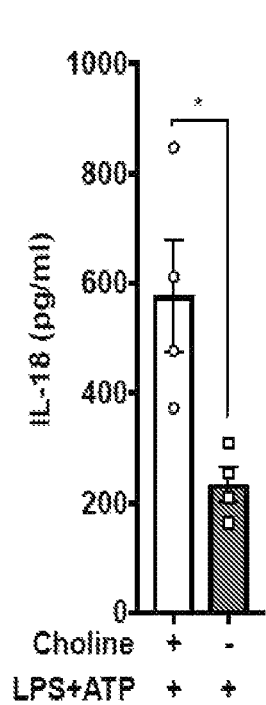
Figure 2M:
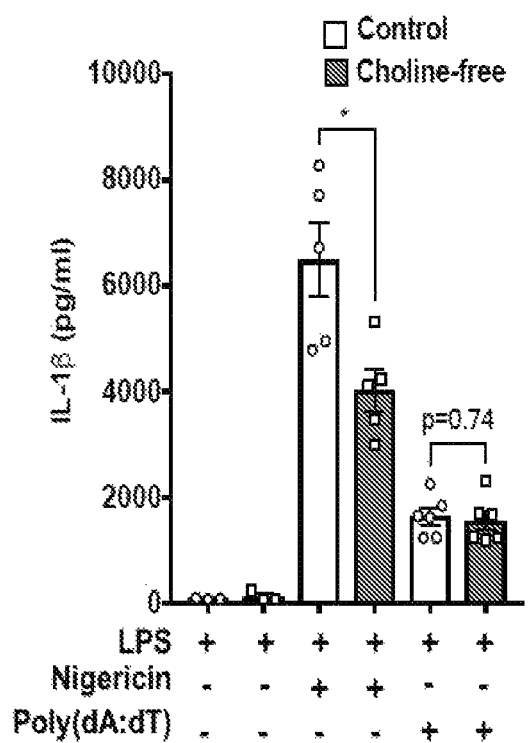
Figure 2N:
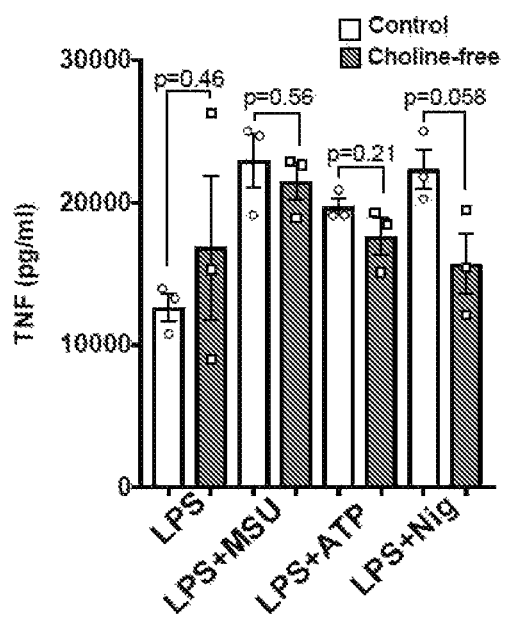
Figure 2O:
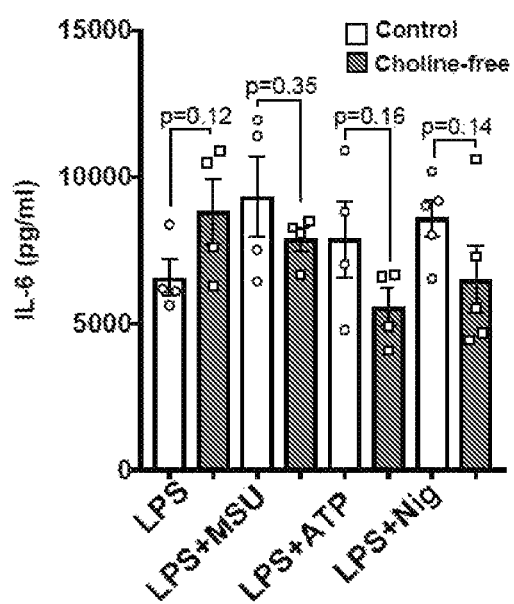

Impaired choline uptake reduces NLRP3 inflammasome activation—NF-κB activation also induces expression of pro-IL-1β and NLRP3, as well as numerous cytokines and chemokines (Vallabhapurapu and Karin, 2009). The impact of Slc44a1 gene knockdown on LPS-induced responses was therefore examined. Slc44a1 gene knockdown did not affect other choline transporters or Chka and Chkb mRNA expression (FIG. 2A). Importantly, Slc44a1 knockdown reduced IL-1β and IL-18 production in response to different NLRP3 inflammasome activators, including ATP, nigericin, and monosodium urate (MSU) microcrystals (FIGS. 2B and 2I). Slc44a1 knockdown also led to decreased TNF production but had no effect on IL-6 release (FIGS. 2J and 2K). Reduced IL-1β production on Slc44a1 knockdown correlated with diminished caspase-1 activation (FIGS. 2C and 2D). Culturing of BMDM in choline-deficient medium (so-called choline-free medium), also interfered with IL-1β (FIG. 2E) and IL-18 production (FIG. 2L), and caspase-1 activation (FIGS. 2F and 2G), but had no effect on AIM2 inflammasome-mediated IL-1β production (FIG. 2M). Culture in choline-free medium, however had no effect on TNF and IL-6 production (FIGS. 2N and 2O). Choline deficiency did not cause intracellular accumulation of mature IL-1β, ruling out an effect on the secretory system involved in IL-1β release (FIG. 2H).

Figure 2P:
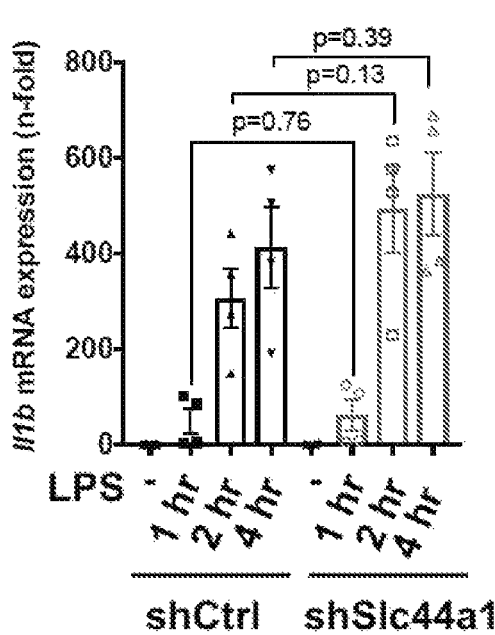
Figure 2Q:
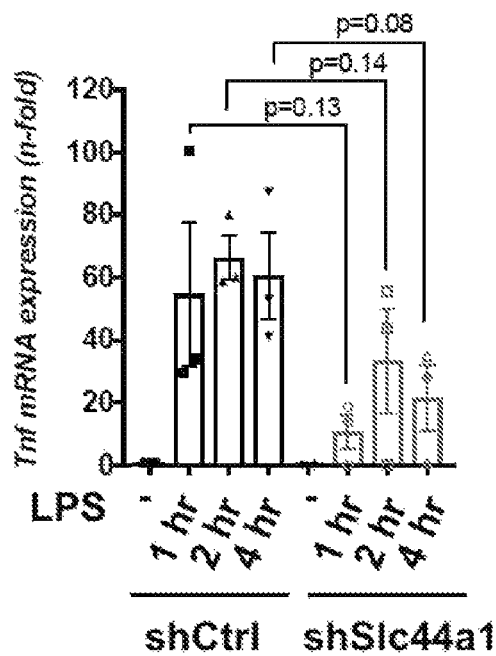
Figure 2R:
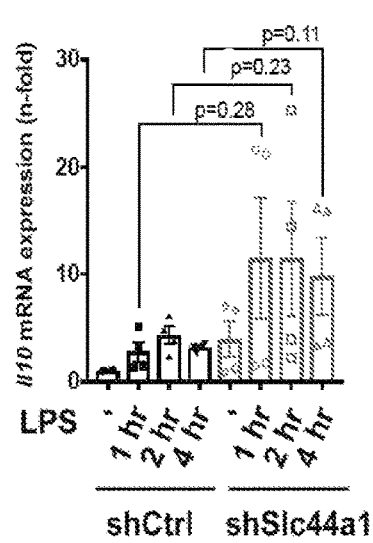
Figure 2S:
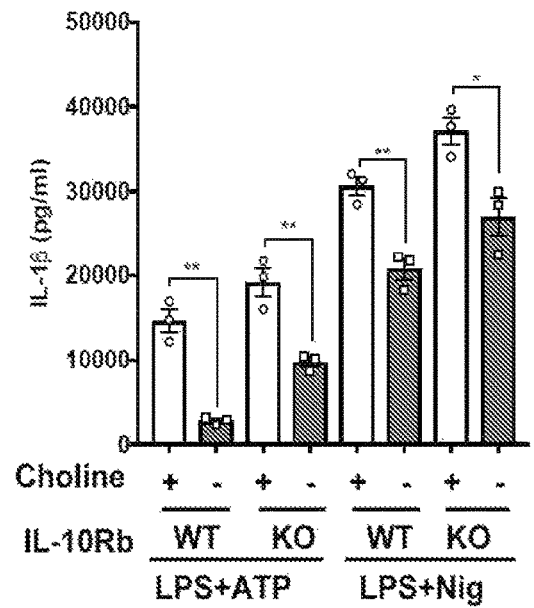
Figure 2T:
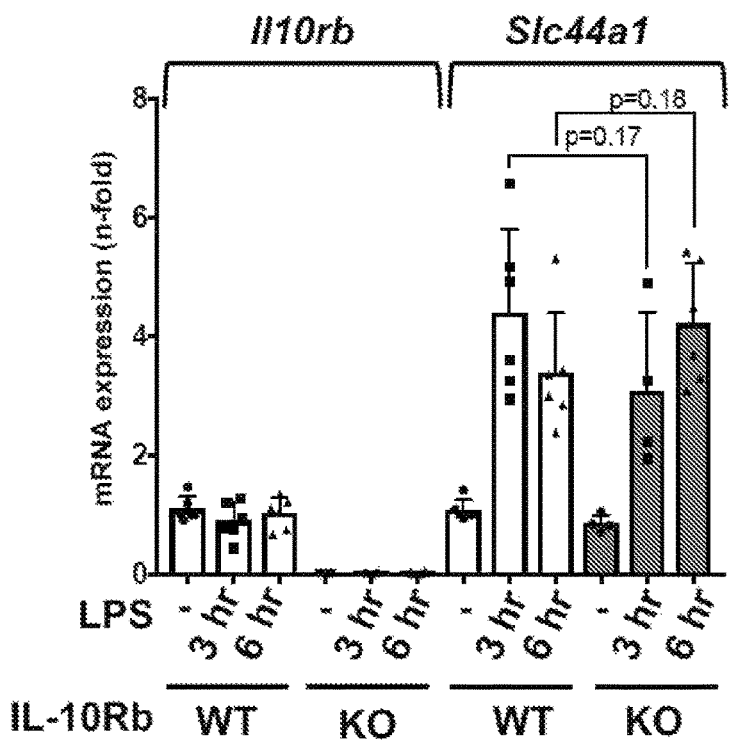

Slc44a1 ablation had no significant effect on synthesis of Il1b or Tnf mRNAs (FIGS. 2P and 2Q). The anti-inflammatory cytokine IL-10, which is induced upon LPS challenge, restrains IL-1β production by limiting glucose uptake and the glycolytic switch through autocrine induction of the mTORC1 inhibitor DDIT4 (Ip et al., 2017). Slc44a1 ablation did not affect Il10 mRNA expression (FIG. 2R), and choline deficiency reduced IL-1β production in IL-10Rb-deficient BMDM (FIG. 2S). IL-10Rb-deficient BMDM also exhibited normal upregulation of Slc44a1 after LPS stimulation (FIG. 2T), suggesting that the mechanisms by which IL-10 and choline deficiency control IL-1β production are different.

Figure 2U:
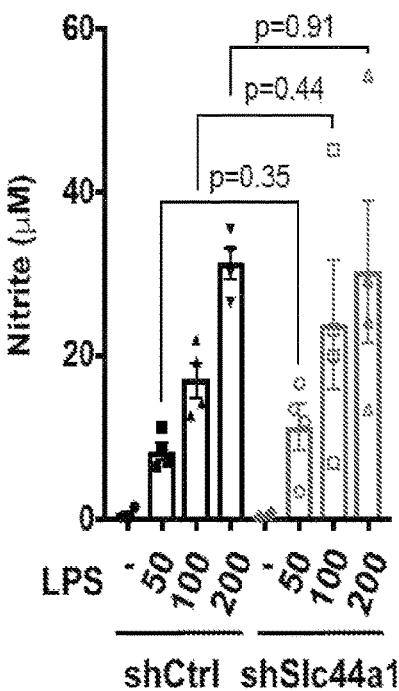
Figure 2V:
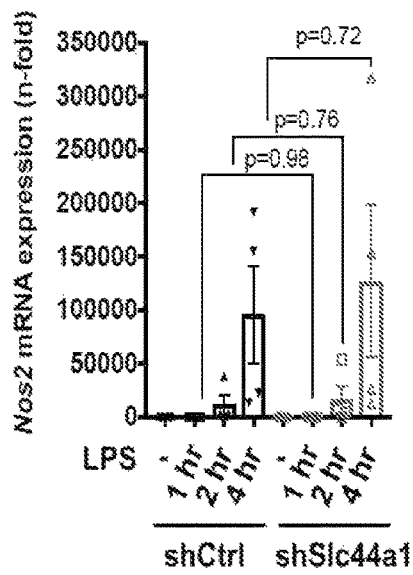
Figure 2W:
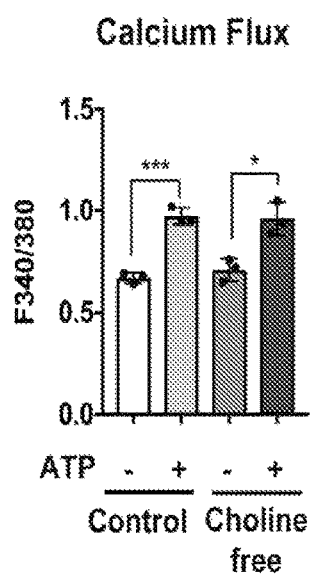
Figure 2X:
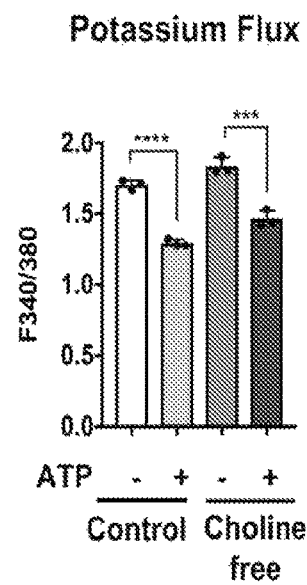

Nitric oxide (NO) limits IL-1β production independent of its antimicrobial function (Mishra et al., 2013). shSlc44a1 macrophages (iBMDM) showed similar nitrite secretion (FIG. 2U) and Nos2 mRNA expression (FIG. 2V) to shCtrl macrophages, suggesting that NO is not involved in reduced IL-1β production after choline uptake impairment. NRLP3 inflammasome activation and pro-IL-1β processing involve influx of calcium into the cytosol (Lee et al., 2012; Murakami et al., 2012; Zhong et al., 2013) and efflux of potassium (Munoz-Planillo et al., 2013). Incubation in choline-deficient medium did not affect calcium (FIG. 2W) or potassium (FIG. 2X) fluxes. Collectively, these results indicate that choline uptake regulates activation of the NLRP3 inflammasome and caspase-1. However, choline uptake via CTL1 does not affect the IL-10-dependent glycolytic switch or changes in intracellular calcium and potassium.

Figure 3A:
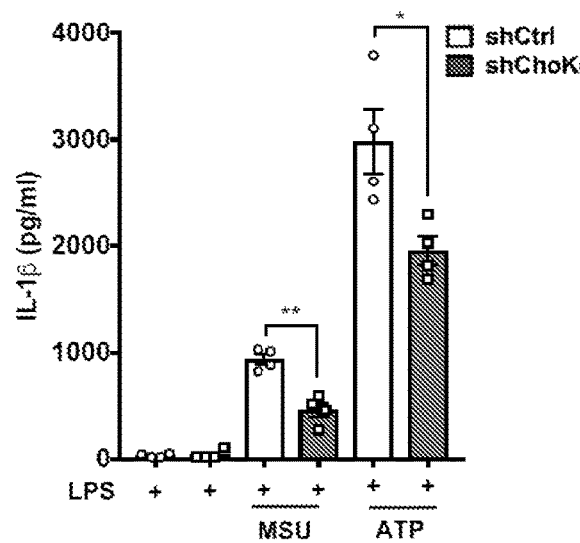
Figure 3B:
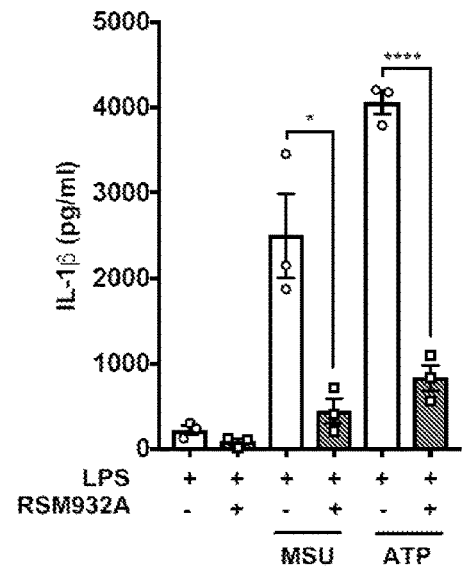

Choline phosphorylation contributes to IL-1β production—After LPS stimulation, choline is taken up and rapidly converted to phosphocholine by ChoKα (FIG. 1F). ChoKα knockdown reduced IL-1β production (FIG. 3A). Pretreatment with the ChoKα inhibitor RSM932A (Lacal and Campos, 2015) produced a similar effect (FIG. 3B). Furthermore, ChoKα knockdown (FIGS. 3C and 3D) and RSM932A treatment (FIGS. 3E and 3F) inhibited caspase-1 activation. Inhibition or knockdown of ChoKα did not alter expression of NLRP3 inflammasome components, including caspase-1, NLRP3, ASC, or the amount of pro-IL-1β induced by LPS (FIGS. 3G and 3H).

Figure 4E:
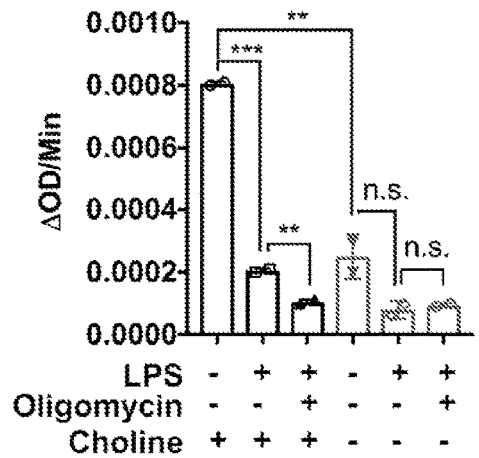
FIG. 4E shows ATP synthase activity in mitochondria isolated from BMDM that were cultured and treated as above in the presence or absence of Oligomycin (10 μM). Mean±SD (n=2).
Figure 4F:
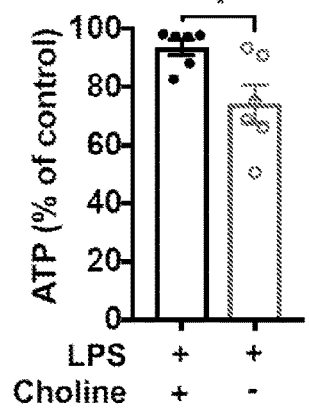
FIG. 4F shows relative cellular ATP presented as % of control in BMDM cultured and treated as above. Mean±SEM (n=6).
Figure 4G:
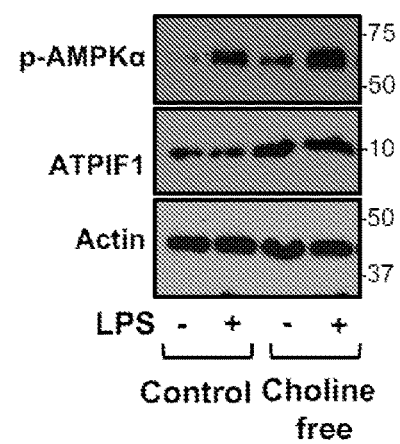
FIG. 4G shows the results of IB analysis of p-AMPK, ATPIF1 in BMDM cultured and treated as above.
Figure 4H:
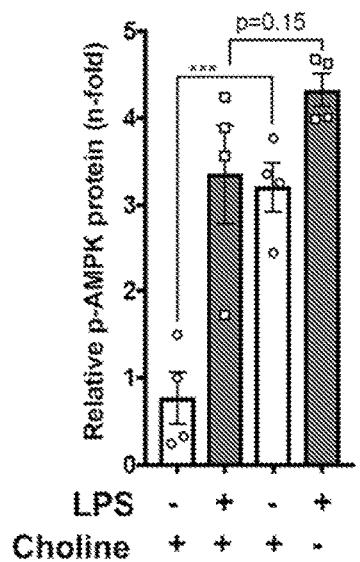
FIG. 4H shows the results of IB analysis of p-AMPK after 24 hr LPS stimulation in the presence or absence of choline. (n=3).
Figure 4I:
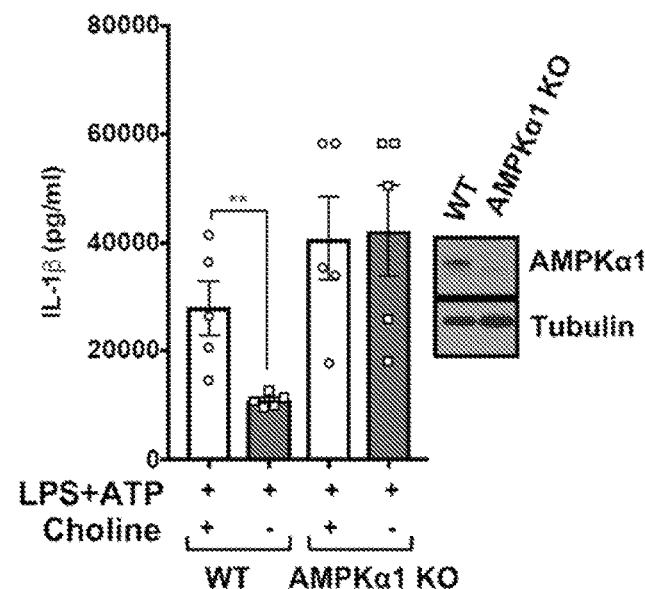
FIG. 4I shows IL-1β release by WT and $Ampk\alpha1^{-/-}$ BMDM cultured in control or choline-deficient medium and stimulated with LPS+ATP. Mean±SEM (n=5).
Figure 4J:
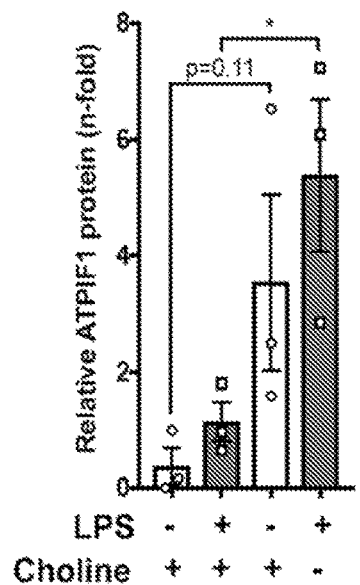
FIG. 4J shows the results of IB analysis of ATPIF1 after 24 hr LPS stimulation in the presence or absence of choline. (n=3). *p<0.05; p<0.01; *p<0.05; ****p<0.001.
Figure 4K:
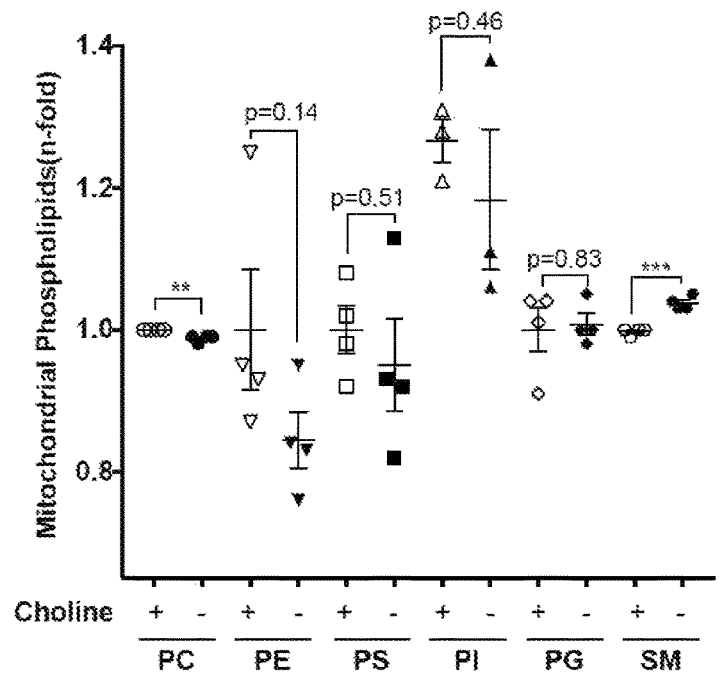
FIG. 4K shows mitochondrial phospholipid changes analyzed by MS in BMDM cultured control or choline-deficient medium for 24 hr. (n=4).
Figure 4L:
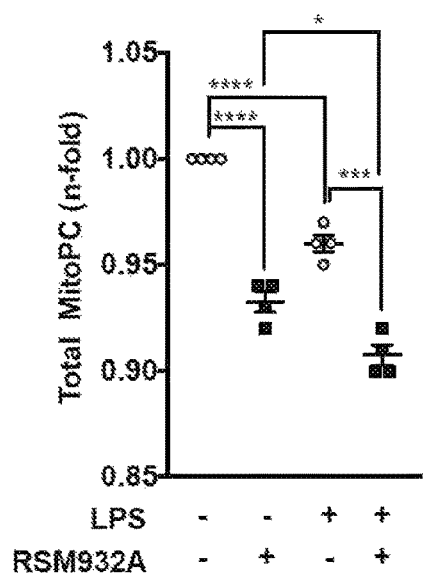
FIG. 4L shows total mitochondrial phosphatidylcholine (mitoPC) and (FIG. 4M) sphingomyelin (mitoSM), determined by mass spectrometry in BMDM cultured in control or choline-deficient medium and stimulated with LPS for 24 hr.
Figure 4M:
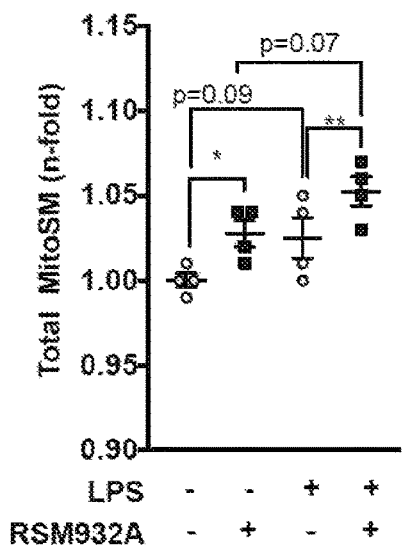
FIGS. 4A-4X are pictorial and graphical diagrams showing that choline deficiency alters mitochondrial lipids and depletes cellular ATP, resulting in AMPK activation and decreased IL-10 production.
FIG. 4B shows total mitochondrial phosphatidylcholine (mitoPC) and (FIG. 4C) sphingomyelin (mitoSM), in BMDM cultured in control or choline-deficient medium and incubated with or without LPS for 24 hr. (n=4).
FIG. 4D shows $NAD^+$/NADH ratio in BMDM cultured and treated as above. Mean±SEM (n=5).
FIGS. 4N and 4O show cellular ATP presented as % of control in shCtrl, shSlc44a1 (FIG. 4N) and shChoKα (FIG. 4O) stimulated with LPS for 24 hr. Mean±SEM (n=6).
FIG. 4P shows $NAD^+$/NADH ratio in LPS-stimulated shCtrl and shSlc44a1 iBMDM. Mean±SEM (n=9).
FIGS. 4Q-4V show the results from IB analysis of indicated proteins and DRP1 amounts in mitochondria in shCtrl and shSlc44a1 (FIGS. 4Q and 4R), shCtrl and shChoKα (FIGS. 4S and 4T), and RSM932A-pretreated BMDM (FIGS. 4U and 4V), treated with or without LPS.
FIG. 4W shows IL-1β release by BMDM pretreated with the AMPK activator A769662, primed with LPS, and stimulated with ATP and nigericin for 40 min. Mean±SEM (n=4).

LPS alters mitochondrial phospholipid and sphingolipid profile—LPS stimulation of BMDM altered mitochondrial lipid profile, decreasing PC and phosphatidylglycerol (PG) content, and increasing phosphatidylserine (PS) and sphingomyelin (SM) content (FIG. 4A). LPS, however, did not alter mitochondrial phosphatidylethanolamine (PE) or phosphatidylinositol (PI) (FIG. 4A). Choline deficiency also reduced mitochondrial PC (mitoPC) and increased mitochondrial SM (mitoSM), (FIG. 4K), changes that were more pronounced after LPS stimulation (FIGS. 4B and 4C). Interruption of de novo synthesis of PC with the ChoKα inhibitor RSM932A showed similar results in mitoPC and mitoSM (FIGS. 4L and 4M).

Figure 4N:
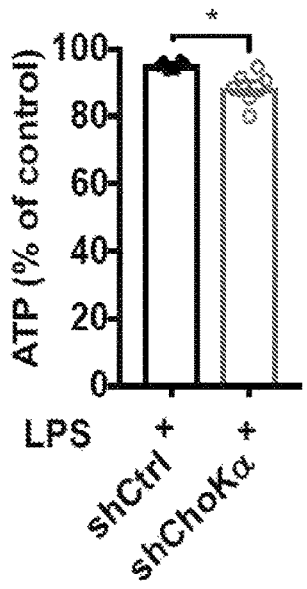
Figure 4O:
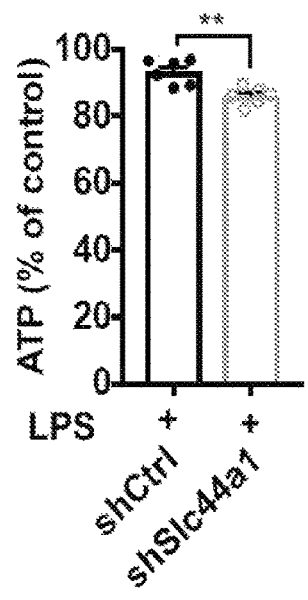
Figure 4P:
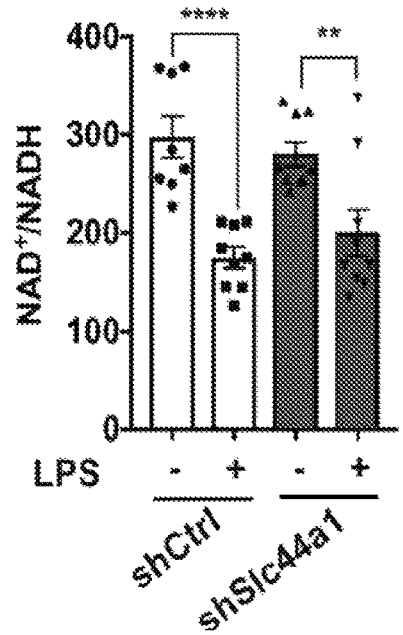
Figure 4Q:
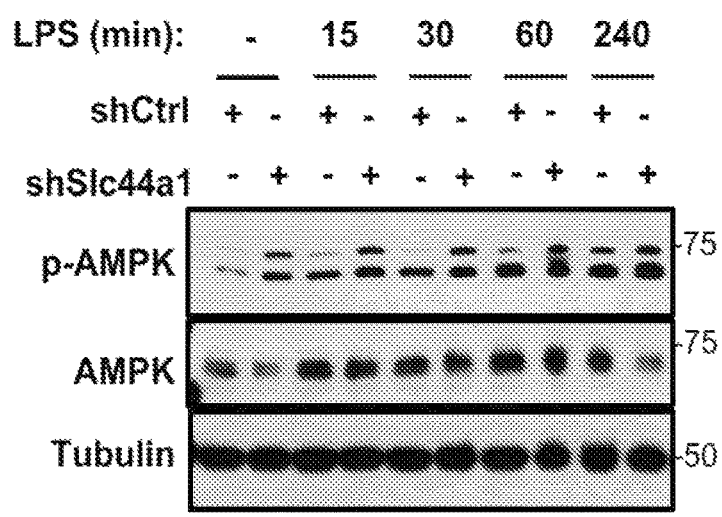
Figure 4R:
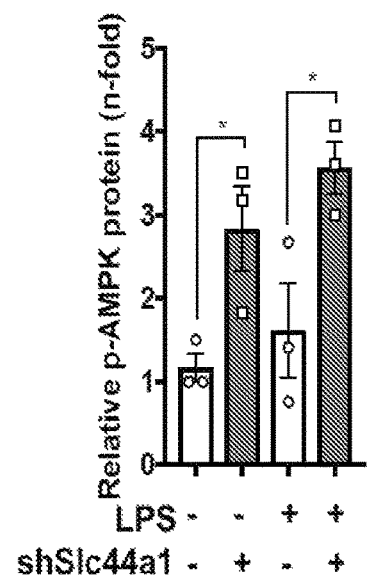
Figure 4S:
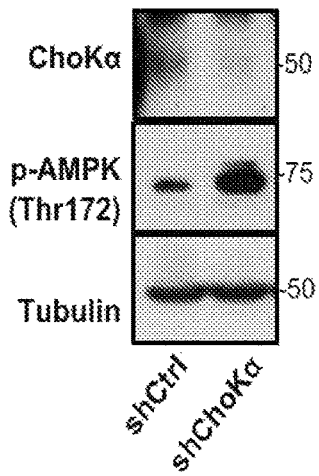
Figure 4T:
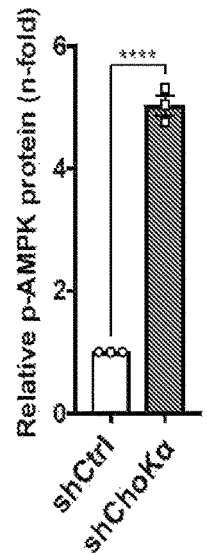
Figure 4U:
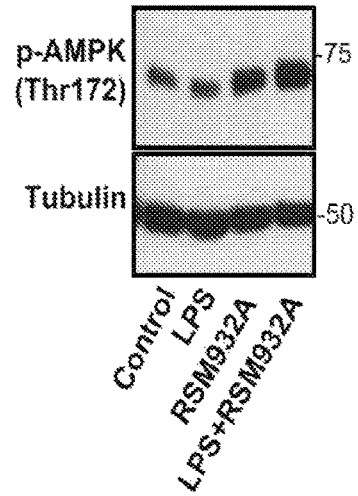
Figure 4V:
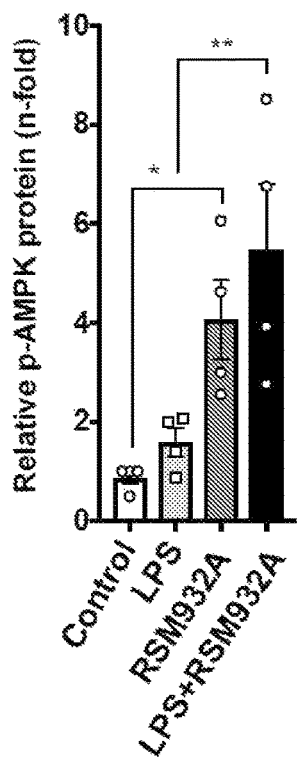
Figure 4W:
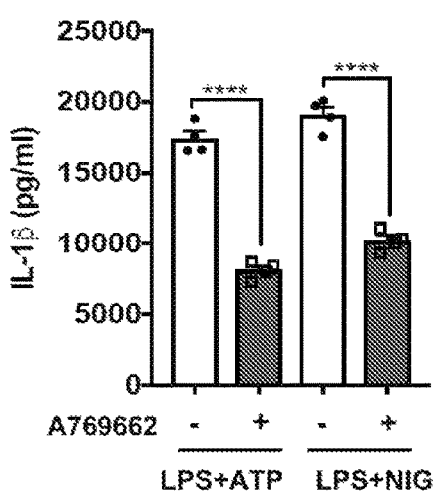

Choline deficiency activates AMPK to inhibit IL-1β production—IL-1β production is tightly regulated by metabolic changes (Mills and O'Neill, 2016). LPS potentiates glycolysis and shuts down oxidative phosphorylation, which results in lower $NAD^+/NADH$ ratio and intracellular ATP (Mills and O'Neill, 2016). Of note, phosphocholine preserves mitochondrial activity by facilitating removal of uncoupling free fatty acids and converting them to phospholipids (Rossi et al., 1962a; Rossi et al., 1962b). In addition, altered mitochondrial membrane integrity due to distorted lipid content affects mitochondrial function and biogenesis (Guo et al., 2005; James et al., 1992; Teodoro et al., 2008). LPS stimulation reduced the $NAD^+/NADH$ ratio, indicating diminished complex I forward activity, regardless of choline status (FIG. 4D). Complex V activity and intracellular ATP were reduced after incubation in choline-deficient medium (FIGS. 4E and 4F). Knockdown of Slc44a1 or ChoKα also reduced intracellular ATP after LPS stimulation (FIGS. 4N and 4O) without affecting the $NAD^+/NADH$ ratio (FIG. 4P), indicating a role of phosphocholine in preserving mitochondrial function. Low intracellular ATP results in AMPK activation which suppresses production of inflammatory cytokines, including IL-1β, through a poorly defined mechanism (O'Neill and Hardie, 2013; Steinberg and Kemp, 2009; Wang et al., 2016). Choline deficiency caused AMPK activation even after LPS stimulation (FIGS. 4G and 4H). Slc44a1 or ChoKα knockdown and ChoKα pharmacological inhibition also promoted AMPK activation (FIGS. 4Q-4V). AMPK activation by the selective AMPK agonist A769662 significantly reduced IL-1β production (FIG. 4W). Consistently, BMDM deficient in AMPKα1, the predominant catalytic subunit, showed enhanced IL-1β release, and choline deficiency in these cells no longer reduced IL-1β production (FIG. 4I). Consistent with inhibition of ATP synthase activity, choline deficiency induced accumulation of ATP synthase inhibitory factor 1 (ATPIF1) (FIGS. 4G and 4J).

Figure 4X:
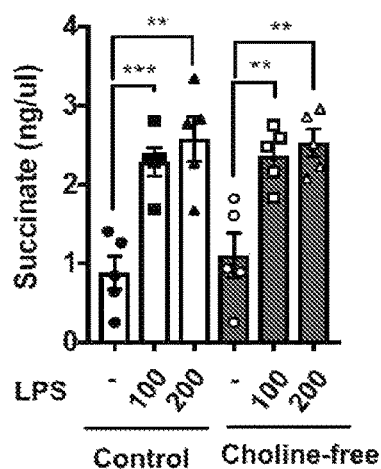

After LPS stimulation, and together with reduction of oxidative phosphorylation, the TCA cycle is also impacted. LPS induces accumulation of two TCA cycle intermediates, citrate and succinate (Tannahill et al., 2013), that potentiate production of NO and PGE2, and IL-1β respectively. However, culture in choline-free medium had no effect on LPS-induced succinate accumulation (FIG. 4X).

Impaired choline uptake and phosphorylation stimulate mitophagy—AMPK activation stimulates autophagy/mitophagy via phosphorylation of ULK1 and mitochondrial fission factor (MFF), a mitochondrial outer-membrane receptor for DRP1, (Egan et al., 2011; Toyama et al., 2016). DRP1 binds to fission sites, which isolate mitochondria with reduced membrane potential, thereby enhancing recruitment of the mitophagy-promoting E3 ubiquitin ligase Parkin (Narendra et al., 2008). It has recently been shown that NF-κB-induced mitophagy facilitates removal of damaged mitochondria, which produce the NLRP3-activating ligand ox-mtDNA (Zhong et al., 2018; Zhong et al., 2016c).

Figure 5F:
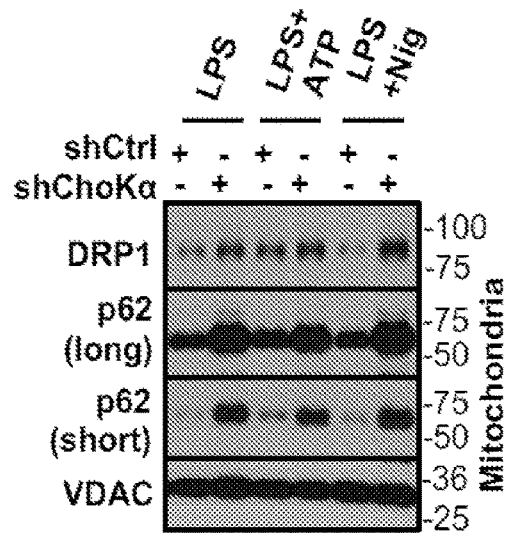
FIG. 5F shows the results from IB analysis of p62, DRP1 and VDAC in mitochondria isolated from LPS-primed and ATP or nigericin-treated shChoKα and shCtrl iBMDM.
Figure 5G:
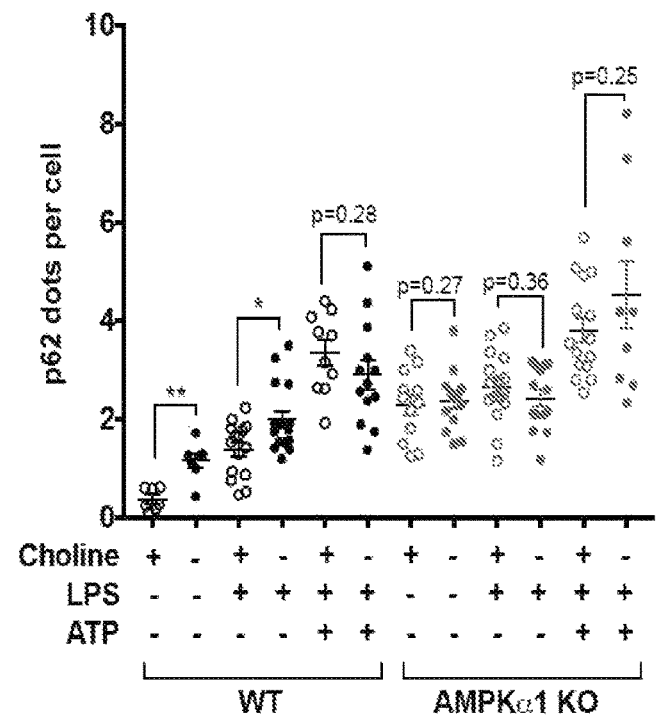
FIG. 5G shows quantitation of mitochondrial p62 aggregates in WT and $Ampk\alpha1^{-/-}$ BMDM cultured in the presence or absence of choline and stimulated with LPS+ATP. Mean±SEM. (n=10-14 high-magnification fields per treatment in two independent experiments).

Knockdown of ChoKα or its pharmacological inhibition with RSM932A reduced mitochondrial membrane potential (Ψm), at least as effectively as the uncoupler carbonyl cyanide m-chlorophenyl hydrazone (CCCP) (FIGS. 5A and 5B). Loss of mitochondrial membrane potential enhanced mitochondrial recruitment of the autophagy adaptor p62/Sqstm1 (FIGS. 5C and 5D) and DRP1 (FIGS. 5E, 5F and 5J-5L), indicating that lack of functional ChoKα activates mitophagy. Choline deficiency also potentiated p62 and DRP1 mitochondrial recruitment (FIGS. 5M-5O).

Figure 5I:
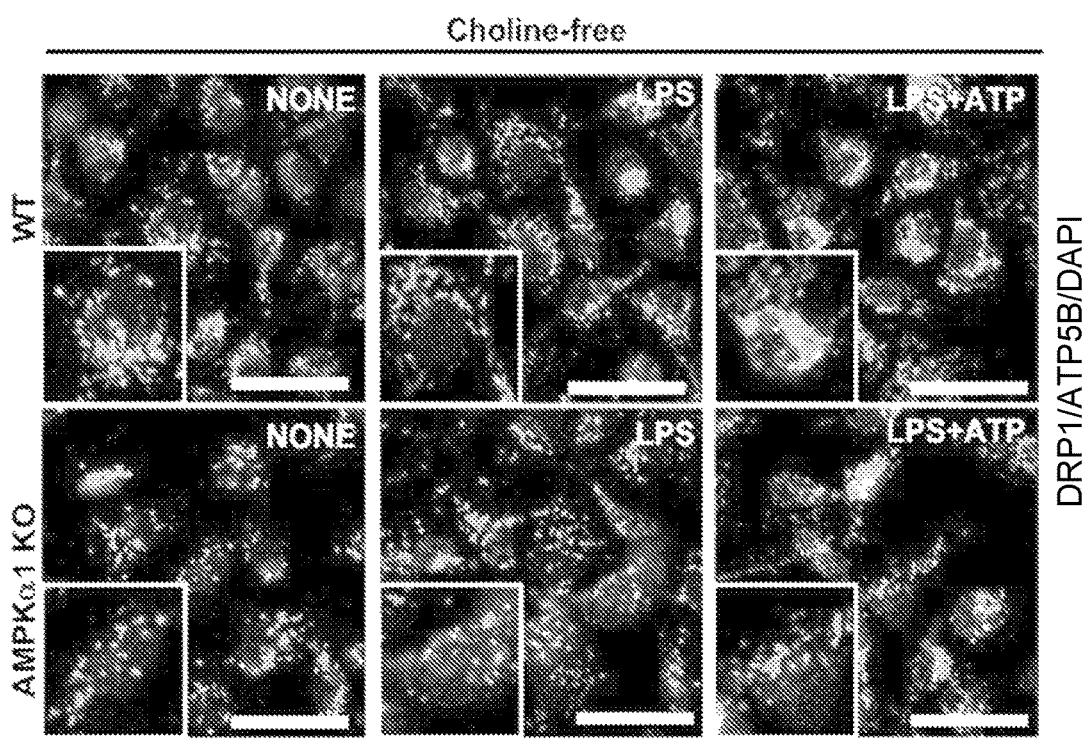
FIG. 5I shows the results from IF analysis of DRP1. Mitochondria were stained with ATP5B antibody. Scale bar: 20 μm (images representative of two experiments). *p<0.05; p<0.01; *p<0.005; ****p<0.001.
Figure 5J:
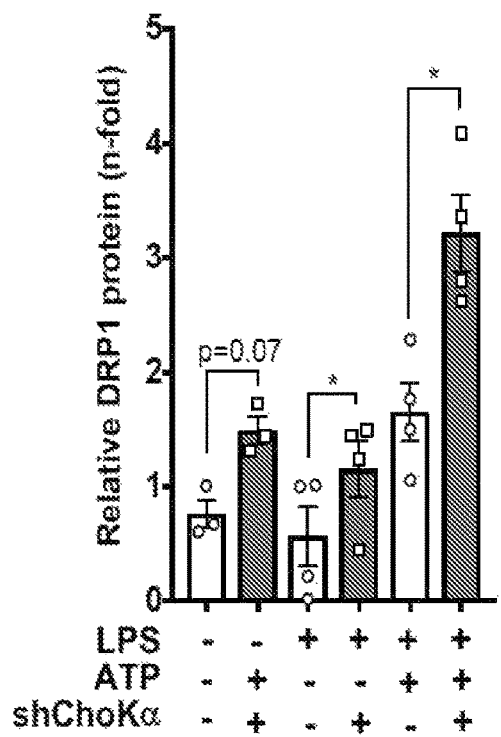
FIG. 5J shows relative DRP1 in mitochondria isolated from shCtrl and shChoKα iBMDM that were LPS-primed and ATP-stimulated. (n=3).
Figure 5L:
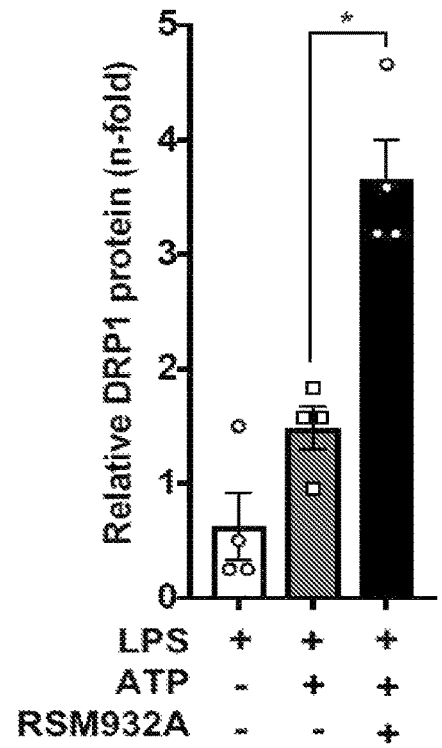
FIG. 5L shows relative DRP1 in mitochondria isolated from BMDM cultured and treated as in FIG. 5K. (n=3).
Figure 5M:
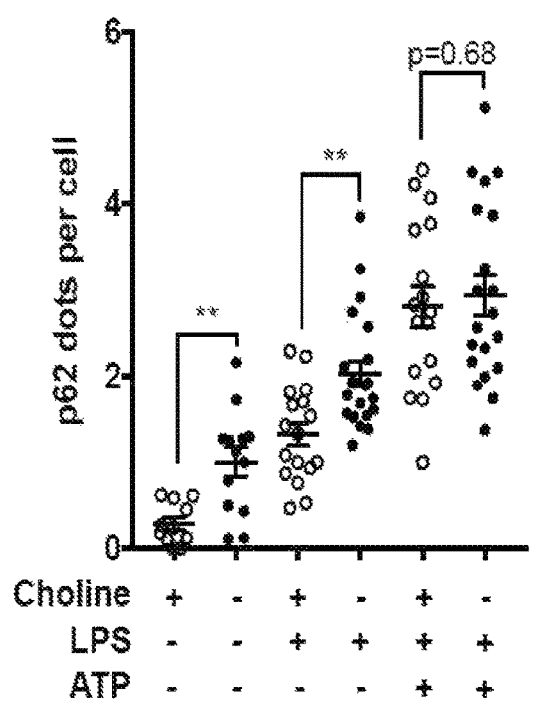
FIG. 5M shows quantitation of mitochondrial p62 aggregates. Mean±SEM. (n=13-20 high-magnification fields per treatment).
Figure 5P:
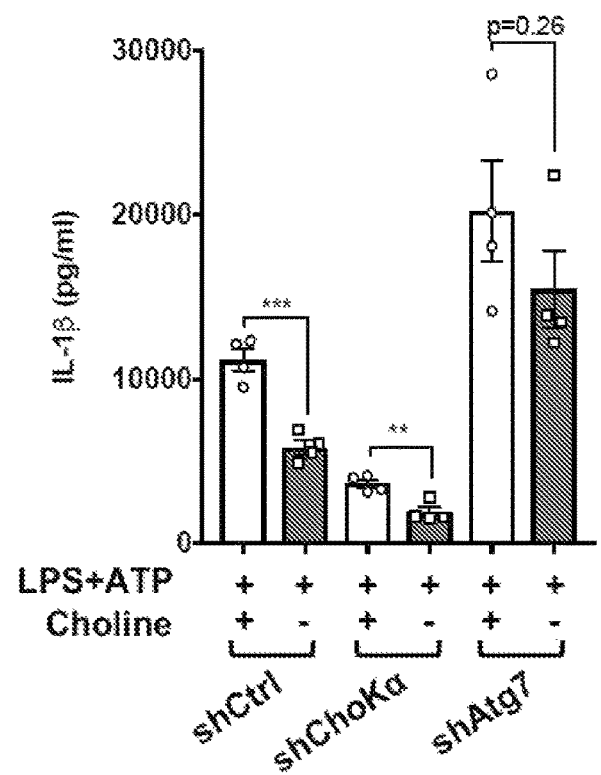
FIG. 5P shows IL-1β release by shCtrl, shChoKα and shAtg7 iBMDM cultured in control or choline-free medium and treated with LPS+ATP. Mean±SEM (n=4).
Figure 5N:
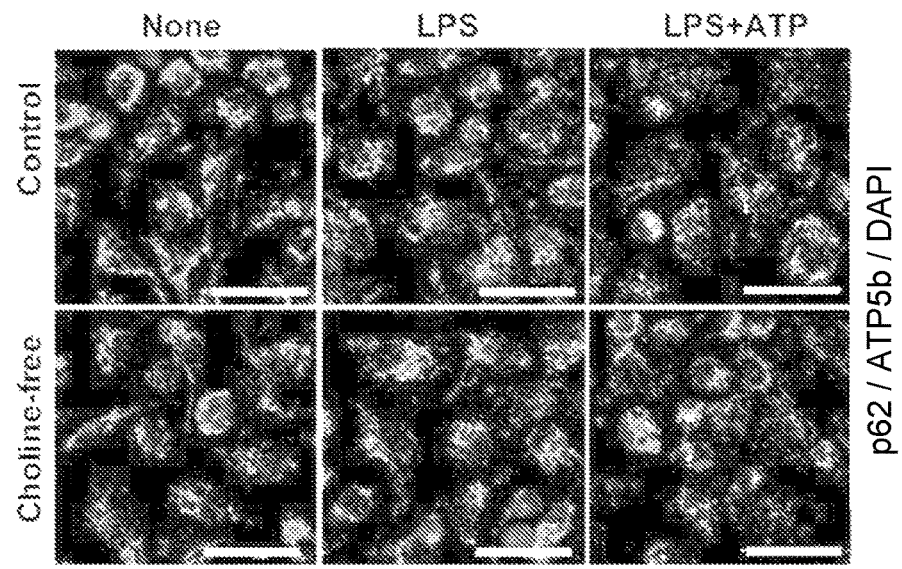
FIG. 5N shows the results from IF analysis of p62 recruitment to mitochondria that were stained with ATP5B antibody. Scale bar: 20 μm (images representative of three experiments).
Figure 5Q:
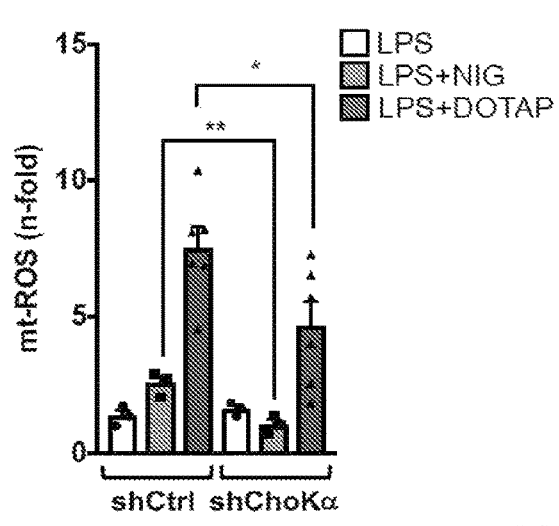
FIG. 5Q shows mtROS accumulation in shCtrl and shChoKα iBMDM, and (FIG. 5R) BMDM pretreated with RSM932A and treated with LPS+DOTAP or LPS+nigericin determined by MitoSox staining. Mean±SEM (n=4-5 and n=3 respectively).
Figure 5R:
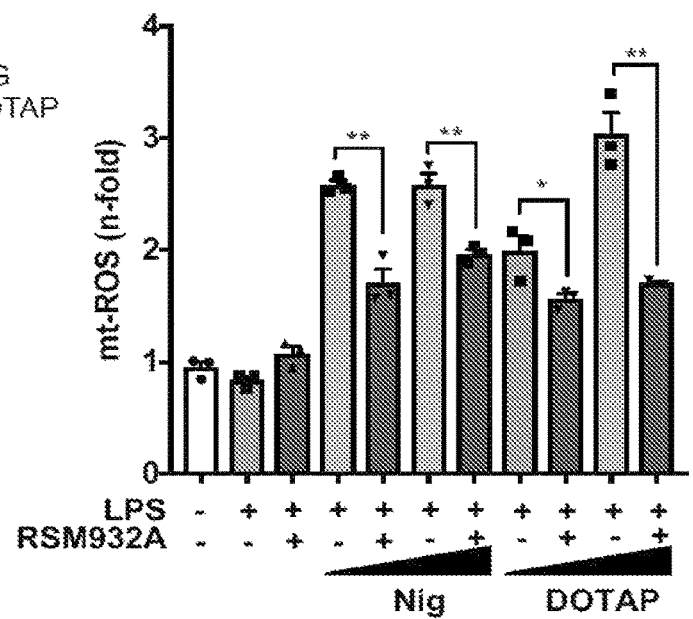
Figure 5S:
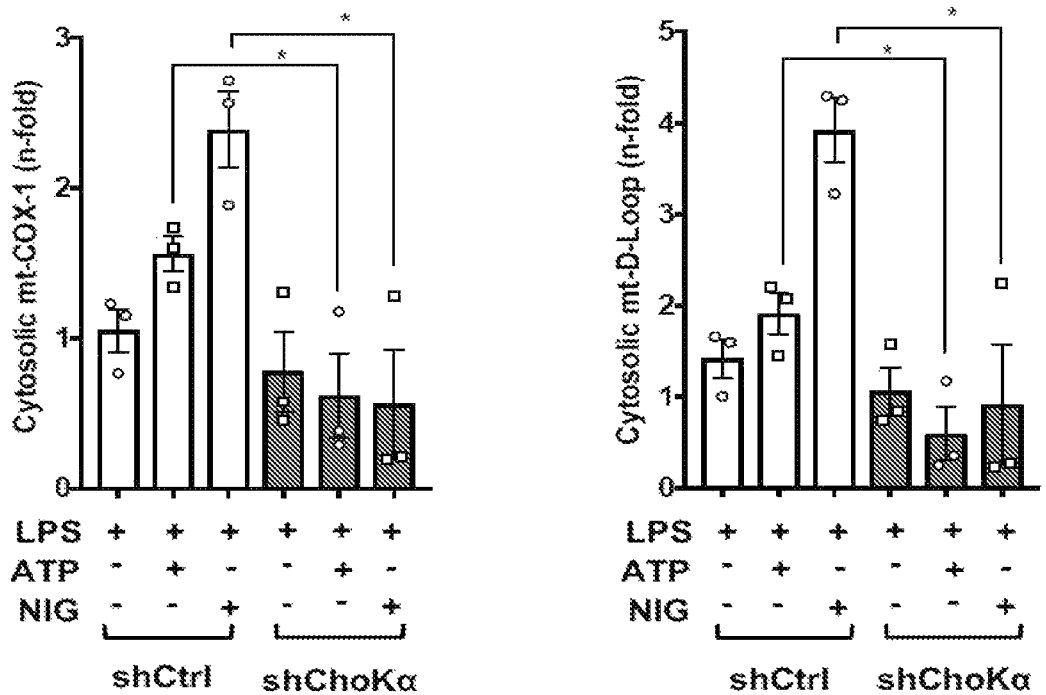
Figure 5T:
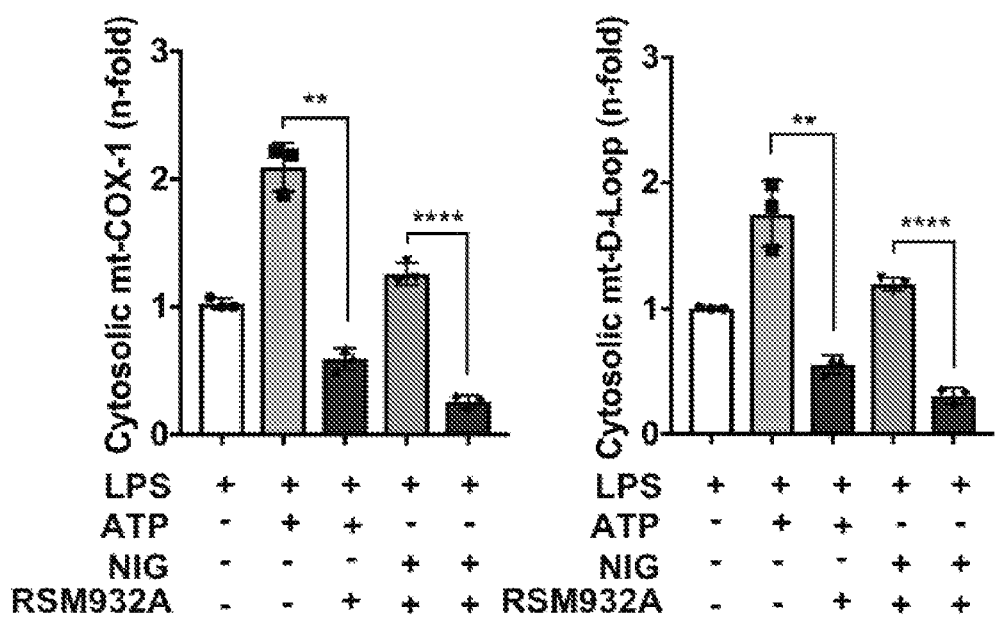

Importantly, AMPKα1 KO BMDM exhibited increased p62 recruitment to the mitochondria regardless of choline availability (FIGS. 5G and 5H), however DRP1 was mainly located in the cytosol, indicating impaired mitophagy (FIG. 5I). Consistently, inhibition of mitophagy through Atg7 knockdown enhanced IL-1β production and abrogated its downregulation in response to reduced choline uptake (FIG. 5P). Consistent with mitophagic elimination of damaged mitochondria, ChoKα knockdown and inhibition attenuated production of mitochondrial reactive oxygen species (mtROS) in macrophages stimulated with various NLRP3 inflammasome activators (FIGS. 5Q and 5R). Furthermore, ChoKα knockdown or inhibition reduced release of fragmented mtDNA to the cytosol (FIG. 5S). Inhibition of ChoKα with RSM932A also reduced the amount of cytosolic mtDNA (FIG. 5T).

Figure 6G:
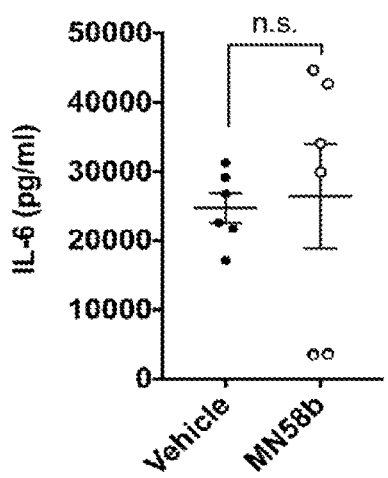

ChoKα inhibition reduces IL-1β-dependent acute inflammation—To validate these in vitro results under more physiologically relevant conditions, two different acute experimental models that are NLRP3-inflammasome-dependent were used. First, mice were subjected to LPS-induced septic shock by intraperitoneal (IP) injection of 50 mg/kg LPS. ChoKα was inhibited by IP injection of 2.5 mg/kg MN58b daily for 3 days prior to LPS challenge. Importantly, ChoKα inhibition prevented LPS-induced death (FIG. 6A), and this was associated with reduced circulating IL-1β (FIG. 6B). As found in vitro, ChoKα inhibition did not inhibit TNF or IL-6 production (FIGS. 6F and 6G). Synovium-like gout air-pouch model was also used. Once the air pouch was created, mice were pretreated with 2.5 mg/kg MN58b or vehicle 24 hr before injection with MSU crystals into the pouch to elicit NLRP3 inflammasome activation and acute gouty inflammation (Hoffman et al., 2010; Martinon et al., 2006; Wang et al., 2016). MSU crystal challenge caused recruitment of macrophages that expressed CTL1 and ChoKα into the pouch (FIG. 6C). Pretreatment with the ChoKα inhibitor attenuated total leukocyte recruitment into the pouch and reduced production of IL-1β (FIGS. 6D and 6E). Together these results indicate that choline phosphorylation is important for mounting acute inflammatory responses and that ChoKα inhibition can attenuate inflammation in vivo.

Figure 7A:
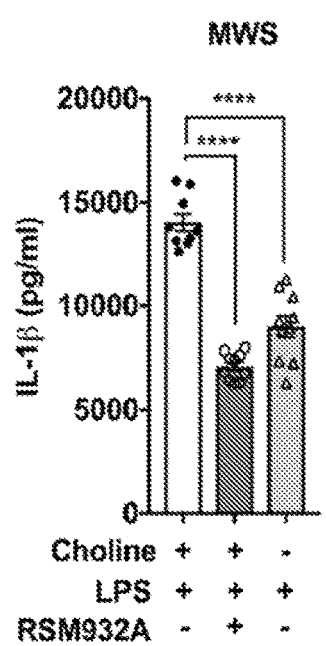
FIGS. 7A-7K are pictorial and graphical diagrams showing that choline kinase inhibition reduces MWS pathology.
Figure 7B:
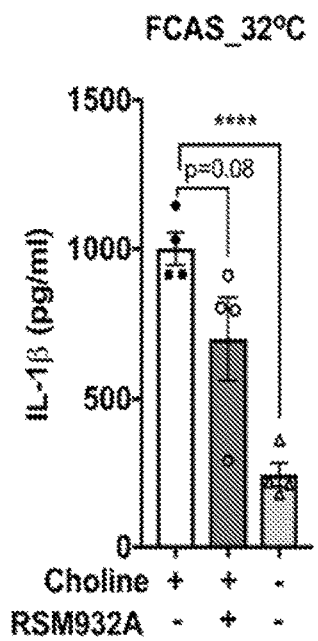
Figure 7C:
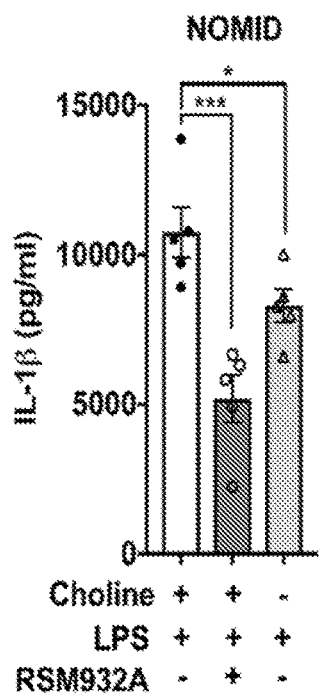
Figure 7D:
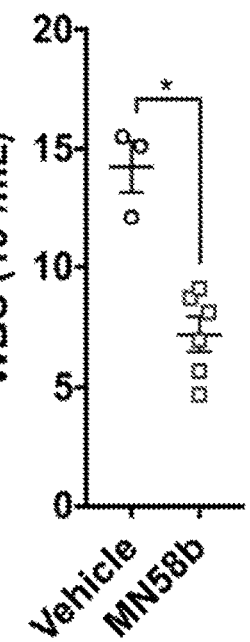
Figure 7E:
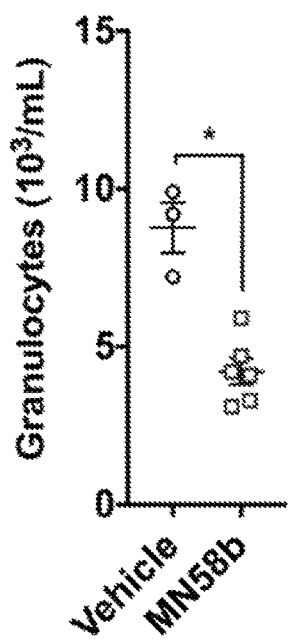
Figure 7F:
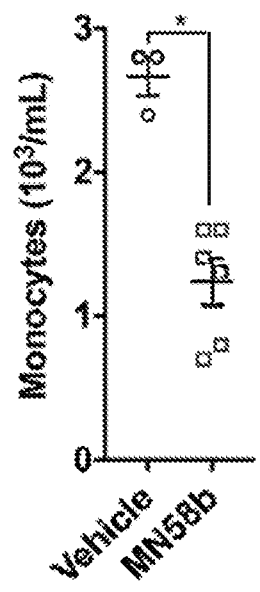
Figure 7G:
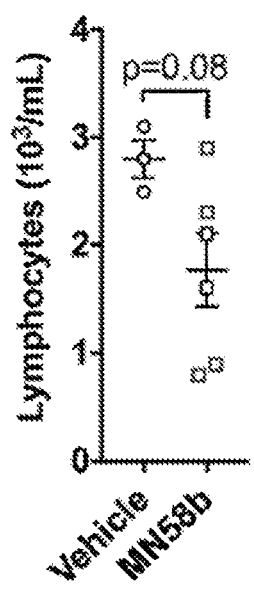
Figure 7H:
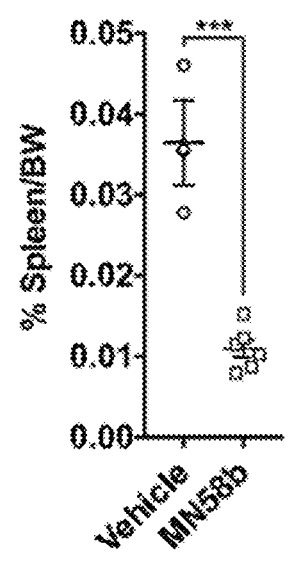
Figure 7I:
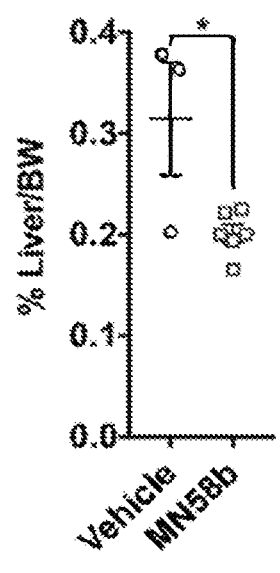
Figure 7J:
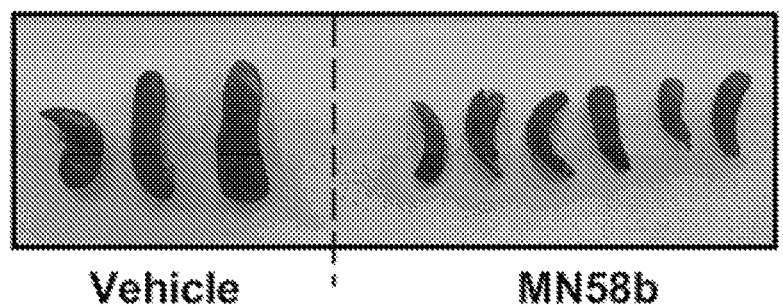
Figure 7K:
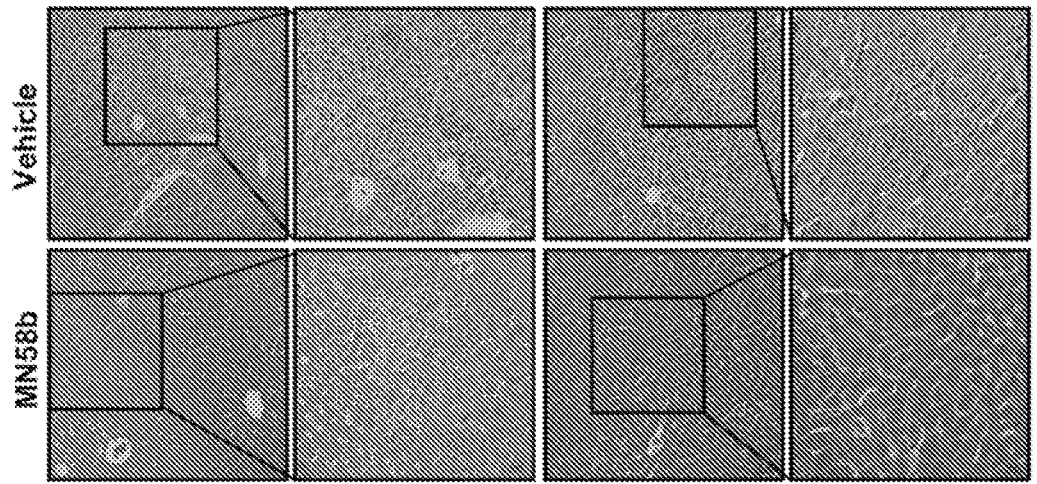

ChoKα inhibition reduces Muckel-Wells syndrome severity—Cryopirin-associated periodic syndromes include three genetic diseases, Muckel-Wells syndrome (MWS), Familial cold autoinflammatory syndrome (FCAS) and Neonatal Onset multisystem inflammatory disease (NOMID), that arise from mutations in NLRP3 gene that results in inflammasome activation (Hoffman et al., 2001). IL-1β production in BMDM isolated from MWS $Nlrp3^{A350VneoRCreT}$, FCAS $Nlrp3^{L351PneoCreT}$, and NOMID $Nlrp3^{D301NneoCreT}$ conditional knock-in mice, was decreased in the absence of choline or in the presence of ChoKα inhibitor (FIGS. 7A, 7B and 7C). Of note, treatment with ChoKα inhibitor MN58b attenuated MWS pathogenesis in vivo, as shown by reduction in total white blood cells count (FIG. 7D), including granulocytes (FIG. 7E) and monocytes (FIG. 7F), without an effect on lymphocyte count (FIG. 7G). In addition, treatment with MN58b reduced MWS splenomegaly (FIGS. 7H and 7I). MN58b also reduced liver size, most likely due to reduced immune cell infiltration (FIGS. 7J and 7K).

SEQUENCES
Human Choline Transporter-Like Protein 1 (CTL1)/Solute Carrier Family 44
Member 1 (SLC44A1), Isoform A, Accession No. NP_536856 (SEQ ID NO: 1):
MGCCSSASSAAQSSKREWKPLEDRSCTDIPWLLLFILFCIGMGFICGFSIATGAAARLVSGYDSYGNICGQKNTKLE
AIPNSGMDHTQRKYVFFLDPCNLDLINRKIKSVALCVAACPRQELKTLSDVQKFAEINGSALCSYNLKPSEYTTSPK
SSVLCPKLPVPASAPIPFFHRCAPVNISCYAKFAEALITFVSDNSVLHRLISGVMTSKEIILGLCLLSLVLSMILMV
IIRYISRVLVWILTILVILGSLGGTGVLWWLYAKQRRSPKETVTPEQLQIAEDNLRALLIYAISATVFTVILFLIML
VMRKRVALTIALFHVAGKVFIHLPLLVFQPFWTFFALVLFWVYWIMTLLFLGTTGSPVQNEQGFVEFKISGPLQYMW
WYHVVGLIWISEFILACQQMTVAGAVVTYYFTRDKRNLPFTPILASVNRLIRYHLGTVAKGSFIITLVKIPRMILMY
IHSQLKGKENACARCVLKSCICCLWCLEKCLNYLNQNAYTATAINSTNFCTSAKDAFVILVENALRVATINTVGDFM
LFLGKVLIVCSTGLAGIMLLNYQQDYTVWVLPLIIVCLFAFLVAHCFLSIYEMVVDVLFLCFAIDTKYNDGSPGREF
YMDKVLMEFVENSRKAMKEAGKGGVADSRELKPMASGASSA Human Choline Kinase alpha (ChoKα), Isoform A, Accession No. NP_001268 (SEQ
ID NO: 2):
MKTKFCTGGEAEPSPLGLLLSCGSGSAAPAPGVGQQRDAASDLESKQLGGQQPPLALPPPPPLPLPLPLPQPPPPQP
PADEQPEPRTRRRAYLWCKEFLPGAWRGLREDEFHISVIRGGLSNMLFQCSLPDTTATLGDEPRKVLLRLYGAILQM
RSCNKEGSEQAQKENEFQGAEAMVLESVMFAILAERSLGPKLYGIFPQGRLEQFIPSRRLDTEELSLPDISAEIAEK
MATFHGMKMPFNKEPKWLFGTMEKYLKEVLRIKFTEESRIKKLHKLLSYNLPLELENLRSLLESTPSPVVFCHNDCQ
EGNILLLEGRENSEKQKLMLIDFEYSSYNYRGFDIGNHFCEWMYDYSYEKYPFFRANIRKYPTKKQQLHFISSYLPA
FQNDFENLSTEEKSIIKEEMLLEVNRFALASHFLWGLWSIVQAKISSIEFGYMDYAQARFDAYFHQKRKLGV Human Choline Kinase beta (ChoKβ), Accession No. NP_005189 (SEQ ID NO: 3):
MAAEATAVAGSGAVGGCLAKDGLQQSKCPDTTPKRRRASSLSRDAERRAYQWCREYLGGAWRRVQPEELRVYPVSGG
LSNLLFRCSLPDHLPSVGEEPREVLLRLYGAILQGVDSLVLESVMFAILAERSLGPQLYGVFPEGRLEQYIPSRPLK
TQELREPVLSAAIATKMAQFHGMEMPFTKEPHWLFGTMERYLKQIQDLPPTGLPEMNLLEMYSLKDEMGNLRKLLES
TPSPVVFCHNDIQEGNILLLSEPENADSLMLVDFEYSSYNYRGFDIGNHFCEWVYDYTHEEWPFYKARPTDYPTQEQ
QLHFIRHYLAEAKKGETLSQEEQRKLEEDLLVEVSRYALASHFFWGLWSILQASMSTIEFGYLDYAQSRFQFYFQQK
GQLTSVHSSS Human Interleukin-1 beta (IL-1β), Accession No. NP_000567 (SEQ ID NO: 4):
MAEVPELASEMMAYYSGNEDDLFFEADGPKQMKCSFQDLDLCPLDGGIQLRISDHHYSKGFRQAASVVVAMDKLRKM
LVPCPQTFQENDLSTFFPFIFEEEPIFFDTWDNEAYVHDAPVRSLNCTLRDSQQKSLVMSGPYELKALHLQGQDMEQ
QVVFSMSFVQGEESNDKIPVALGLKEKNLYLSCVLKDDKPTLQLESVDPKNYPKKKMEKRFVFNKIEINNKLEFESA
QFPNWYISTSQAENMPVFLGGTKGGQDITDFTMQFVSS Human Interleukin-18 (IL-18), Isoform 1, Accession No. Q14116 (SEQ ID NO: 5):
MAAEPVEDNCINFVAMKFIDNTLYFIAEDDENLESDYFGKLESKLSVIRNLNDQVLFIDQGNRPLFEDMTDSDCRDN
APRTIFIISMYKDSQPRGMAVTISVKCEKISTLSCENKIISFKEMNPPDNIKDTKSDIIFFQRSVPGHDNKMQFESS
SYEGYFLACEKERDLFKLILKKEDELGDRSIMFTVQNED Human Interleukin 10 (IL-10), Accession No. Q6FGW4-1 (SEQ ID NO: 6):
MHSSALLCCLVLLTGVRASPGQGTQSENSCTHFPGNLPNMLRDLRDAFSRVKTFFQMKDQLDNLLLKESLLEDFKGY
LGCQALSEMIQFYLEEVMPQAENQDPDIKAHVNSLGENLKTLRLRLRRCHRFLPCENKSKAVEQVKNAFNKLQEKGI
YKAMSEFDIFINYIEAYMTMKIRN Human Interleukin 6 (IL-6), Isoform 1, Accession No. NP_000591 (SEQ ID NO: 7):
MNSFSTSAFGPVAFSLGLLLVLPAAFPAPVPPGEDSKDVAAPHRQPLTSSERIDKQIRYILDGISALRKETCNKSNM
CESSKEALAENNLNLPKMAEKDGCFQSGFNEETCLVKIITGLLEFEVYLEYLQNRFESSEEQARAVQMSTKVLIQFL
QKKAKNLDAITTPDPTTNASLLTKLQAQNQWLQDMTTHLILRSFKEFLQSSLRALRQM NACHT, LRR and PYD domains-containing protein 3 (NALP3), Isoform A,
Accession No. NP_004886 (SEQ ID NO: 8):
MKMASTRCKLARYLEDLEDVDLKKFKMHLEDYPPQKGCIPLRGQTEKADHVDLATLMIDFNGEEKAWAMAVWIFAA
INRRDLYEKAKRDEPKWGSDNARVSNPTVICQEDSIEEEWMGLLEYLSRISICKMKKDYRKKYRKYVRSRFQCIEDR
NARLGESVSLNKRYTRLRLIKEHRSQQEREQELLAIGKTKTCEGVMKLFLFPDDEHSEPVHTVVFQGAAGIG
KTILARKMMLDWASGTLYQDRFDYLFYIHCREVSLVTQRSLGDLIMSCCPDPNPPIHKIVRKPSRILFLMDGFDELQ
GAFDEHIGPLCTDWQKAERGDILLSSLIRKKLLPEASLLITTRPVALEKLQHLLDHPRHVEILGFSEAKRKEYFFKY
FSDEAQARAAFSLIQENEVLFTMCFIPLVCWIVCTGLKQQMESGKSLAQTSKTTTAVYVFFLSSLLQPRGGSQEHGL
CAHLWGLCSLAADGIWNQKILFEESDLRNHGLQKADVSAFLRMNLFQKEVDCEKFYSFIHMTFQEFFAAMYYLLEEE
KEGRTNVPGSRLKLPSRDVTVLLENYGKFEKGYLIFVVRFLFGLVNQERTSYLEKKLSCKISQQIRLELLKWIEVKA
KAKKLQIQPSQELFYCLYEMQEEDFVQRAMDYFPKIEINLSTRMDHMVSSFCIENCHRVESLSLGFLHNMPKEEEE
EEKEGRHLDMVQCVLPSSSHAACSHGLVNSHLTSSFCRGLFSVLSTSQSLTELDLSDNSLGDPGMRVLCETLQHPGC
NIRRLWLGRCGLSHECCFDISLVLSSNQKLVELDLSDNALGDFGIRLLCVGLKHLLCNLKKLWLVSCCLTSACCQDL
ASVLSTSHSLTRLYVGENALGDSGVAILCEKAKNPQCNLQKLGLVNSGLTSVCCSALSSVLSTNQNLTHLYLRGNTL
GDKGIKLLCEGLLHPDCKLQVELDNCNLTSHCCWDLSTLLTSSQSLRKLSLGNNDLGDLGVMMFCEVLKQQSCLLQ
NLGLSEMYFNYETKSALETLQEEKPELTVVFEPSW Human Ubiquitin-like Modifier-Activating Enzyme ATG7, Isoform 1, Accession No.
O95352-1 (SEQ ID NO: 9):
MAAATGDPGLSKLQFAPFSSALDVGFWHELTQKKLNEYRLDEAPKDIKGYYYNGDSAGLPARLTLEFSAFDMSAPTP
ARCCPAIGTLYNTNTLESFKTADKKLLLEQAANEIWESIKSGTALENPVLLNKFLLLTFADLKKYHFYYWFCYPALC
LPESLPLIQGPVGLDQRFSLKQIEALECAYDNLCQTEGVTALPYFLIKYDENMVLVSLLKHYSDFFQGQRTKITIGV
YDPCNLAQYPGWPLRNFVLAAHRWSSSFQSVEVCFRDRTMQGARDVAHSIIFEVKLPEMAFSPDCPKAVGWEKNQ
KGGMGPRMVNLSECMDPKRLAESSVDLNLKLMCWRLVPTLDLDKVVSVKCLLLGAGTLGCNVARTLMGWGVRHITFV
DNAKISYSNPVRQPLYEFEDCLGGGKPKALAAADRLQKIFPGVNARGFNMSIPMPGHPVNFSSVTLEQARRDVEQLE
QLIESHDVVFLLMDTRESRWLPAVIAASKRKLVINAALGFDTFVVMRHGLKKPKQQGAGDLCPNHPVASADLLGSSL -continued FANIPGYKLGCYFCNDVVAPGDSTRDRTLDQQCTVSRPGLAVIAGALAVELMVSVLQHPEGGYAIASSSDDRMNEPP
TSLGLVPHQIRGFLSRFDNVLPVSLAFDKCTACSSKVLDQYEREGFNFLAKVFNSSHSFLEDLTGLTLLHQETQAAE
IWDMSDDETI Human inhibitor of nuclear factor kappa-B kinase subunit beta (IKKβ), Isoform 1,
Accession No. O14920-1 (SEQ ID NO: 10):
MSWSPSLTTQTCGAWEMKERLGTGGEGNVIRWHNQETGEQIAIKQCRQELSPRNRERWCLEIQIMRRLTHPNVVAAR
DVPEGMQNLAPNDLPLLAMEYCQGGDLRKYLNQFENCCGLREGAILTLLSDIASALRYLHENRIIHRDLKPENIVLQ
QGEQRLIHKIIDLGYAKELDQGSLCTSFVGTLQYLAPELLEQQKYTVTVDYWSEGTLAFECITGFRPFLPNWQPVQW
HSKVRQKSEVDIVVSEDLNGTVKFSSSLPYPNNLNSVLAERLEKWLQLMLMWHPRQRGTDPTYGPNGCFKALDDILN
LKLVHILNMVTGTIHTYPVTEDESLQSLKARIQQDTGIPEEDQELLQEAGLALIPDKPATQCISDGKLNEGHTLDMD
LVFLEDNSKITYETQISPRPQPESVSCILQEPKRNLAFFQLRKVWGQVHSIQTLKEDCNRLQQGQRAAMMNLLRNN
SCLSKMKNSMASMSQQLKAKLDFFKTSIQIDLEKYSEQTEFGITSDKLLLAWREMEQAVELCGRENEVKLLVERMMA
LQTDIVDLQRSPMGRKQGGTLDDLEEQARELYRRLREKPRDQRTEGDSQEMVRLLLQAIQSFEKKVRVIYTQLSKTV
VCKQKALELLPKVEEVVSLMNEDEKTVVRLQEKRQKELWNLLKIACSKVRGPVSGSPDSMNASRLSQPGQLMSQPST
ASNSLPEPAKKSEELVAEAHNLCTLLENAIQDTVREQDQSFTALDWSWLQTEEEEHSCLEQAS An exemplary nucleic acid sequence of shSlc44a1 (SEQ ID NO: 11):
5'-CCGGGCATCAGTGAATCGCCTTATTCTCGAGAATAAGGCGATTCACTGATGCTTTTTG-3'

An exemplary nucleic acid sequence of shChka (SEQ ID NO: 12):
5'-CCGGGTTACTTGACTACATTCCAAACTCGAGTTTGGAATGTAGTCAAGTAACTTTTT-3'

An exemplary nucleic acid sequence of shAtg7 (SEQ ID NO: 13):
5'-CCGGCCAGCTCTGAACTCAATAATACTCGAGTATTATTGAGTTCAGAGCTGGTTTTTG-3'

Primers for mouse Hprt1:
Forward:
(SEQ ID NO: 14)
CTGGTGAAAAGGACCTCTCG;

Reverse:
(SEQ ID NO: 15)
TGAAGTACTCATTATAGTCAAGGGCA.

Primers for mouse ChKa:
Forward:
(SEQ ID NO: 16)
GCTGCAGTATACTAGATCTCCAGTTGT;

Reverse:
(SEQ ID NO: 17)
ATCAGCTTCCGCCTTTCA.

Primers for mouse ChKb:
Forward:
(SEQ ID NO: 18)
GCAGAGGTTCAGAAGGGTGA;

Reverse:
(SEQ ID NO: 19)
CCCCAGAAAAAGTGAGATGC.

Primers for mouse Slc44a1:
Forward:
(SEQ ID NO: 20)
TTTGCCCAAGCTACCAG;

Reverse:
(SEQ ID NO: 21)
GAGCACAGCGATGGAAGAA.

Primers for mouse Slc44a2:
Forward:
(SEQ ID NO: 22)
CCTGGTGCTTGGCTATGG;

Reverse:
(SEQ ID NO: 23)
CAAGGTCCAGGGAGA.

Primers for mouse Slc44a3:
Forward:
(SEQ ID NO: 24)
GGTCATTTTGGGATTGCTGT;

Reverse:
(SEQ ID NO: 25)
ACTGAGGTCGTTGGTGTAGTCA.

Primers for mouse Slc44a4:
Forward:
(SEQ ID NO: 26)
ACTCTGTCCCCGTTTCCTTC;

Reverse:
(SEQ ID NO: 27)
AAGTTGATGTTGGGGAGTGG.

Primers for mouse Slc44a5:
Forward:
(SEQ ID NO: 28)
ATCCAAGTGGCCATCATCC;

Reverse:
(SEQ ID NO: 29)
GATTAACGCACTGGGAAGGT.

Primers for mouse Il1b:
Forward:
(SEQ ID NO: 30)
AGTTGACGGACCCCAAAAG;

Reverse:
(SEQ ID NO: 31)
AGCTGGATGCTCTCATCAGG.

Primers for mouse Il6:
Forward:
(SEQ ID NO: 32)
CCAGGTAGCTATGGTACTCCA;

Reverse:
(SEQ ID NO: 33)
GCTACCAAACTGGCTATAATC.

Primers for mouse Tnf
Forward:
(SEQ ID NO: 34)
CCCTCACACTCAGATCATCTT;

Reverse:
(SEQ ID NO: 35)
GCTACGACGTGGGCTACAG.

Primers for mouse Il10:
Forward:
(SEQ ID NO: 36)
CAGAGCCACATGCTCCTAGA;

Reverse:
(SEQ ID NO: 37)
TGTCCAGCTGGTCCTTTGTT.

Primers for mouse Il10rb:
Forward:
(SEQ ID NO: 38)
TCTCTTCCACAGCACCTGAA;

Reverse:
(SEQ ID NO: 39)
GAACACCTCGGCCTCCTC.

Primers for mouse Nos2:
Forward:
(SEQ ID NO: 40)
CTTTGCCACGGACGAGAC;

Reverse:
(SEQ ID NO: 41)
TCATTGTACTCTGAGGGCTGAC.

Primers for mouse Cox1:
Forward:
(SEQ ID NO: 42)
GCCCCAGATATAGCATTCCC;

Reverse:
(SEQ ID NO: 43)
GTTCATCCTGTTCCTGCTCC.

```
Primers for mouse D-loop:
Forward:
                                                              (SEQ ID NO: 44)
AATCTACCATCCTCCGTGAAACC;

Reverse:
                                                              (SEQ ID NO: 45)
TCAGTTTAGCTACCCCCAAGTTTAA.

Primers for mouse 18S:
Forward:
                                                              (SEQ ID NO: 46)
TAGAGGGACAAGTGGCGTTC;

Reverse:
                                                              (SEQ ID NO: 47)
CGCTGAGCCAGTCAGTGT.

Primers for mouse Tert:
Forward:
                                                              (SEQ ID NO: 48)
CTAGCTCATGTGTCAAGACCCTCTT;

Reverse:
                                                              (SEQ ID NO: 49)
GCCAGCACGTTTCTCTCGTT.
```

References (each of which is incorporated herein by reference):

Al-Saffar, et al. (2006). Noninvasive magnetic resonance spectroscopic pharmacodynamic markers of the choline kinase inhibitor MN58b in human carcinoma models. Cancer Res 66, 427-434.

Aoyama, C., Liao, H., and Ishidate, K. (2004). Structure and function of choline kinase isoforms in mammalian cells. Prog Lipid Res 43, 266-281.

Ben-Neriah, Y., and Karin, M. (2011). Inflammation meets cancer, with NF-kappaB as the matchmaker. Nat Immunol 12, 715-723.

Bonar, et al. (2012). Constitutively activated NLRP3 inflammasome causes inflammation and abnormal skeletal development in mice. PLoS One 7, e35979.

Brydges, et al. (2009). Inflammasome-mediated disease animal models reveal roles for innate but not adaptive immunity. Immunity 30, 875-887.

Busso, N., and So, A. (2010). Mechanisms of inflammation in gout. Arthritis Res Ther 12, 206.

Campanella, M., Parker, N., Tan, C. H., Hall, A. M., and Duchen, M. R. (2009). IF(1): setting the pace of the F(1)F(o)-ATP synthase. Trends Biochem Sci 34, 343-350.

Chen, J., and Chen, Z. J. (2018). PtdIns4P on dispersed trans-Golgi network mediates NLRP3 inflammasome activation. Nature 564, 71-76.

Chu, A. J. (1992). Bacterial lipopolysaccharide stimulates phospholipid synthesis and phosphatidylcholine breakdown in cultured human leukemia monocytic THP-1 cells. Int J Biochem 24, 317-323.

Cordero, M. D., Williams, M. R., and Ryffel, B. (2018). AMP-Activated Protein Kinase Regulation of the NLRP3 Inflammasome during Aging. Trends Endocrinol Metab 29, 8-17.

de la Roche, et al., (2018). Trafficking of cholesterol to the ER is required for NLRP3 inflammasome activation. J. Cell Biol. 217, 3560-3576.

Egan, et al. (2011). Phosphorylation of ULK1 (hATG1) by AMP-activated protein kinase connects energy sensing to mitophagy. Science 331, 456-461.

Elliott, E. I., and Sutterwala, F. S. (2015). Initiation and perpetuation of NLRP3 inflammasome activation and assembly. Immunol Rev 265, 35-52.

Glunde, K., Bhujwalla, Z. M., and Ronen, S. M. (2011). Choline metabolism in malignant transformation. Nat Rev Cancer 11, 835-848.

Greten, et al. (2007). NF-kappaB is a negative regulator of IL-1beta secretion as revealed by genetic and pharmacological inhibition of IKKbeta. Cell 130, 918-931.

Grove, R. I., Allegretto, N.J., Kiener, P. A., and Warr, G. A. (1990). Lipopolysaccharide (LPS) alters phosphatidylcholine metabolism in elicited peritoneal macrophages. J Leukoc Biol 48, 38-42.

Guma, et al. (2015a). Choline kinase inhibition in rheumatoid arthritis. Ann Rheum Dis 74, 1399-1407.

Guma, M., Wang, Y., Viollet, B., and Liu-Bryan, R. (2015b). AMPK Activation by A-769662 Controls IL-6 Expression in Inflammatory Arthritis. PLoS One 10, e0140452.

Guo, H., Callaway, J. B., and Ting, J. P. (2015). Inflammasomes: mechanism of action, role in disease, and therapeutics. Nat Med 21, 677-687.

Guo, et al. (2005). Mitochondrial dysfunction in choline deficiency-induced apoptosis in cultured rat hepatocytes. Free Radic Biol Med 39, 641-650.

Hellberg, et al. (2016). Type 2 diabetes enhances arterial uptake of choline in atherosclerotic mice: an imaging study with positron emission tomography tracer (1)(8)F-fluoromethylcholine. Cardiovasc Diabetol 15, 26.

Heneka, et al. (2013). NLRP3 is activated in Alzheimer's disease and contributes to pathology in APP/PS1 mice. Nature 493, 674-678.

Hoffman, et al. (2010). Role of the leucine-rich repeat domain of cryopyrin/NALP3 in monosodium urate crystal-induced inflammation in mice. Arthritis Rheum 62, 2170-2179.

Hoffman, H. M., Wanderer, A. A., and Broide, D. H. (2001). Familial cold autoinflammatory syndrome: phenotype and genotype of an autosomal dominant periodic fever. J Allergy Clin Immunol 108, 615-620.

Hornung, V., Bauernfeind, F., Halle, A., Samstad, E. O., Kono, H., Rock, K. L., Fitzgerald, K. A., and Latz, E. (2008). Silica crystals and aluminum salts activate the NALP3 inflammasome through phagosomal destabilization. Nat Immunol 9, 847-856.

Huang, Z., Rui, J., Li, X., Meng, X., and Liu, Q. (2015). Use of (1)(1)C-Choline positron emission tomography/computed tomography to investigate the mechanism of choline metabolism in lung cancer. Mol Med Rep 11, 3285-3290.

Ip, W. K. E., Hoshi, N., Shouval, D. S., Snapper, S., and Medzhitov, R. (2017). Antiinflammatory effect of IL-10 mediated by metabolic reprogramming of macrophages. Science 356, 513-519.

James, S. J., Cross, D. R., and Miller, B. J. (1992). Alterations in nucleotide pools in rats fed diets deficient in choline, methionine and/or folic acid. Carcinogenesis 13, 2471-2474.

Lacal, J. C., and Campos, J. M. (2015). Preclinical characterization of RSM-932A, a novel anticancer drug targeting the human choline kinase alpha, an enzyme involved in increased lipid metabolism of cancer cells. Mol Cancer Ther 14, 31-39.

Lee, et al. (2012). The calcium-sensing receptor regulates the NLRP3 inflammasome through Ca2+ and cAMP. Nature 492, 123-127.

Li, B., and Webster, T. J. (2018). Bacteria antibiotic resistance: New challenges and opportunities for implant-associated orthopedic infections. J. Orthop. Res. 36, 22-32.

Lodi, et al. (2017). Combinatorial treatment with natural compounds in prostate cancer inhibits prostate tumor growth and leads to key modulations of cancer cell metabolism. NPJ precision oncology 1, 18.

Lu, et al. (2017). The early metabolomic response of adipose tissue during acute cold exposure in mice. Scientific Reports 7, 3455.

Ludwig, et al. (2012). Birmingham Metabolite Library: a publicly accessible database of 1-D 1H and 2-D 1H J-resolved NMR spectra of authentic metabolite standards (BML-NMR). Metabolomics 8, 8-18.

Ludwig, C., and Gunther, U. L. (2011). MetaboLab-advanced NMR data processing and analysis for metabolomics. BMC bioinformatics 12, 366.

Martinon, et al. (2009). The inflammasomes: guardians of the body. Annu Rev Immunol 27, 229-265.

Martinon, et al. (2006). Gout-associated uric acid crystals activate the NALP3 inflammasome. Nature 440, 237-241.

Matter, et al. (2006). 18F-choline images murine atherosclerotic plaques ex vivo. Arterioscler Thromb Vasc Biol 26, 584-589.

McMaster, C. R. (2018). From yeast to humans—roles of the Kennedy pathway for phosphatidylcholine synthesis. FEBS Lett 592, 1256-1272.

Mills, et al. (2016). Succinate Dehydrogenase Supports Metabolic Repurposing of Mitochondria to Drive Inflammatory Macrophages. Cell 167, 457-470 e413.

Mills, E. L., and O'Neill, L. A. (2016). Reprogramming mitochondrial metabolism in macrophages as an anti-inflammatory signal. Eur J Immunol 46, 13-21.

Mishra, et al. (2013). Nitric oxide controls the immunopathology of tuberculosis by inhibiting NLRP3 inflammasome-dependent processing of IL-1beta. Nat Immunol 14, 52-60.

Mridha, et al. (2017). NLRP3 inflammasome blockade reduces liver inflammation and fibrosis in experimental NASH in mice. J Hepatol 66, 1037-1046.

Munoz-Planillo, et al. (2013). K(+) efflux is the common trigger of NLRP3 inflammasome activation by bacterial toxins and particulate matter. Immunity 38, 1142-1153.

Murakami, et al. (2012). Critical role for calcium mobilization in activation of the NLRP3 inflammasome. Proc Natl Acad Sci USA 109, 11282-11287.

Nakahira, et al. (2011). Autophagy proteins regulate innate immune responses by inhibiting the release of mitochondrial DNA mediated by the NALP3 inflammasome. Nat Immunol 12, 222-230.

Narendra, D., Tanaka, A., Suen, D. F., and Youle, R. J. (2008). Parkin is recruited selectively to impaired mitochondria and promotes their autophagy. J Cell Biol 183, 795-803.

Nomura, J., So, A., Tamura, M., and Busso, N. (2015). Intracellular ATP Decrease Mediates NLRP3 Inflammasome Activation upon Nigericin and Crystal Stimulation. J Immunol 195, 5718-5724.

O'Neill, L. A., and Hardie, D. G. (2013). Metabolism of inflammation limited by AMPK and pseudo-starvation. Nature 493, 346-355.

O'Neill, L. A., Kishton, R. J., and Rathmell, J. (2016). A guide to immunometabolism for immunologists. Nat Rev Immunol 16, 553-565.

Ramirez de Molina, et al. (2007). Expression of choline kinase alpha to predict outcome in patients with early-stage non-small-cell lung cancer: a retrospective study. Lancet Oncol 8, 889-897.

Ridker, et al. (2017a). Antiinflammatory Therapy with Canakinumab for Atherosclerotic Disease. N Engl J Med 377, 1119-1131.

Ridker, et al. (2017b). Effect of interleukin-1beta inhibition with canakinumab on incident lung cancer in patients with atherosclerosis: exploratory results from a randomised, doubleblind, placebo-controlled trial. Lancet 390, 1833-1842.

Roivainen, et al. (2003). Use of positron emission tomography with methyl-11C-choline and 2-18F-fluoro-2-deoxy-D-glucose in comparison with magnetic resonance imaging for the assessment of inflammatory proliferation of synovium. Arthritis Rheum 48, 3077-3084.

Rossi, et al. (1962a). Protective action of phosphorylcholine on mitochondrial oxidative phosphorylation. Arch Biochem Biophys 99, 214-221.

Rossi, et al. (1962b). Influence of phosphorylcholine on endogenous oxidative phosphorylation of rat-liver mitochondria. Biochim Biophys Acta 56, 156-157.

Saura, et al. (2003). High-yield isolation of murine microglia by mild trypsinization. Glia 44, 183-189.

Schroder, K., and Tschopp, J. (2010). The inflammasomes. Cell 140, 821-832.

Schwarz, et al. (2016). Increased choline uptake in macrophages and prostate cancer cells does not allow for differentiation between benign and malignant prostate pathologies. Nucl Med Biol 43, 355-359.

Seki, et al. (2017). Functional analysis of choline transporters in rheumatoid arthritis synovial fibroblasts. Mod Rheumatol 27, 995-1003.

So, A. K., and Martinon, F. (2017). Inflammation in gout: mechanisms and therapeutic targets. Nat Rev Rheumatol 13, 639-647.

Steinberg, G. R., and Kemp, B. E. (2009). AMPK in Health and Disease. Physiol Rev 89, 1025-1078.

Tannahill, et al. (2013). Succinate is an inflammatory signal that induces IL-1beta through HIF-1alpha. Nature 496, 238-242.

Teodoro, et al. (2008). Differential alterations in mitochondrial function induced by a choline-deficient diet: understanding fatty liver disease progression. Mitochondrion 8, 367-376.

Terkeltaub, et al. (2011). Chondrocyte AMP-activated protein kinase activity suppresses matrix degradation responses to proinflammatory cytokines interleukin-1beta and tumor necrosis factor alpha. Arthritis Rheum 63, 1928-1937.

Tian, et al. (2008). Cytokine secretion requires phosphatidylcholine synthesis. J Cell Biol 181, 945-957.

Tiziani, et al. (2009). Metabolomic profiling of drug responses in acute myeloid leukaemia cell lines. PLoS One 4, e4251.

Toyama, et al. (2016). Metabolism. AMP-activated protein kinase mediates mitochondrial fission in response to energy stress. Science 351, 275-281.

Traiffort, et al. (2005). Molecular characterization of the family of choline transporter-like proteins and their splice variants. J Neurochem 92, 1116-1125.

Trousil, et al. (2016). The novel choline kinase inhibitor ICL-CCIC-0019 reprograms cellular metabolism and inhibits cancer cell growth. Oncotarget 7, 37103-37120.

Vallabhapurapu, S., and Karin, M. (2009). Regulation and function of NF-kappaB transcription factors in the immune system. Annu Rev Immunol 27, 693-733.

Wang, Y., Viollet, B., Terkeltaub, R., and Liu-Bryan, R. (2016). AMP-activated protein kinase suppresses urate crystal-induced inflammation and transduces colchicine effects in macrophages. Ann Rheum Dis 75, 286-294.

West, et al. (2011). TLR signalling augments macrophage bactericidal activity through mitochondrial ROS. Nature 472, 476-480.

Wishart, et al. (2012). HMDB 3.0—the human metabolome database in 2013. Nucleic acids research 41, D801-D807.

Wu, et al. (2008). High-throughput tissue extraction protocol for NMR- and MS-based metabolomics. Analytical biochemistry 372, 204-212.

Zhong, et al. (2018). New mitochondrial DNA synthesis enables NLRP3 inflammasome activation. Nature In Press.

Zhong, et al. (2016a). Autophagy, Inflammation, and Immunity: A Troika Governing Cancer and Its Treatment. Cell 166, 288-298.

Zhong, et al. (2016b). Autophagy, NLRP3 inflammasome and auto-inflammatory/immune diseases. Clin Exp Rheumatol 34, 12-16.

Zhong, et al. (2016c). NF-kappaB Restricts Inflammasome Activation via Elimination of Damaged Mitochondria. Cell 164, 896-910.

Zhong, et al. (2013). TRPM2 links oxidative stress to the NLRP3 inflammasome activation (P1268). J Immunol 190.

Zhou, et al. (2011). A role for mitochondria in NLRP3 inflammasome activation. Nature 469, 221-225.

Although the invention has been described with reference to the above examples, it will be understood that modifications and variations are encompassed within the spirit and scope of the invention. Accordingly, the invention is limited only by the following claims.

What is claimed is:

1. A method of inhibiting choline phosphorylation in a subject comprising administering to the subject an effective amount of an shRNA comprising a nucleic acid sequence selected from SEQ ID NO: 11, 12, or 13.

2. The method of claim 1, wherein the shRNA is administered via a viral vector.

3. The method of claim 1, wherein the shRNA comprises a nucleic acid sequence consisting of SEQ ID NO: 11.

4. The method of claim 1, wherein the shRNA comprises a nucleic acid sequence consisting of SEQ ID NO: 12.

5. The method of claim 1, wherein the shRNA comprises a nucleic acid sequence consisting of SEQ ID NO: 13.

6. The method of claim 1, wherein administration of the effective amount of the shRNA inhibits the expression of CTL1.

* * * * *